United States Patent
Kang et al.

(10) Patent No.: US 11,080,910 B2
(45) Date of Patent: Aug. 3, 2021

(54) METHOD AND DEVICE FOR DISPLAYING EXPLANATION OF REFERENCE NUMERAL IN PATENT DRAWING IMAGE USING ARTIFICIAL INTELLIGENCE TECHNOLOGY BASED MACHINE LEARNING

(71) Applicant: KWANGGETO CO., LTD., Seoul (KR)

(72) Inventors: Min Soo Kang, Seoul (KR); Jae Sung Hwang, Seoul (KR); Seok Hyoun Noe, Seoul (KR)

(73) Assignee: KWANGGETOCO., LTD., Seoul (KR)

( * ) Notice: Subject to any disclaimer, the term of this patent is extended or adjusted under 35 U.S.C. 154(b) by 0 days.

(21) Appl. No.: 16/496,165

(22) PCT Filed: Mar. 22, 2018

(86) PCT No.: PCT/KR2018/003371
§ 371 (c)(1),
(2) Date: Sep. 20, 2019

(87) PCT Pub. No.: WO2018/174603
PCT Pub. Date: Sep. 27, 2018

(65) Prior Publication Data
US 2020/0143575 A1   May 7, 2020

(30) Foreign Application Priority Data

Mar. 22, 2017   (KR) .................. 10-2017-0035792

(51) Int. Cl.
*G06T 11/60*   (2006.01)
*G06F 40/226*   (2020.01)
(Continued)

(52) U.S. Cl.
CPC ............ *G06T 11/60* (2013.01); *G06F 40/226* (2020.01); *G06K 9/00476* (2013.01); *G06K 9/6262* (2013.01); *G06K 2209/01* (2013.01)

(58) Field of Classification Search
None
See application file for complete search history.

(56) References Cited

U.S. PATENT DOCUMENTS 7,218,782 B1 *   5/2007   Reihani .............. G06K 9/00402
                                                              382/177
2012/0183222 A1   7/2012   Xiao et al.
(Continued)

FOREIGN PATENT DOCUMENTS

WO   2011/156134 A1   12/2011

OTHER PUBLICATIONS

International Search Report issued in corresponding PCT application No. PCT/KR2018/003371, dated Jun. 25, 2018, 6 pp.

*Primary Examiner* — Steven Z Elbinger
(74) *Attorney, Agent, or Firm* — Kaplan Breyer Schwarz, LLP

(57) ABSTRACT

The present invention relates to a device and a method for placing an original or translated explanation of a reference numeral around the reference numeral in a patent drawing, by recognizing a reference numeral included in a patent drawing, searching for a space to place an explanation corresponding to the recognized reference numeral, generating a placement information set including position information for displaying the explanation of the reference numeral in the searched empty space, and providing the placement information set to a corresponding patent drawing image. Utilization of the present invention makes it possible to recognize clearly and quickly what is represented by a reference numeral included in a patent drawing, thereby (Continued)

increasing the readability of a drawing, and facilitating understanding of the technical idea of a patent through patent drawings.

10 Claims, 34 Drawing Sheets

(51) Int. Cl.
  *G06K 9/00* (2006.01)
  *G06K 9/62* (2006.01)

(56) References Cited

U.S. PATENT DOCUMENTS

| | | | |
|---|---|---|---|
| 2013/0071020 A1* | 3/2013 | Tsibulevskiy | G06K 9/18 382/165 |
| 2013/0086050 A1 | 4/2013 | Lundberg | |
| 2014/0003712 A1* | 1/2014 | Eid | G06K 9/4647 382/164 |
| 2014/0200880 A1* | 7/2014 | Neustel | G06F 40/194 704/9 |
| 2018/0196785 A1* | 7/2018 | Levin | G06K 9/00463 |

* cited by examiner

METHOD AND DEVICE FOR DISPLAYING EXPLANATION OF REFERENCE NUMERAL IN PATENT DRAWING IMAGE USING ARTIFICIAL INTELLIGENCE TECHNOLOGY BASED MACHINE LEARNING

CROSS REFERENCE TO RELATED APPLICATION

This application is the National Phase entry of PCT/KR2018/003371, filed Mar. 22, 2018, which claims foreign priority to Korean application 10-2017-0035792 filed Mar. 22, 2017, the disclosures of which are incorporated herein by reference in their entireties.

FIELD OF THE DISCLOSURE

The present disclosure relates to a method and device for placing a technical term of a reference sign in a drawing around the reference sign, using machine learning based on Artificial Intelligence technology; and more particularly, to the method for recognizing a reference sign in a drawing which is included in a patent drawing image using a learning model generated by learning parameters of the learning model, where hyper parameters of the learning model have been optimized by a cross validation using image data including each image corresponding to each character, searching for a free space to be used for a placement of a technical term of the reference sign corresponding to the recognized reference sign in the drawing, generating and providing an information set on the placement including location information, to be used for displaying the technical term of the reference sign on the drawing image using the found free space, as corresponding to the patent drawing image, so that the original or translated technical term of the reference sign is allowed to be placed near the reference sign in the patent drawing, and the integrating server using the same.

BACKGROUND OF THE DISCLOSURE

Patent applications include patent specifications and drawings. Many patent drawings contain a plurality of reference signs. However, the drawings are provided in a form of images, and the reference signs are often in a form of simple numbers or simple numbers+letters, and there is a problem in that it is difficult to accurately understand what an object corresponding to a reference sign is.

FIGS. 25 and 30 show reference signs in conventional drawings, but technical terms of the reference signs are absent, and thus, they are examples of the conventional patent drawings where it is hard to understand accurately and quickly to which objects the reference numerals refer.

Technical terms of the reference signs for these reference signs are shown in the patent specification, mainly in the detailed description of the invention, etc. However, the patent drawings and the patent specification are separated. Also, the patent specification includes many reference signs and the technical terms of the reference signs corresponding to the entire patent contents in a long sentence, and thus it may not be easy to quickly find technical terms of reference signs in specific drawings.

Depending on the country, sometimes it is recommended to separately describe the relationships between the reference signs and the technical terms of the reference signs, but even in this case, all the reference signs and all the technical terms of the reference signs of the patent are provided, so that a person who is viewing a specific drawing cannot easily recognize a specific technical term of a specific reference numeral included in the specific drawing.

In addition, in the case where there is a plurality of reference signs in one drawing, it is not easy to accurately grasp what the reference signs refer to unless the technical terms of the reference signs are shown for each of the reference signs. FIG. 30 well illustrates such an example.

The present disclosure is to eliminate conventional inconvenience of preventing a user from quickly and clearly grasping objects referred to by the reference signs in the patent drawings.

SUMMARY OF THE DISCLOSURE

It is an object of the present disclosure to solve all the aforementioned problems, and to recognize a reference sign in a drawing which is included in a patent drawing image using a learning model generated by learning parameters of the learning model, where hyper parameters of the learning model have been optimized by a cross validation using image data including each image corresponding to each character, to search for a free space to be used for a placement of a technical term of the reference sign corresponding to the recognized reference sign in the drawing, to generate and provide an information set on the placement including location information, to be used for displaying the technical term of the reference sign on the drawing image using the found free space, as corresponding to the patent drawing image, so that the original or translated technical term of the reference sign is placed near the reference sign in the patent drawing, thus allowing clear and easy perception of what the reference sign in the patent drawing indicates and improving readability of the drawings, and expediting understanding of the technology disclosed in the patent through the drawings.

In accordance with one aspect of the present disclosure, there is provided a method for placing at least one technical term of at least one reference sign in at least one drawing around the at least one reference sign, including steps of: (a) on condition that i) a first state in which an OCR device has acquired at least one drawing image file corresponding to at least one drawing identifier related to at least one patent identifier, has recognized at least one reference sign in at least one drawing from the drawing image file, and has generated an information set on the reference sign in the drawing, including location information on the reference sign in the drawing, and that ii) a second state in which a reference sign and technical term recognizing device has parsed a specification text string including the reference sign and its corresponding technical term, has recognized the reference sign in a specification and its corresponding technical term included in the specification text string, and has generated each information set, for each patent identifier, on mapping between the reference sign in the specification and its corresponding technical term, have been performed, an integrating server acquiring (1) the information set on the mapping between the reference sign in the specification and its corresponding technical term about the patent identifier and (2) the information set on the reference sign in the drawing about the drawing identifier; (b) the integrating server searching for a specific free space, among entire free space, on the drawing image, where the technical term of the reference sign is to be displayed, by using (i) the location information on the reference sign in the drawing included in the information set on the reference sign in the drawing and (ii) term information on the reference sign mapped onto the reference sign in the specification included in the information set on the mapping between the reference sign in the specification and its corresponding technical term; and (c) the integrating server generating an information set on placement including location information to be used for displaying the technical term of the reference sign on the drawing image by using the specific free space; wherein the reference sign in the drawing and the reference sign in the specification are text strings determined as identical to each other.

As one example, the reference sign in the drawing is recognized in order to achieve the first state by performing steps of: (i1) sampling over collected image data including each image corresponding to each character; (i2) dividing the sampled image data into n folders wherein n is a natural number larger than 2; (i3) learning a learning model using a part of the sampled image data in n−1 folders as training data, and performing a cross validation process of acquiring at least one test error n times with a part of the sampled image data in the n folders excluding said n−1 folders, as test data, to thereby optimize at least one hyper parameter; and (i4) learning at least one parameter of the learning model with the optimized hyper parameter.

As one example, the learning model is at least one of a discriminant deep learning model and a generative deep learning model, and wherein the hyper parameter is at least one of (i) the number of layers, (ii) the number of hidden variables, (iii) a rate of drop out, (iv) a filter size, and (v) at least one activation function.

As one example, the step of (b) includes steps of: (b1) estimating a placement size for placing the technical term of the reference sign in the drawing; (b2) searching nearby areas of the reference sign in the drawing for the specific free space, among the entire free space, whose size is equal to or greater than the placement size estimated at the step of (b1); and (b3) generating the information set on the placement for placing the technical term of the reference sign on the specific free space.

As one example, the steps of (b1) and (b2) are processed for each reference sign in the drawing, and wherein the step of (b2) includes steps of: on condition that a first specific free space for the technical term of a first reference sign to an i-th specific free space for the technical term of an i-th reference sign have been determined wherein i is a natural number larger than 1, (b21) searching for an (i+1)-th specific free space for the technical term of an (i+1)-th reference sign such that the (i+1)-th specific free space overlaps none of the first specific free space to the i-th specific free space; and (b22) i) if no overlap occurs, generating the information set on the placement for the technical term of the (i+1)-th reference sign using information on the (i+1)-th specific free space and ii) if an overlap occurs, raising an exception for the technical term of the (i+1)-th reference sign.

As one example, orientations and locations to be searched for the specific free space for the technical term of the reference sign are prioritized, wherein, at the step of (b2), the specific free space for the technical term of the reference sign is searched for according to each priority of the locations per each reference sign in the drawing, and wherein, when searching for the free space for the technical term of the reference sign according to each priority, if the specific free space for the technical term of the reference sign crosses a physical boundary of the drawing, the specific free space for the technical term of the reference sign is searched for based on a next priority.

As one example, the method further comprises a step of: (d) the integrating server generating an information set on combination of the reference sign and its corresponding technical term by using the information set on the placement, wherein the information set on the combination of the reference sign and its corresponding technical term includes condition data to be used for determining how the technical term of the reference sign is to be displayed on the drawing image.

As one example, the information set on the combination of the reference sign and its corresponding technical term includes each piece of location information where the technical term of the reference sign is to be placed, and selectively includes at least one of information on a type of a font, information on a size of a font, information on color, information on grayscale, information on color saturation, and information on orientations, for the technical term of the reference sign.

As one example, at least one of (i) the technical term of the reference sign recognized in order to achieve the second state, and (ii) the information set on the mapping between the reference sign in the specification and its corresponding technical term in order to achieve the second state is used when the reference sign in the drawing is recognized in order to achieve the first state.

As one example, the information set on the mapping between the reference sign in the specification and its corresponding technical term includes probabilistic mapping data between the reference sign in the specification and its corresponding technical term, and wherein the information set on the mapping between the reference sign in the specification and its corresponding technical term selectively includes information on a degree of importance of the technical term of the reference sign and on a hierarchizing process of the technical term of the reference sign.

In accordance with another aspect of the present disclosure, there is provided an integrating server for placing at least one technical term of at least one reference sign in at least one drawing around the at least one reference sign, including: a communication part for, on condition that i) a first state in which an OCR device has acquired at least one drawing image file corresponding to at least one drawing identifier related to at least one patent identifier, has recognized at least one reference sign in at least one drawing from the drawing image file, and has generated an information set on the reference sign in the drawing, including location information on the reference sign in the drawing, and that ii) a second state in which a reference sign and technical term recognizing device has parsed a specification text string including the reference sign and its corresponding technical term, has recognized the reference sign in a specification and its corresponding technical term included in the specification text string, and has generated each information set, for each patent identifier, on mapping between the reference sign in the specification and its corresponding technical term, have been performed, acquiring (1) the information set on the mapping between the reference sign in the specification and its corresponding technical term about the patent identifier and (2) the information set on the reference sign in the drawing about the drawing identifier; and a processor for performing processes of (I) searching for a specific free space, among entire free space, on the drawing image, where the technical term of the reference sign is to be displayed, by using (i) the location information on the reference sign in the drawing included in the information set on the reference sign in the drawing and (ii) term information on the reference sign mapped onto the reference sign in the specification included in the information set on the mapping between the reference sign in the specification and its corresponding technical term, and (II) generating an information set on placement including location information to be used for displaying the technical term of the reference sign on the drawing image by using the specific free space; wherein the reference sign in the drawing and the reference sign in the specification are text strings determined as identical to each other.

BRIEF DESCRIPTION OF THE DRAWINGS

FIG. 33 is a drawing schematically illustrating another example of the translated technical terms of the reference signs, not the original technical terms of the reference signs, displayed on the layer of the technical terms of the reference signs.

DETAILED DESCRIPTION OF THE PREFERRED EMBODIMENTS

Figure 1:
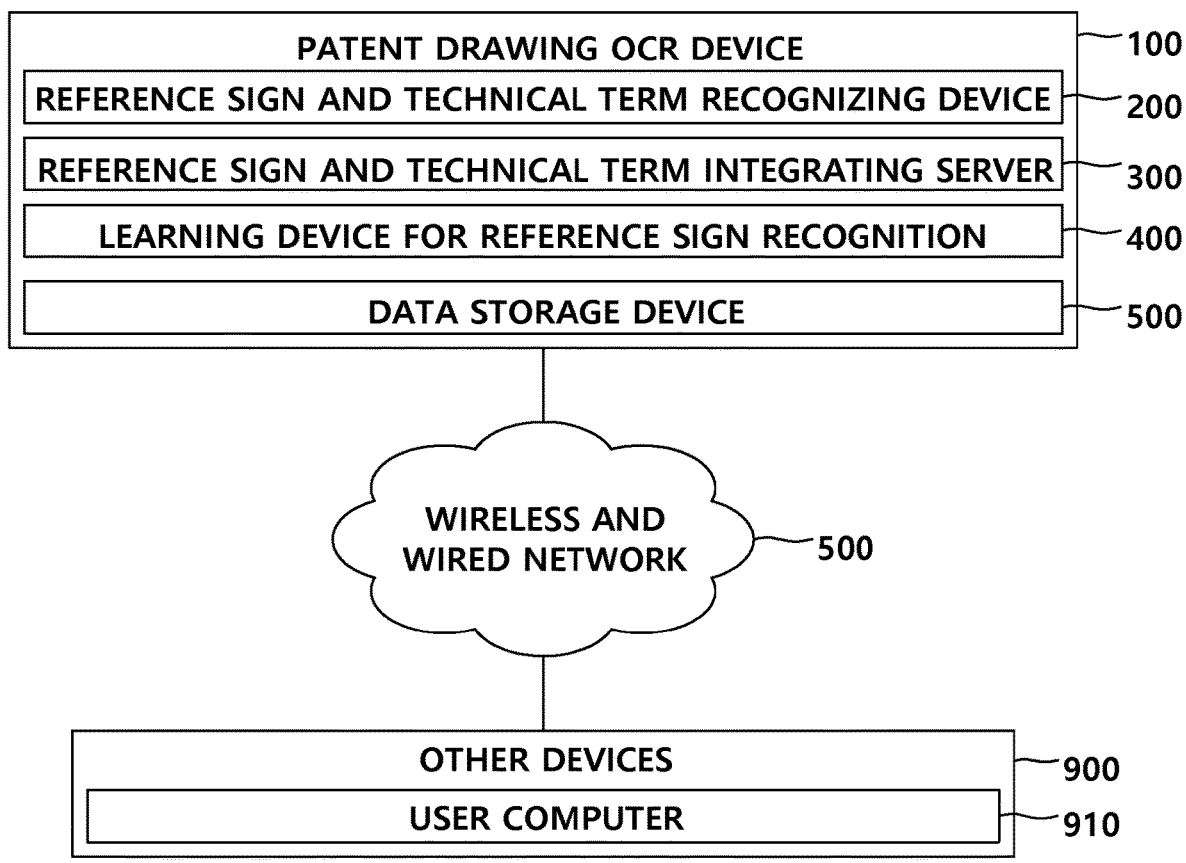
FIG. 1 is a drawing schematically illustrating a whole configuration of a system implementing spirit of the present disclosure in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the present disclosure.

Technology such as OCR in the present disclosure may include modeling based on machine learning such as deep learning, boosting, SVM, etc. Herein, 'modeling' or 'model generation' may represent performing the machine learning step by step, but are not intended to represent mental operation such as education of humans, as understood by those skilled in the art.

Besides, in the detailed description and claims of the present disclosure, a term "include" and its variations are not intended to exclude other technical features, additions, components or steps. Other objects, benefits and features of the present disclosure will be revealed to those skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure.

The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

As used in this specification and the appended claims, the singular forms "a," "an," and "the" include plural referents unless the content and context clearly dictates otherwise. These embodiments will be described in sufficient detail by referring to attached drawings regarding the embodiments of the present disclosure to allow those skilled in the art to practice the disclosure.

The "patent" as used in the present specification may include every patent of each country as well as every patent of a specific country, and may include bibliography, modified bibliography, information contained in the specification, information on drawings, or their processed information included in individual patents or patents published/registered in every country.

The devices of the present disclosure may typically achieve desired system performance by using combinations of at least one computer hardware and at least one computer software, e.g., a client computer and a server computer which may include a computer processor, a memory, a storage, an input device, an output device, or any other conventional computing components; an electronic communication device such as communication lines, a router or a switch; an electronic information storage system such as a network-attached storage (NAS) device and a storage area network (SAN) as the computer hardware and any instructions that allow the computer hardware to function in a specific way as the computer software.

The method is described in detail by referring to the drawings.

FIG. 1 is a drawing schematically illustrating a whole configuration of a system implementing a spirit of the present disclosure in accordance with one example embodiment of the present disclosure.

As illustrated in FIG. 1, the present disclosure may be implemented with an OCR device 100, a reference sign and technical term recognizing device 200, an integrating server 300, a learning device 400 for reference sign recognition, a data storage device 500, etc. Throughout the present specification, names of computers, devices, processors, processes, etc. may be abbreviated with their corresponding reference signs attached, for convenience of explanation and comprehension. The integrating server 300 may communicate with at least one of other devices 900 over a wireless and wired network 800, transmitting and receiving data. An example of said other devices 900 may be a computer, i.e., a personal computer or a server, of a user of the integrating server 300, or a server or a device transmitting or receiving the data to or from the integrating server 300. The OCR device 100, the reference sign and technical term recognizing device 200, the integrating server 300, the learning device 400 for the reference sign recognition, the data storage device 500 may be included in a physical server or a cloud system, or may be connected with one another over the wireless and wired network 800.

Meanwhile, at least one of an OCR processor 1000 included in the OCR device 100, a reference sign and technical term recognizing processor 2000 included in the reference sign and technical term recognizing device 200, an integrating processor 3000 included in the integrating server 300, a learning processor 4000 included in the learning device 400 for the reference sign recognition may be physically identical or may share a single processor, but they are not limited thereto.

As described below, the method of the present disclosure may be implemented by using a combination of computer hardware and software, as can be easily understood by those skilled in the art.

Figure 2:
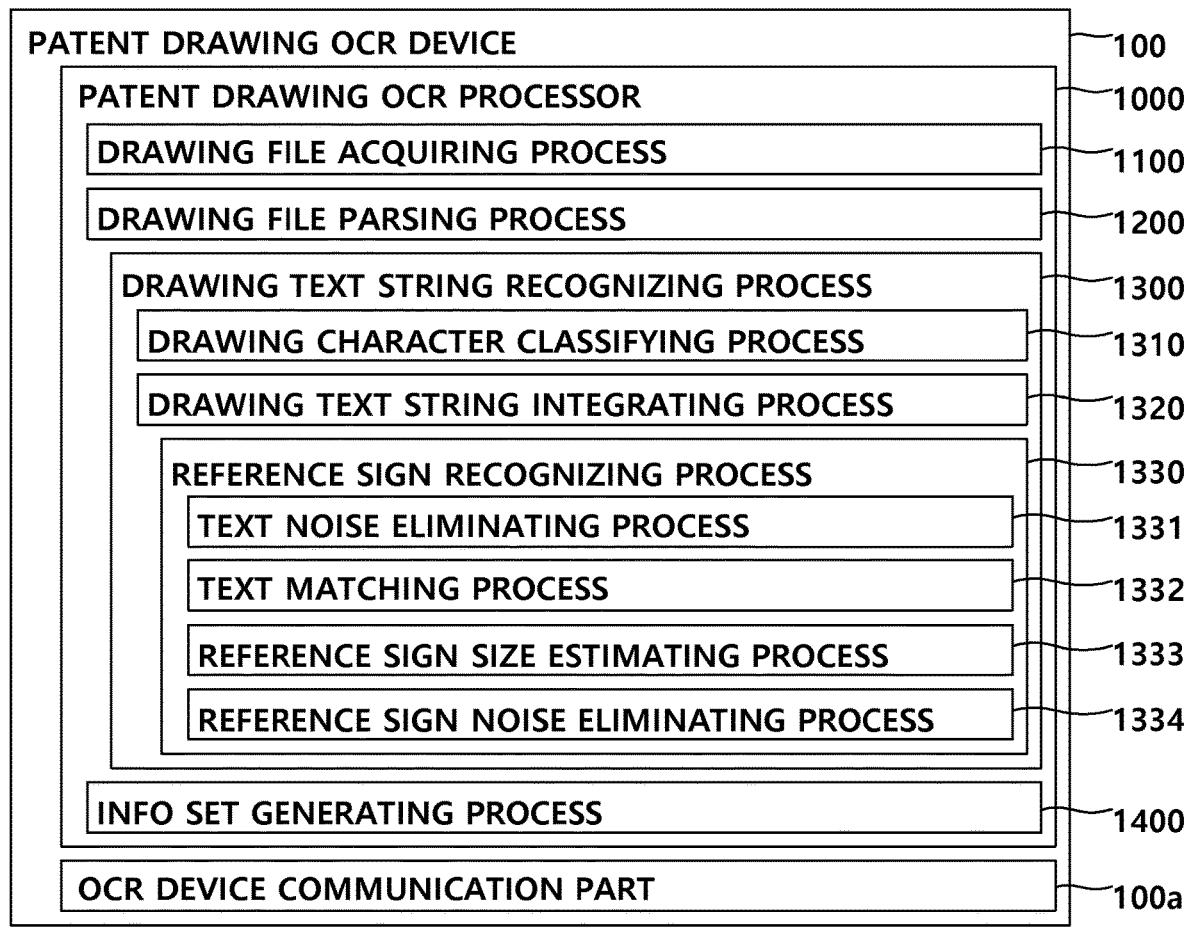
FIG. 2 is a drawing schematically illustrating an OCR device in accordance with one example embodiment of the present disclosure.

FIG. 2 is a drawing schematically illustrating the OCR device 100 in accordance with one example embodiment of the present disclosure.

The OCR device 100 may include the OCR processor 1000 for performing optical character recognition (OCR) specialized for patent drawings, and a communication part 100a that supports communication of the OCR device 100.

The OCR processor 1000 may perform an acquiring process 1100 of acquiring at least one drawing image file, a parsing process 1200 of extracting one or more image components from the drawing image, and a recognizing process 1300 of recognizing at least one specification text string from the drawing image.

The recognizing process 1300 may include a classifying process 1310 of classifying individual characters, i.e., text such as numbers and alphabets and others that can be handled as text, from the parsed image components, an integrating process 1320 of integrating the classified individual characters and as a reference sign, a recognizing process 1330 of recognizing the reference sign in the drawing, and a generating process 1400 of generating and storing entire information on the recognized reference sign in the drawing.

The recognizing process 1330 may further include an eliminating process 1331 of eliminating noise from the integrated characters, a matching process 1332 of matching the integrated characters against (i) the reference sign in the specification or (ii) an information set on mapping between the reference sign in the specification and its corresponding technical term, and an estimating process 1333 of estimating a size of the reference sign per a drawing image or per a patent identifier, and an eliminating process 1334 of eliminating noise which is practically not the reference sign though recognizable as the reference sign.

Figure 23:
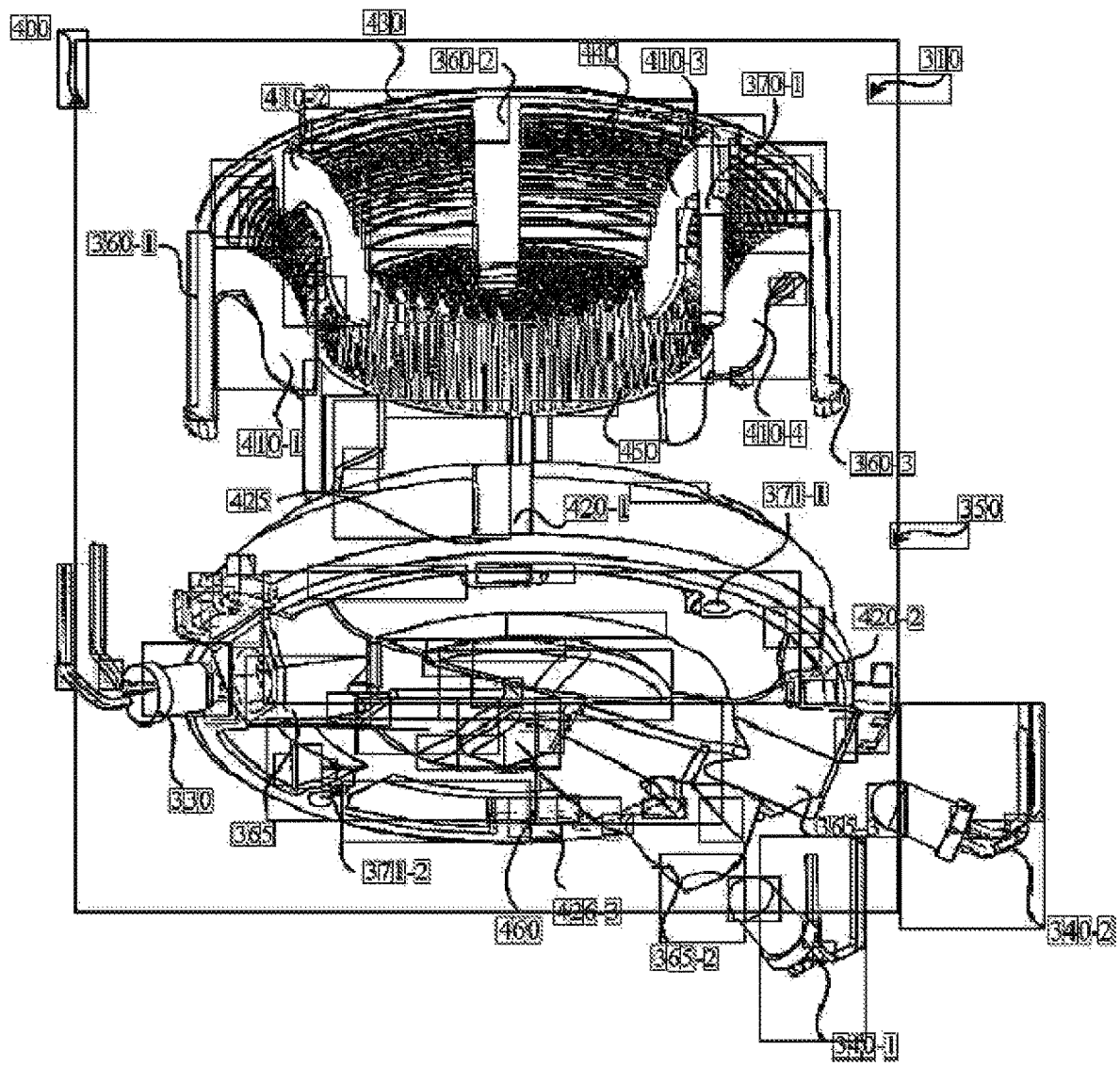
FIG. 23 is a drawing schematically illustrating visualization of data generated after patches in a drawing image file are parsed, by the OCR device in accordance with one example embodiment of the present disclosure.

The parsing process 1200 may be of parsing candidates of patches from where the characters are to be recognized in the drawing image. The parsing process 1200 may find every closed contour among parts that are not white in the drawing image. FIG. 23 shows parts, corresponding to a result of parsing the patches from the drawing image, that is, boxes each of which surrounds each of numbers, characters, arrows, etc.

The classifying process 1310 may be of classifying drawing characters from the patches of the drawing image by using a model learned by the learning device 400 for the reference sign recognition. Each of probabilities representing each of the patches being which character may be calculated, and for example, a maximum of four outputs of the most probable character may be generated per a patch.

$X_i$: i-th patch in the drawing $C_j$: j-th class (ex: $C_1$='1', $C_2$='2', ... )

$f(X_i)$: Output from drawing character classifying process of i-th patch in the drawing $$f(X_i)=\{C_j:C_j\times 1(P(X_i=C_j)\geq q)\times 1(\mathrm{rank}(P(X_i=C_j))\leq 4)\}$$

where q is probability value.

Figure 10:
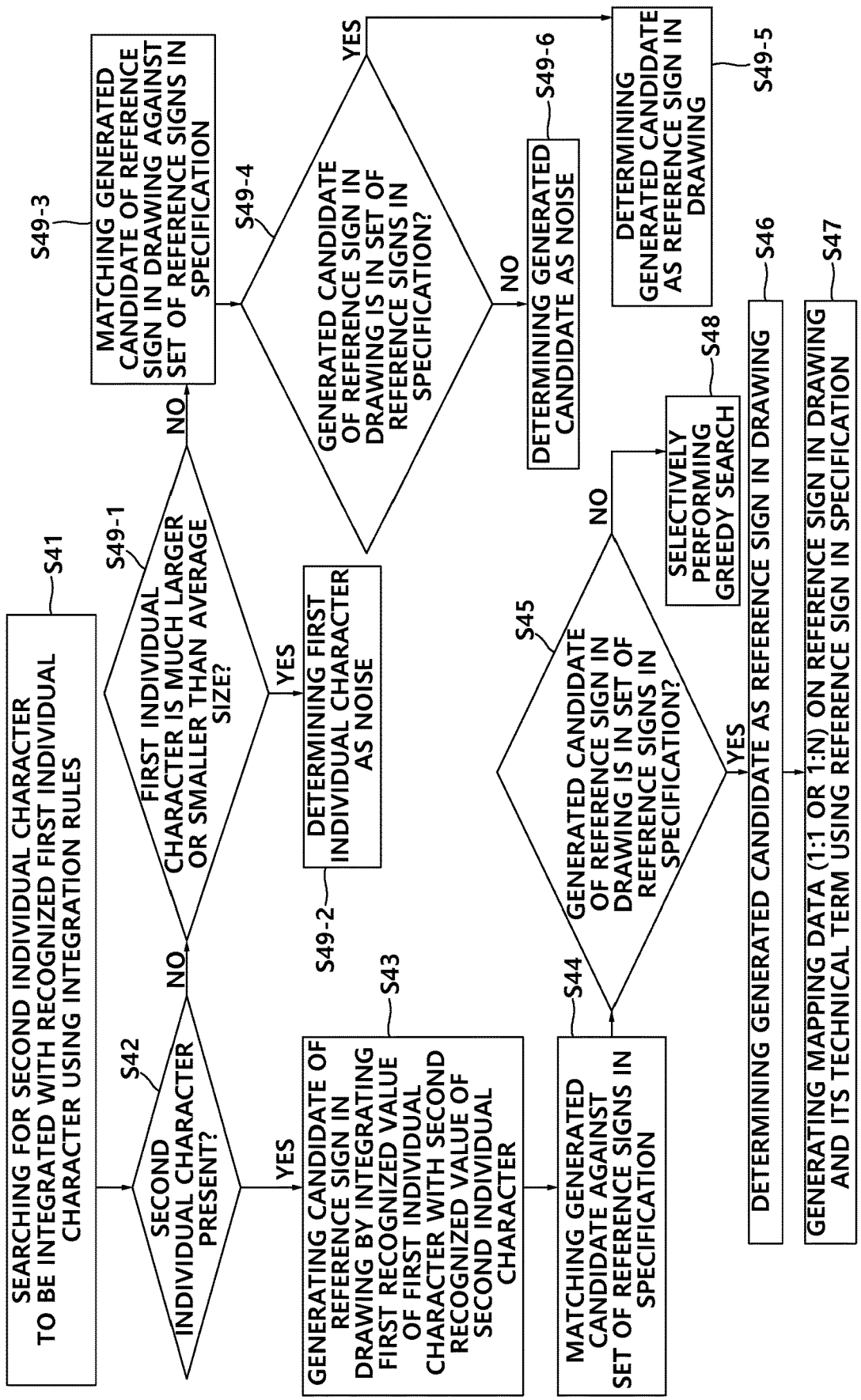
FIG. 10 is a drawing schematically illustrating a process for integrating recognized text strings by the OCR device in accordance with one example embodiment of the present disclosure.

Tables 1 to 3 show examples of data generated from the classifying process 1310 using the drawing image corresponding to FIG. 10 of Korea Patent Application No. 1020167002395.

TABLE 1

| PATENT IDENTIFIER | DRAWING IDENTIFIER | PATCH IDENTIFIER | x | y | w | h | x + w | y + h |
|---|---|---|---|---|---|---|---|---|
| 1020167002395 | 1020167002395-pct00010.tif | pct00010-1 | 25 | 804 | 32 | 52 | 57 | 856 |
| 1020167002395 | 1020167002395-pct00010.tif | pct00010-2 | 62 | 804 | 36 | 51 | 98 | 855 |
| 1020167002395 | 1020167002395-pct00010.tif | pct00010-3 | 101 | 804 | 36 | 50 | 137 | 854 |
| 1020167002395 | 1020167002395-pct00010.tif | pct00010-4 | 773 | 489 | 33 | 52 | 806 | 541 |
| 1020167002395 | 1020167002395-pct00010.tif | pct00010-5 | 810 | 489 | 35 | 51 | 845 | 540 |
| 1020167002395 | 1020167002395-pct00010.tif | pct00010-6 | 851 | 489 | 34 | 51 | 885 | 540 |

Each row of Table 1 represents information on each of the patches. x and y may be bottom-left coordinates of the patch, w may be a width of the patch, and h may be a height of the patch. x+w may be an x component of bottom-right coordinates of the patch, y+h may be a y component of top-left coordinates of the patch.

TABLE 2

| PATENT IDENTIFIER | DRAWING IDENTIFIER | PATCH IDENTIFIER | RESULT | neighbors1 | neighbors2 | neighbors3 |
|---|---|---|---|---|---|---|
| 1020167002395 | 1020167002395-pct00010.tif | pct00010-1 | 3 | J | S | 5 |
| 1020167002395 | 1020167002395-pct00010.tif | pct00010-2 | 0 | O | C | o |
| 1020167002395 | 1020167002395-pct00010.tif | pct00010-3 | 2 | g | 9 | c |
| 1020167002395 | 1020167002395-pct00010.tif | pct00010-4 | 3 | S | G | J |

TABLE 2-continued

| PATENT IDENTIFIER | DRAWING IDENTIFIER | PATCH IDENTIFIER | RESULT | neighbors1 | neighbors2 | neighbors3 |
|---|---|---|---|---|---|---|
| 1020167002395 | 1020167002395-pct00010.tif | pct00010-5 | 2 | 1 | C | g |
| 1020167002395 | 1020167002395-pct00010.tif | pct00010-6 | 2 | 1 | g | c |

In Table 2, the result may be a character with the highest probability, and the neighbors may be characters with lower probabilities, among the recognized candidates from the patch.

TABLE 3

| patent identifier | drawing identifier | patch identifier | result_prob | nb1_prob | nb2_prob | nb3_prob |
|---|---|---|---|---|---|---|
| 1020167002395 | 1020167002395-pct00010.tif | pct00010-1 | 0.999993 | 0.499681 | 0.114491 | 0.064621 |
| 1020167002395 | 1020167002395-pct00010.tif | pct00010-2 | 0.985046 | 0.842362 | 0.183666 | 0.036005 |
| 1020167002395 | 1020167002395-pct00010.tif | pct00010-3 | 0.999996 | 0.057314 | 0.007256 | 0.006482 |
| 1020167002395 | 1020167002395-pct00010.tif | pct00010-4 | 0.99996 | 0.377687 | 0.020333 | 0.019016 |
| 1020167002395 | 1020167002395-pct00010.tif | pct00010-5 | 0.99999 | 0.043344 | 0.017867 | 0.015724 |
| 1020167002395 | 1020167002395-pct00010.tif | pct00010-6 | 0.999987 | 0.01373 | 0.005888 | 0.003442 |

In Table 3, the result_prob may be a probability of a recognition value of the result, and the nb "NUMBER"_probs may be probabilities of recognition values of the neighbors, from the patch.

The integrating process 1320 may be of integrating the drawing characters which are near with one another, among the drawing characters recognized from the patch of the drawing, into a text string. The drawing characters may be determined as near one another, for example, if a distance between center points of the drawing characters is smaller than a predetermined distance, e.g., a distance longer than 350% of an average of widths of the characters.

$Y_i$: i-th patch recognized as a drawing character $O_i$: Center coordinates of $Y_i$ $W_i$: Width of $Y_i$ $H_i$: Height of $Y_i$ $sim(Y_i, Y_j)$: Representing whether $Y_i$ and $Y_j$ are near (1 if near, 0 if not)

$sim(Y_i, Y_j) = I(\|O_i - O_j\|_2^2 \leq \hat{w})$ $\hat{w}$: Specific distance is determined by conditional mean as follows $\hat{w} = E[W|H=H_i]$ FIG. 10 shows the eliminating process 1331 of eliminating the noise from the integrated characters.

The eliminating process 1331 may determine whether the integrated characters are included in a list of the reference signs in the specification per the patent identifier using the matching process 1332, and in case the integrated characters are determined as included in the list, the integrated characters may be determined as valid. In case the integrated characters are determined as not included in the list, candidate sets of the integrated characters are matched against the list, and if a match occurs then the integrated characters may be determined as valid, but if no match occurs then the integrated characters may be determined as noise.

For example, a single drawing character may have four candidates at maximum by the classifying process 1310. Therefore, if the drawing characters have two characters, then the integrated characters may have 4×4=16 combinations at maximum.

The matching process 1332 may retrieve the list of the reference signs in the specification corresponding to the patent identifier, and may match the integrated character against the list of the reference signs in the specification for each of the recognized integrated characters.

The estimating process 1333 may estimate a size of the reference sign in the drawing by using the integrated characters which are valid as the reference sign in the drawing. If no integrated character valid as the reference sign is present in a single drawing, the size of the reference sign may be estimated based on the size of the reference sign previously learned by using at least one of other drawings corresponding to the patent identifier. An example of an estimating logic is as follows.

$W_{ij}$: Width of $j$-th reference sign among integrated characters valid as $i$-th reference sign in drawing $H_{ij}$: Height of $j$-th reference sign among integrated characters valid as $i$-th reference sign in drawing $$E[W] = \frac{1}{|I|} \sum_{i \in I} \frac{1}{|J_i|} \sum_{j \in J_i} W_{ij}$$

$$\sigma_W^2 = \frac{1}{|I|} \sum_{i \in I} \frac{1}{|J_i|} \sum_{j \in J_i} (W_{ij} - E[W])^2$$

$$E[H] = \frac{1}{|I|} \sum_{i \in I} \frac{1}{|J_i|} \sum_{j \in J_i} H_{ij}$$

-continued $$\sigma_H^2 = \frac{1}{|I|}\sum_{i \in I}\frac{1}{|J_i|}\sum_{j \in J_i}(H_{ij}-E[H])^2$$

$$\hat{w}_+ = I(|I|>0)\times(E[W]+\sigma_W\times k_w)+I(|I|=0)\times(\hat{w}_+\times r_w)$$

where $k_w$ is a constant and $r_w$ is ratio between drawings.

The eliminating process 1334 may determine whether the drawing character recognized by the estimating process 1333 is noise or the reference sign in the drawing. An example of an algorithm for determination of the noise is as follows.

$Y_i$: i-th patch recognized as a drawing character
$W_i$: Width of $Y_i$
$H_i$: Height of $Y_i$
$g(Y_i)$: Function representing whether $Y_i$ drawing character is noise $$g(Y_i)=I(W_i\leq \hat{w}_+)\times I(W_i\geq \hat{w}_-)\times I(H_i\leq \hat{h}_+)\times I(H_i\geq \hat{h}_-)$$

The generating process 1400 may be of generating and storing information on the reference sign in the drawing, such as location information, a font size, etc. of the recognized reference sign in the drawing.

Figure 3:
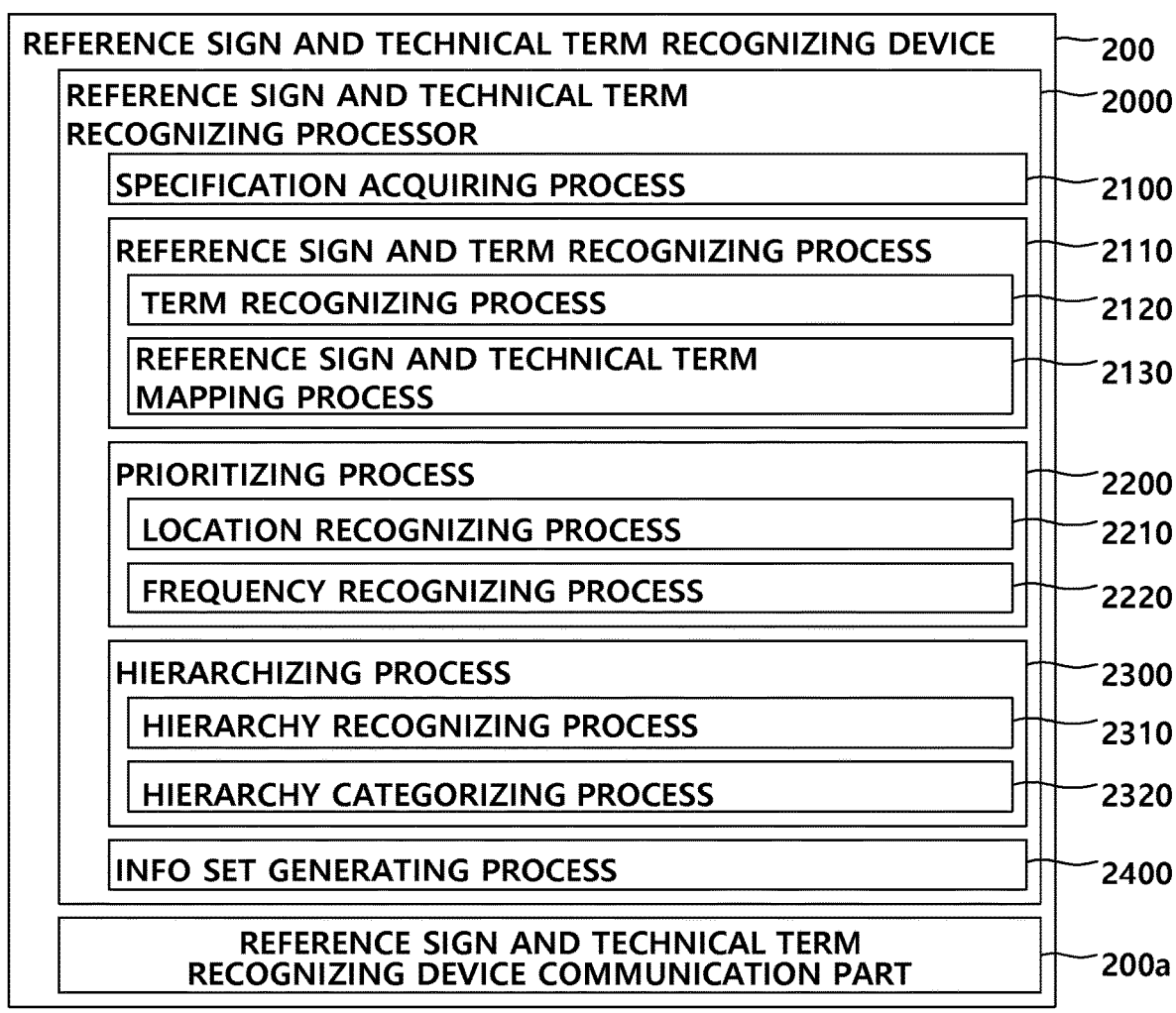
FIG. 3 is a drawing schematically illustrating a reference sign and technical term recognizing device in accordance with one example embodiment of the present disclosure.

FIG. 3 is a drawing schematically illustrating the reference sign and technical term recognizing device 200 in accordance with one example embodiment of the present disclosure.

The reference sign and technical term recognizing processor 2000 of the reference sign and technical term recognizing device 200 may perform an acquiring process 2100 of acquiring the specification or partial data of the specification including the text string corresponding to the reference sign and its corresponding technical term among a specification file, a recognizing process 2110 of recognizing the reference sign in the specification and its corresponding technical term, and a generating process 2400 of generating and storing mapping information between the reference sign in the specification and its corresponding technical term. The reference sign and technical term recognizing processor 2000 may selectively perform a prioritizing process 2200 of prioritizing the reference signs in the specification and/or their technical terms, and a hierarchizing process 2300 of extracting and identifying at least one set of the reference signs in the specification which have hierarchical relations from a set of the reference signs in the specification and of hierarchizing the reference signs in the specification of the set.

The recognizing process 2110 may include a recognizing process 2120 of recognizing the technical term of the reference sign, and a mapping process 2130 of mapping the reference sign in the specification onto its corresponding technical term. The prioritizing process 2200 may include a locating process 2210 of recognizing locations of the technical term of the reference sign in components of the specification, that is, in a title of an invention, an abstract of the invention, scope of the invention (whole scope, independent claims, dependent claims, certain parts of the dependent claims, citation depths of the dependent claims, etc.), description of the invention (background of the invention, summary of the invention, detailed description of the invention, brief description of the drawings, example embodiments, problems to be solved by the invention, effects of the invention, etc.), and a frequency process 2220 of recognizing how frequent the technical term of the reference sign appears. The hierarchizing process 2300 may include a recognizing process 2310 of extracting and identifying at least one set of the reference signs in the specification which have the hierarchical relations from a set of the reference signs in the specification, and a categorizing process 2320 of hierarchizing the reference signs in the specification of the set.

Table 4 below shows example data generated by the recognizing process 2110 using Korea Patent Application No. 1020167002395 corresponding to U.S. patent application Ser. No. 14/249,716.

TABLE 4

| PATENT IDENTIFIER | REFERENCE SIGN | TECHNICAL TERM OF REFERENCE SIGN | PROBABILITY |
|---|---|---|---|
| 1020167002395 | 14 | Display | 1 |
| 1020167002395 | 16 | display driver integrated circuit | 1 |
| 1020167002395 | 18 | gate driver circuit | 1 |
| 1020167002395 | 20 | demultiplexing circuitry | 1 |
| 1020167002395 | 24 | Substrate | 1 |
| 1020167002395 | 25 | Path | 1 |
| 1020167002395 | 26 | light-emitting diode | 0.8 |
| 1020167002395 | 26 | diode | 0.2 |
| 1020167002395 | 28 | transistor | 1 |
| 1020167002395 | 30 | transistor | 1 |
| 1020167002395 | 34 | power supply terminal | 1 |
| 1020167002395 | 36 | ground power supply terminal | 1 |
| 1020167002395 | 40 | light | 1 |
| 1020167002395 | 42 | cathode | 1 |
| 1020167002395 | 44 | anode | 1 |
| 1020167002395 | 46 | dielectric layer | 1 |
| 1020167002395 | 47 | organic light-emitting diode emissive material | 1 |
| 1020167002395 | 50 | planarization layer | 1 |
| 1020167002395 | 52 | thin-film transistor structures | 1 |
| 1020167002395 | 54 | buffer layer | 1 |
| 1020167002395 | 58 | transistor | 0.9 |
| 1020167002395 | 58 | thin-film transistor | 0.1 |
| 1020167002395 | 60 | oxide transistor | 0.666 |
| 1020167002395 | 60 | transistor | 0.333 |

The reference sign 26 in the specification in Table 4 has a probability 0.8 of being recognized as a light-emitting diode and a probability 0.2 of being recognized as a diode.

The mapping process 2130 may recognize the reference sign 26 in the specification as the light-emitting diode.

Figure 4:
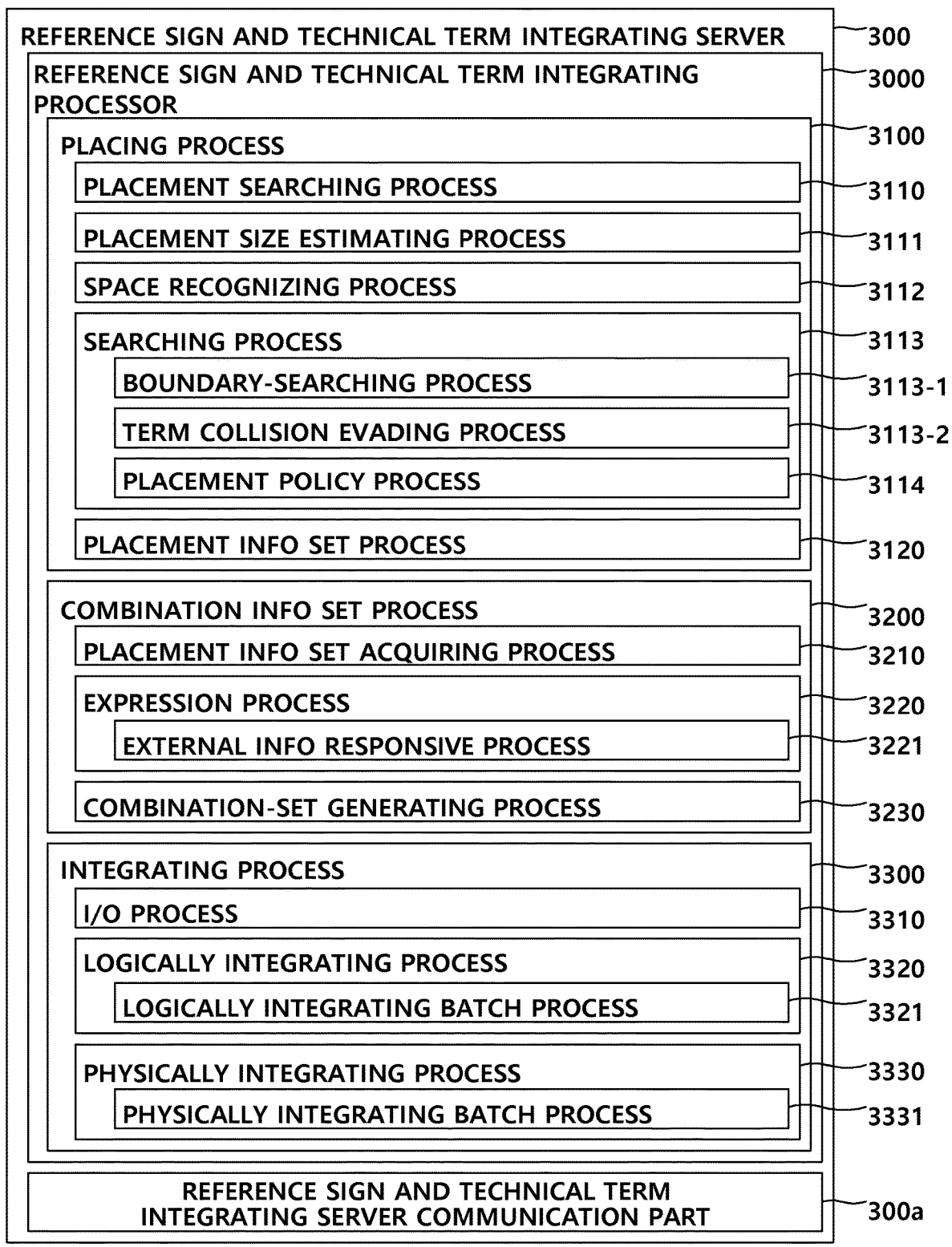
FIG. 4 is a drawing schematically illustrating an integrating server for combining a reference sign and its corresponding technical term in accordance with one example embodiment of the present disclosure.

FIG. 4 is a drawing schematically illustrating the integrating server 300 for combining the reference sign and its corresponding technical term in accordance with one example embodiment of the present disclosure.

The integrating server 300 may perform, for example, a placing process 3100 of generating and storing placement data to be used for displaying the technical term of the reference sign around the drawing part of the drawing image, a combination process 3200 of generating and storing entire data on placement of the technical term of the reference sign and on how the technical term is displayed, and an integrating process 3300 of handling a request for integration of the technical term of the reference sign, acquired from at least one of other devices 900.

The placing process 3100 may, for example, include a searching process 3110 and a placement process 3120. The searching process 3110 may include an estimating process 3111 of estimating a size of the technical term of the reference sign to be placed, a space-recognizing process 3112 of recognizing a free space around the reference sign in the drawing where the technical term of the reference sign is to be placed, a searching process 3113 of searching surrounding areas of the reference sign in the drawing to be used for placing the technical term of the reference sign, and a policy process 3114 of searching the surrounding areas based on a placement policy.

The searching process 3113 may include a boundary-searching process 3113-1 of determining whether the placement of the technical term of the reference sign is affected by physical boundaries, and an evading process 3113-2 of determining, after a technical term of an i-th reference sign is placed, whether a technical term of an (i+1)-th reference sign to be placed overlaps/collides with any of a technical term of the first reference sign to the technical term of the i-th reference sign, and of placing the technical term of the (i+1)-th reference sign such that no overlap/collision occurs. The placement information on the technical term of the reference sign may be generated and stored by the placement process 3120.

The estimating process 3111 may be of determining the font size using the size of the reference sign, and of determining a placement size whose corresponding free space is to be recognized using a count of the characters in the technical term of the reference sign. An example logic for estimating the placement size for placing the technical term of the reference sign used by the estimating process 3111 is as follows.

$h_i$: Height of i-th reference sign
$wd_i$: Word count of technical term of i-th reference sign
$S_i$: Placement size of technical term of i-th reference sign $$S_i = wd_i \times h_i \times f$$

where f is a constant which is related to font size.

The space-recognizing process 3112 may be of calculating how much free space, as large as the placement size, is available in candidate areas where the technical term of the reference sign is to be placed. Generally, a background color of the drawing image is white. The whiter the pixel is, the larger an intensity value becomes, and thus the larger intensity value means the more free space. An example logic for recognizing the free space used by the space-recognizing process 3112 may be as follows, and the free space may be recognized based on a value of $R_{ij}$.

$X_{ij}$: Starting X coordinate of j-th candidate free space of i-th reference sign $Y_{ij}$: Starting Y coordinate of j-th candidate free space of i-th reference sign $W_i$: Width of placement size of technical term of i-th reference sign $H_i$: Height of placement size of technical term of i-th reference sign $px_{X_{ij}Y_{ij}}$: Pixel value whose X coordinate is $X_{ij}$ and Y coordinate is $Y_{ij}$ $R_{ij}$: Spare space value of j-th candidate free space of i-th reference sign $$R_{ij} = \sum_{y=Y_{ij}}^{Y_{ij}+H_i} \sum_{x=X_{ij}}^{X_{ij}+W_i} px_{x,y}$$

The boundary-searching process 3113-1 may be of preventing the technical term of the reference sign from being displayed outside the drawing. The boundary-searching process 3113-1 may determine whether the candidate area where the technical term of the reference sign is to be placed overlaps a boundary of the drawing, and if the candidate area overlaps the boundary, may move the candidate area toward an inside of the drawing (toward left if the boundary is on a right side) as much as an amount of the technical term passing the boundary, to thereby determine the candidate area. If the candidate area does not overlap the boundary, the candidate area may be determined as a proper candidate area.

The evading process 3113-2 may be of preventing the technical term to be placed from overlapping other technical terms already placed. The evading process 3113-2 may determine whether the candidate area for the technical term of the i-th reference sign overlaps any one of other technical terms of other reference signs already placed. If the candidate area overlaps, nearby areas except the candidate area may be searched. Meanwhile, if every candidate area overlaps any one of said other technical terms of said other reference signs already placed, then an exception process is used.

Tables 5 to 6 show examples of data generated from the placement process 3120 using the drawing image corresponding to FIG. 10 of Korea Patent Application No. 1020167002395.

TABLE 5

| PATENT IDENTIFIER | DRAWING IDENTIFIER | symbol | symbol_tag | x_point | y_point | font_size |
|---|---|---|---|---|---|---|
| 1020167002395 | 1020167002395-pct00010.tif | 302 | thin-film transistor structures | 25 | 856 | 47 |

TABLE 5-continued

| PATENT IDENTIFIER | DRAWING IDENTIFIER | symbol | symbol_tag | x_point | y_point | font_size |
|---|---|---|---|---|---|---|
| 1020167002395 | 1020167002395-pct00010.tif | 322 | output terminal | 773 | 437 | 47 |
| 1020167002395 | 1020167002395-pct00010.tif | 314 | gate | 969 | 221 | 47 |
| 1020167002395 | 1020167002395-pct00010.tif | 310 | silicon channel region | 1126 | 1165 | 47 |
| 1020167002395 | 1020167002395-pct00010.tif | 312 | gate | 1281 | 272 | 47 |
| 1020167002395 | 1020167002395-pct00010.tif | 316 | source terminal | 1501 | 480 | 47 |
| 1020167002395 | 1020167002395-pct00010.tif | 308 | silicon layer | 1542 | 1157 | 47 |
| 1020167002395 | 1020167002395-pct00010.tif | 318 | drain terminal | 1942 | 553 | 47 |
| 1020167002395 | 1020167002395-pct00010.tif | 302 | thin-film transistor structures | 2042 | 78 | 47 |
| 1020167002395 | 1020167002395-pct00010.tif | 24 | substrate | 2265 | 1001 | 47 |
| 1020167002395 | 1020167002395-pct00010.tif | 306 | gate insulator layer | 2086 | 850 | 47 |
| 1020167002395 | 1020167002395-pct00010.tif | 320 | passivation layer | 1990 | 445 | 47 |

In Table 5, the symbol may represent the recognized reference sign in the specification, and the symbol_tag may represent the technical term of the reference sign. x_point and y_point may be respectively x and y coordinates of a bottom-left position of the technical term of the reference sign in the drawing. The font_size may be the font size of the technical term of the reference sign to be displayed.

TABLE 6

| PATENT IDENTIFIER | DRAWING IDENTIFIER | Symbol | ROTATE_ANGLE | figure_x_size | figure_y_size |
|---|---|---|---|---|---|
| 1020167002395 | 1020167002395-pct00010.tif | 302 | 0 | 2374 | 1243 |
| 1020167002395 | 1020167002395-pct00010.tif | 322 | 0 | 2374 | 1243 |
| 1020167002395 | 1020167002395-pct00010.tif | 314 | 0 | 2374 | 1243 |
| 1020167002395 | 1020167002395-pct00010.tif | 310 | 0 | 2374 | 1243 |
| 1020167002395 | 1020167002395-pct00010.tif | 312 | 0 | 2374 | 1243 |
| 1020167002395 | 1020167002395-pct00010.tif | 316 | 0 | 2374 | 1243 |
| 1020167002395 | 1020167002395-pct00010.tif | 308 | 0 | 2374 | 1243 |
| 1020167002395 | 1020167002395-pct00010.tif | 318 | 0 | 2374 | 1243 |
| 1020167002395 | 1020167002395-pct00010.tif | 302 | 0 | 2374 | 1243 |
| 1020167002395 | 1020167002395-pct00010.tif | 24 | 0 | 2374 | 1243 |
| 1020167002395 | 1020167002395-pct00010.tif | 306 | 0 | 2374 | 1243 |
| 1020167002395 | 1020167002395-pct00010.tif | 320 | 0 | 2374 | 1243 |

In Table 6, the rotate_angle may be an angle to be rotated when the drawing is displayed. figure_x_size and figure_y_size are physical sizes of the drawing. The coordinates where the technical term of the reference sign is displayed are x_point<figure_x_size, and y_point<figure_y_size.

Figure 24:
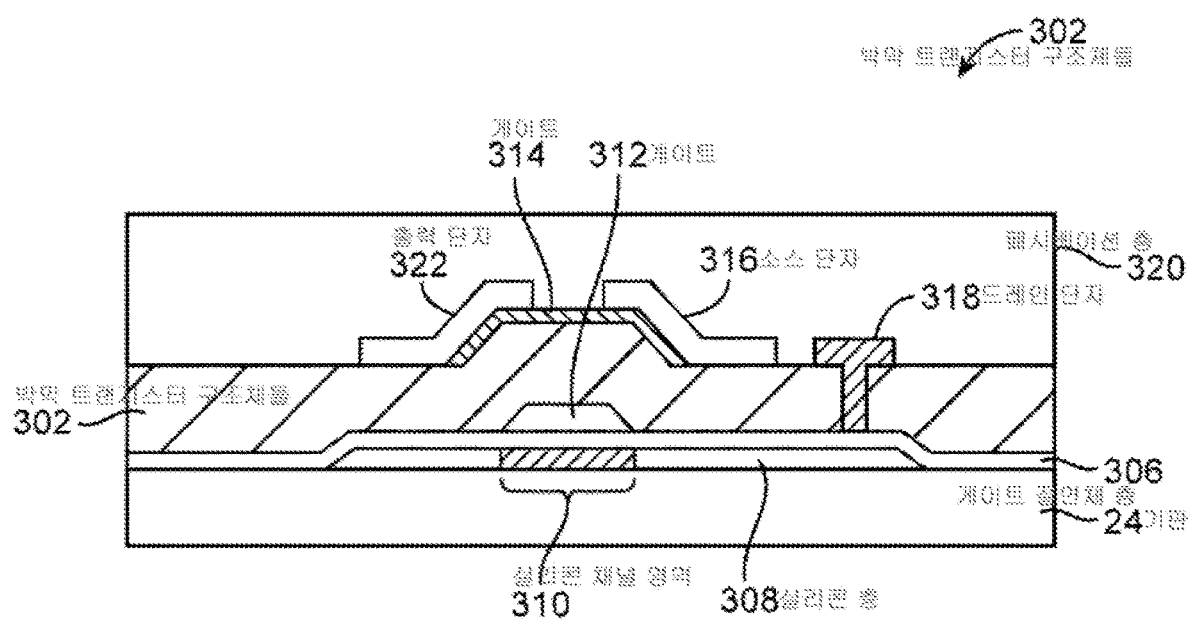
FIG. 24 is a drawing schematically illustrating a final result displayed to a user on a user computer which is an implementation result of the present disclosure on a specific drawing of a specific patent application filed with KIPO in accordance with one example embodiment of the present disclosure.

FIG. 24 shows an example result of the data in Tables 5 to 6 being applied to an actual drawing. As can be seen in Table 5 and FIG. 24, the reference sign 302 is used twice in a single drawing, and each of its positions may differ. In a same specification, the reference sign 302, aside from an issue of ambiguousness, may have a 1:n corresponding relationship where n is a natural number larger than 1, like in thin film transistor structures, structures, dielectric layers, etc. Herein, the reference sign and technical term recognizing device 200 may map the reference sign in the specification onto its corresponding technical term as a 1:1 relationship, however, as another example, may also map them as the 1:n relationship and display all of n reference signs when the drawing like FIG. 24 is presented on a user computer 910. Herein, the integrating server 300 may perform information processing on the n technical terms of the same reference sign in the specification, by considering weights such as an appearing frequency, such that controlling conditions like the font size or the color of the technical term of the reference sign are additionally applied. If two or more technical terms of the reference signs are to be displayed, the placing process may search for the free space to be used for displaying said two or more technical terms of the reference signs. Throughout the present disclosure, a single technical term is to be displayed near a single reference sign for convenience of explanation, however, the spirit of the present disclosure is not limited to the 1:1 relationship. The integrating process 3300 may include an I/O process 3310 of receiving information requested from other devices 900 and transmitting its result, a logically integrating process 3320 of providing processed information on the information set on the mapping between the reference sign in the specification and its corresponding technical term per each of the drawing identifiers requested by other devices 900, and a physically integrating process 3330 of generating the drawing image with which the technical term of the reference sign is integrated. The integrating process 3300 may selectively include a batch process 3331 of batch-generating the drawing images integrated with the technical terms of the reference signs in a large amount using the physically integrating process 3330.

The placing process 3100 may acquire multiple drawings of multiple patents and may generate at least one information set on the placement of the technical term of the reference sign to be placed on each of the drawings of each of the patents in batches. The information set on the placement may be generated for every drawing of patents of a specific country, by the batch process. Further, for every drawing of every country, the information set on the placement using the technical terms translated into every language may be generated and stored per every language.

The combination process 3200 may acquire multiple drawings of multiple patents and may generate at least one information set on a combination of the reference sign and its corresponding technical term to be placed on each of the drawings of each of the patent in batches. The information set on the combination of the reference sign and its corresponding technical term may be generated for every drawing of patents of a specific country, by the batch process. Further, for every drawing of every country, the information set on the combination of the reference sign and its corresponding technical term translated into every language may be generated and stored per every language. Meanwhile, new drawing images including the technical terms of the reference signs may be generated in a large amount by using the batch process 3331 in batches.

If the technical term of the reference sign is translated, the length of the technical term of the reference sign may change. Especially, the technical terms of the reference signs in Asian languages is relatively short, but those in English tend to be longer, and those in French or Spanish tend to be the longest.

First, the integrating server 300 may re-generate the placement information based on the translated technical term of the reference sign. For this purpose, the integrating server 300 may acquire translation data, i.e., machine translation, etc., on the technical term of the reference sign, and may generate various data to be used for placing the technical term of the reference sign by using the translated technical term of the reference sign in the present disclosure.

Second, the integrating server 300 may calculate multiplier data of average lengths per each language in advance, and may generate various data to be used for placing the translated technical term of the reference sign based on the length of the technical term having underwent a "multiplier" process. Herein, the multiplier includes information on average increase/decrease in the font size. For example, the multiplier data is generated, such as Chinese characters: alphabets=1:3.5, Korean characters:alphabets=1:2.5, etc. The multiplier data may be generated by creating the translated technical terms translated into each language from a large amount of the sample technical terms of the reference signs and comparing the count of the characters with a same font per each language. In general, fonts of Western languages are smaller than those of Eastern languages. That is, the technical terms of the reference signs in English may be longer, but their readability is maintained even with smaller fonts.

Third, the integrating server 300 may support in-browser processing of combined translation. The integrating server 300 may acquire a translation request for translation into a designated language from the user computer 910. If the information set on the mapping between the reference sign and its corresponding technical term is available for the designated language, the integrating server 300 may process the information set on the mapping corresponding to the designated language in a predetermined way and provide the processed information set to the user computer 910. If a processed image with the information set hard-bonded to the drawing image for the designated language is present, the processed image may be provided. Meanwhile, if the information set on the mapping between the reference sign and its corresponding technical term is not available for the designated language, the integrating server 300 may translate the technical term of the reference sign using external translation services like Google Translate, etc. or an internal translation server, and may generate the information set on the mapping between the reference sign and its corresponding the translated technical term. The integrating server 300 may process the generated information set on the mapping corresponding to the designated language in the predetermined way and provide the processed information set to the user computer 910. As another example, the information set on the mapping may have been processed by the placing process 3100 using the translated technical term of the reference sign, or may have been processed such that the technical term of the reference sign in a default language is replaced with the translated technical term in another language.

Meanwhile, a browser may perform acquisition and the placement of the translated technical term of the reference sign, thus it is preferable that a script to be used for implementing functions be included in data transmitted to the browser.

Meanwhile, the integrating process 3300 may generate drawing data including the technical term of the reference sign integrated physically or logically with the drawing image in advance. Herein, if an integration request for integrating the technical term of the reference sign with the drawing image is acquired from one of other devices 900, the logically integrating process 3320 may generate and provide data, to be used for displaying the technical term of the reference sign together with the drawing image to the user of said one of other devices 900, to said one of other devices 900. Meanwhile, the physically integrating process 3330 may generate processed drawing image data, in which the technical term of the reference sign is physically integrated with the reference sign in the drawing, in a form of predetermined image data. As another example, the integrating process 3300 may provide a drawing image with physical integration to one of other devices 900.

Figure 5:
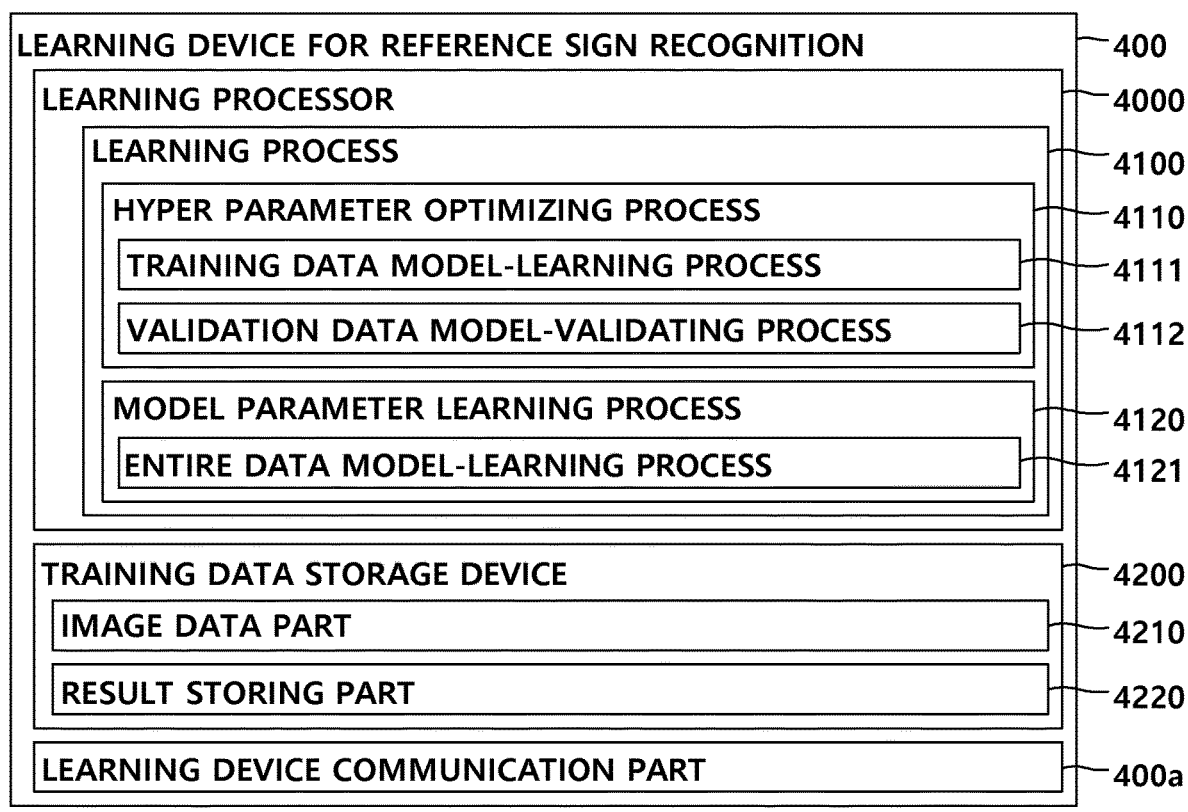
FIG. 5 is a drawing schematically illustrating a learning device for reference sign recognition in accordance with one example embodiment of the present disclosure.

FIG. 5 is a drawing schematically illustrating an exemplary configuration of the learning device 400 for reference sign recognition in accordance with one example embodiment of the present disclosure.

The learning device 400 for the reference sign recognition may include the learning processor 4000 for the reference sign recognition, a learning data storage device 4200, a communication part 400*a* of the learning device 400. The learning processor 4000 may perform a learning process 4100 including an optimizing process 4110 and a model parameter learning process 4120. The optimizing process 4110 may include a model-learning process 4111 of learning a model for recognition from the training data and a model-validating process 4112 of validating the model for the recognition from validation data. The model parameter learning process 4120 may include a model-learning process 4121 of learning the model for the recognition from the entire data. The learning data storage device 4200 may include an image data part 4210 and a result storing part 4220.

The image data part 4110 may store tens of thousands of character images for each of the characters, i.e., numbers, alphabets, other characters, etc., used in the patent drawings. The character images may be preferably acquired from the patent drawings, or may be acquired from other image sources for each of the numbers or alphabets. Herein, preferably, the character images may be prepared for each of the fonts of the reference signs used in the patent drawings. Especially, in case of handwriting, the more character images lead to the better recognition, even for deep learning, and it is preferable that a large amount of the handwriting be acquired. Images of each character pulled out of handwritten reference signs in the patent drawings, or image data of each character in every computer font may be used as training images for each of the characters, for better recognition.

A learning model may be at least one of a discriminant deep learning model, e.g., deep Convolutional neural network, deep neural network, etc., and a generative deep learning model, e.g., a variational autoencoder, generative adversarial network, etc. As another example, other machine learning models may be used such as boosting and an SVM. The boosting is an algorithm for generating a single powerful classifier using an ensemble of multiple simple decision tree models as nonlinear models.

A deep learning model may use at least one of hyper parameters such as (i) the number of layers, (ii) the number of hidden variables, (iii) a rate of drop out, (iv) a filter size, and (v) at least one activation function, etc. The hyper parameters of the boosting may include the depth of the decision tree model, the number of the decision trees, a shrinkage parameter representing how much a movement is decreased when moving in a gradient direction in a learning, etc. Such hyper parameters may be optimized by the optimizing process 4110.

The present disclosure may exemplarily use each of three methods or a combination thereof to optimize the hyper parameters. The first is a grid search. The grid search performs cross validation on every possible combination of every hyper parameter, and is the most definite way to optimize the hyper parameters. The grid search may perform the cross validation with the hyper parameters set as follows for example. That is, the number of layer is set as 5~20, the hidden variable is set as 0.3~0.9 times an input data size, the rate of the drop out is set as 0~0.9, the activation function is set as ReLU, Sigmoid, Leaky ReLU, PreLU, RreLU, ELU, etc. That is, the grid search may be performed for each combination of detailed ranges and types (the types only in the case of activation functions) of each of the hyper parameters. Herein, the cross validation may be performed with the numbers of the layers and the hidden variable changing by one, the rate of the drop out changing by 0.05 or 0.1, and with each of the activation functions used for each of the changes.

The second is a random search. The random search may be identical to the grid search in its methodology. The difference is that the grid search performs the cross validation using the given hyper parameters, but the random search performs the cross validation using random values of each of the hyper parameters.

The third is a bayesian optimization. The bayesian optimization optimizes by using a prior distribution of the hyper parameters.

In the optimizing process 4110, the hyper parameters may be optimized using a combination of the random search and the grid search. First, the hyper parameters are randomly set and optimized using the cross validation, and each of preliminary ranges of each of the hyper parameters is determined which shows the best performance within a validation set. Each of the hyper parameters may be finely divided within the preliminary ranges, and the grid search may be performed for each of the finely divided hyper parameters for optimization.

Part of data used for the cross validation may become the validation data and the rest may become the training data. The model-learning process 4111 may perform modeling per each of the initially set hyper parameters using the training data. Meanwhile, the model-validating process 4112 may apply deep learning models, which are modeled using the training data, to the validation data, to thereby optimize the hyper parameters using a model with better performance.

The model-learning process 4121 may learn one or more parameters of actual machine learning models using the optimized hyper parameters.

Specific details of the learning is well known to those skilled in the art if programming language packages like R, Python, etc. or machine learning libraries like Google Tensorflow, Caffe etc. are used, and thus omitted.

Figure 21:
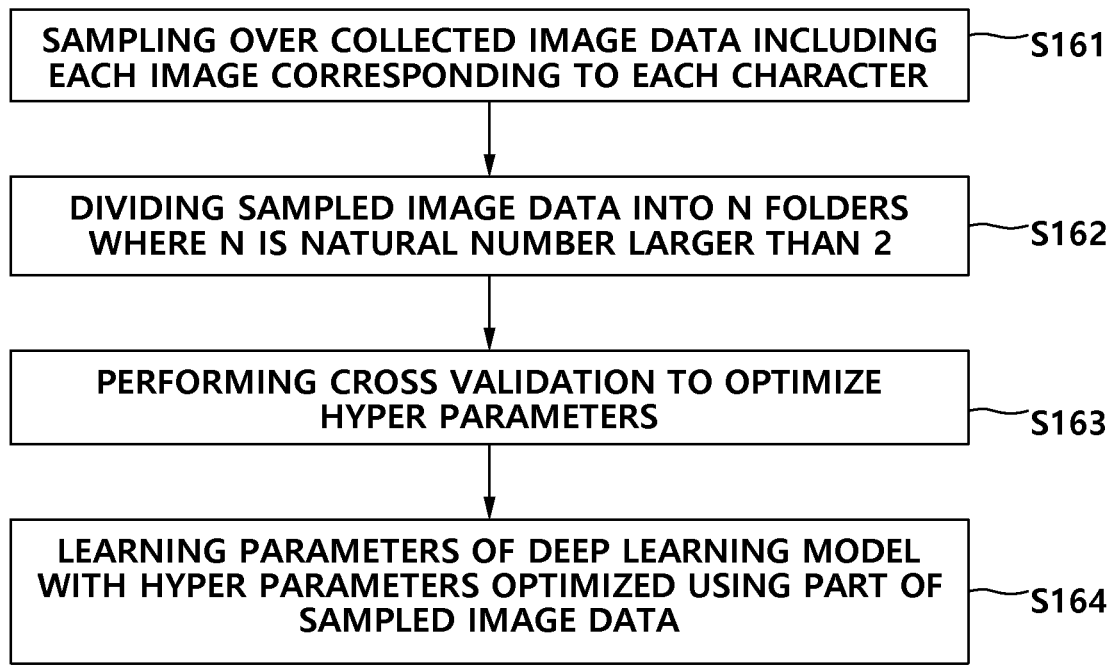
FIG. 21 is a drawing schematically illustrating a learning process of the learning device in accordance with one example embodiment of the present disclosure.

FIG. 21 is a drawing schematically illustrating the learning process of the learning device 400 in accordance with one example embodiment of the present disclosure.

The learning device 400 may perform sampling over collected image data including each image corresponding to each character stored in the image data part 4110, at a step of S161. And, the optimizing process 4110 may divide the sampled image data into n folders at a step of S162 where n is a natural number larger than 2, may learn the learning model using a part of the sampled image data in n−1 folders as the training data, and may perform the cross validation process of acquiring at least one test error n times with a part of the sampled image data in the n folders excluding said n−1 folders, as test data, to thereby optimize at least one hyper parameter, at a step of S163. Then, the model parameter learning process 4120 may learn the parameters of the deep learning model, a boosting model, or an SVM model at a step of S164, by using the optimized hyper parameters. Preferably, n may be 5 or 10.

Learning of the parameters of the learning model is described below.

In case of a neural network model among the deep learning models, supposing that X is input data, X moves from the bottom-most layer to an upper layer via ReLU(X× W+b), where W and b are the parameters to be learned. Meanwhile, in case of the boosting model, if the depth of the decision tree and the number of the decision trees to be used are determined, then the decision trees appropriate for the data may be learned.

The learning data storage device 4200 may store instructions for processing image recognition, which are results of the learning.

Figure 22:
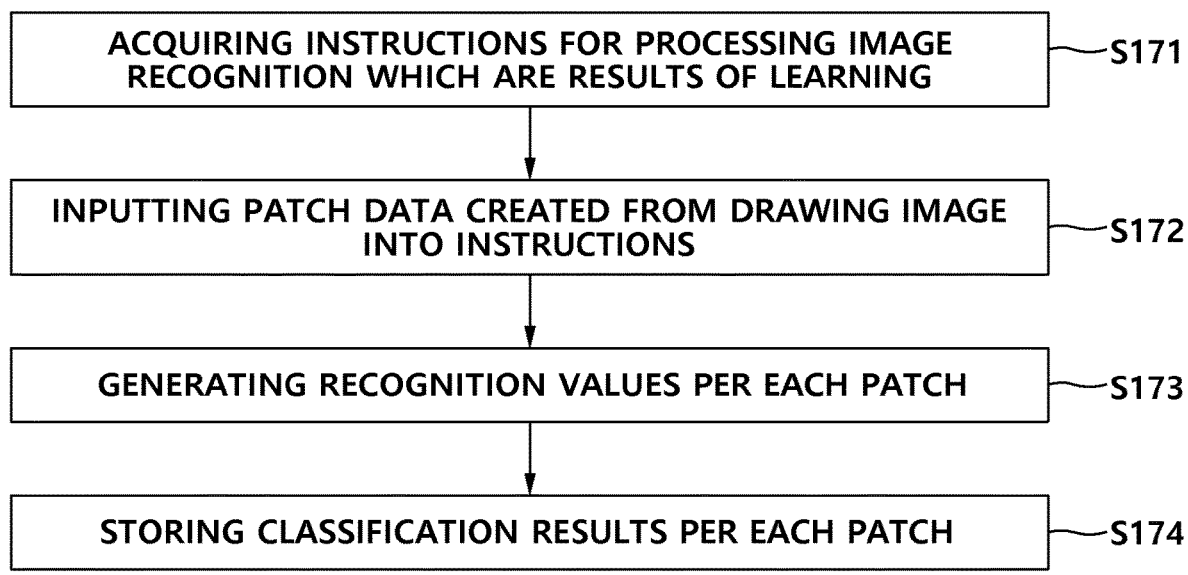
FIG. 22 is a drawing schematically illustrating a process of the OCR device using a learning result of the learning device in accordance with one example embodiment of the present disclosure.

A process of how the OCR device 100 uses the results of the learning is exemplarily shown in FIG. 22.

The OCR device 100 may execute the instructions for processing the image recognition which are the results of the learning generated by the learning device 400, at a step of S171. Then, the classifying process 1310 may input patch data created from the drawing image into the instructions at a step of S172, may generate one or more recognition values per each patch at a step of S173, and may store classification results per each patch at a step of S174.

The classifying process 1310 may apply the instructions to the patch created from the drawing image by the parsing process 1200. One example of results of applying the instructions to the patch is shown in Tables 1 to 3, especially in Table 2.

Figure 6:
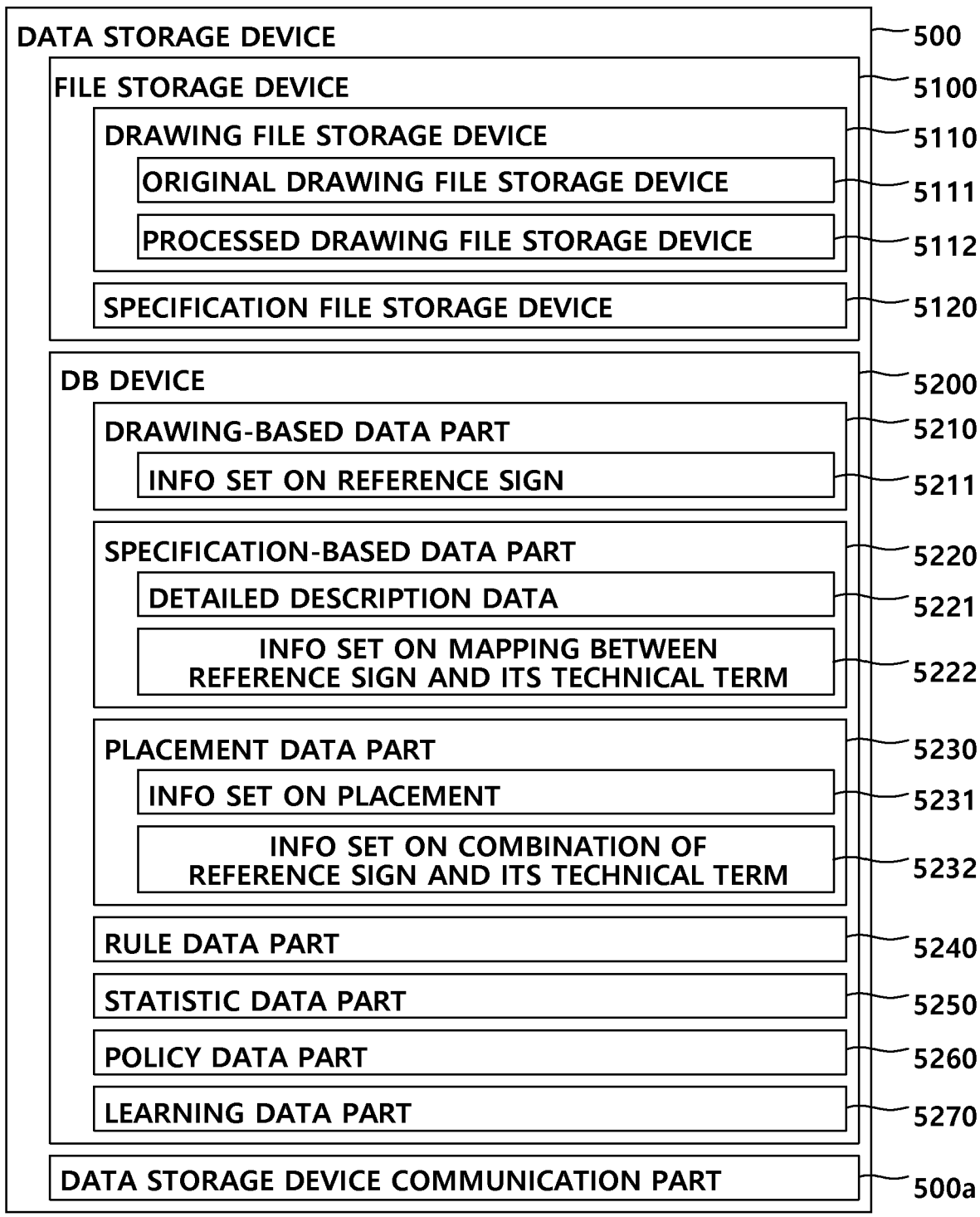
FIG. 6 is a drawing schematically illustrating a data storage device in accordance with one example embodiment of the present disclosure.

FIG. 6 is a drawing schematically illustrating the data storage device 500 in accordance with one example embodiment of the present disclosure.

The data storage device 500 of the present disclosure may include a file storage device 5100 and a DB device 5200. The file storage device 5100 may include a drawing file storage device 5110 and a specification file storage device 5120, and the drawing file storage device 5110 may include an original drawing file storage device 5111 and may selectively include a processed drawing file storage device 5112. Patent full-text data generally include specification files written in markup languages such as XML, etc., and if drawings are present, may include at least one drawing file. In the drawing file, a single image file may physically include two conceptually separate drawings, e.g., FIGS. 1 and 2. The processed drawing file is a drawing file processed in accordance with the present disclosure. The processed drawing file may include two types of the processed drawings. One is a processed drawing file where the present disclosure is applied, such that the placement data of the technical term of the reference sign is displayed directly or indirectly, i.e., in connection, in association, or in integration, near the reference sign in the drawing included in an original drawing file. The other is a processed drawing file such that, if two or more conceptually separable drawings are included in a single physical drawing, the two or more drawings are separated and the present disclosure is applied thereto.

The DB device may include a drawing-based data part 5210, a specification-based data part 5220, and a placement data part 5230, and may selectively further include a rule data part 5240 or a statistic data part 5250. The drawing-based data part 5210 may store data extracted from drawings per each drawing file of each of the patents. The drawing-based data part 5210 may store (i) the reference sign in the drawing and (ii) property information on the reference sign in the drawing per each of the reference signs in the drawings. The specification-based data part 5220 may store the reference sign in the specification, the technical term of the reference sign, property information on the technical term of the reference sign, etc. The placement data part 5230 may store the placement data to be used for placing the technical term corresponding to the reference sign in the drawing.

The present disclosure is described in more detail by referring to the figures of the present disclosure.

Figure 7:
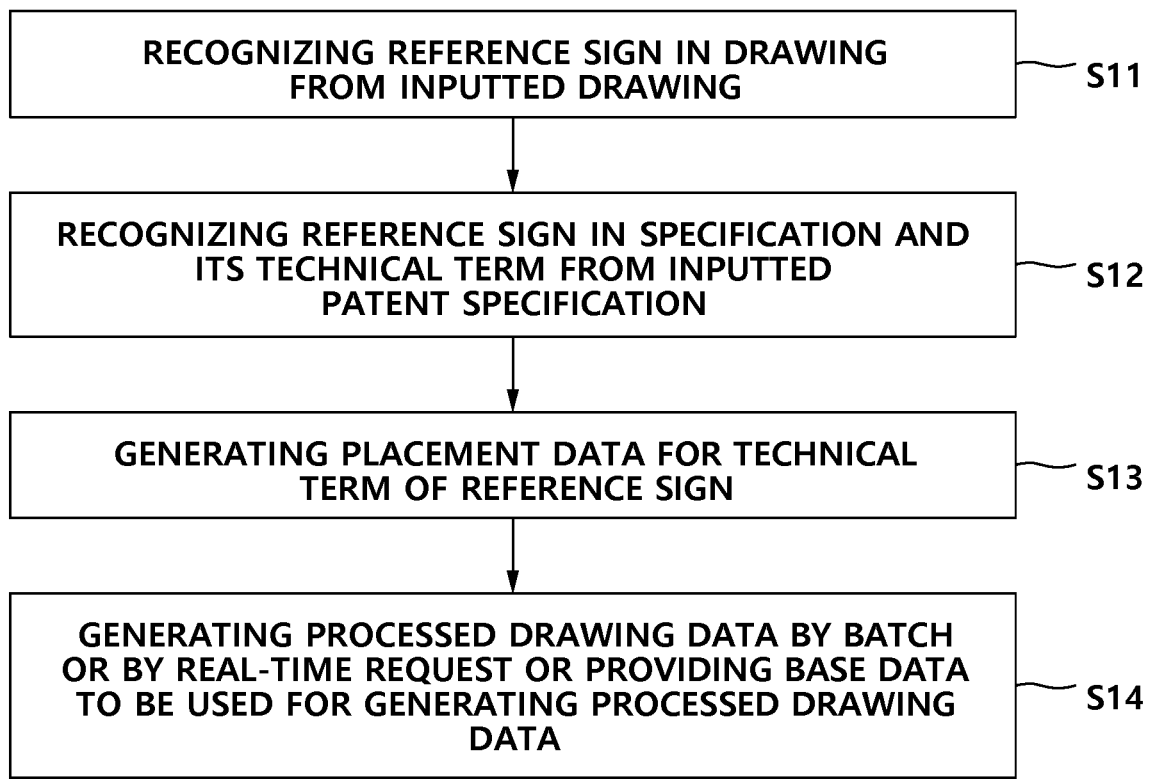
FIG. 7 is a drawing schematically illustrating a process for implementing spirit of the present disclosure in accordance with one example embodiment of the present disclosure.

FIG. 7 is a drawing schematically illustrating a process for implementing the spirit of the present disclosure in accordance with one example embodiment of the present disclosure.

As can be seen in FIG. 7, the present disclosure may be implemented as follows: the OCR device 100 recognizes the reference sign in an inputted drawing at a step of S11, the reference sign and technical term recognizing device 200 recognizes the reference sign in the specification and its corresponding technical term from an inputted patent specification at a step of S12, the integrating server 300 generates the placement data for the technical term of the reference sign at a step of S13, and the integrating server 300 generates the processed drawing data in batches or in response to the a real-time request from other devices 900 or provides base data to be used for generating the processed drawing data, at a step of S14.

Figure 8:
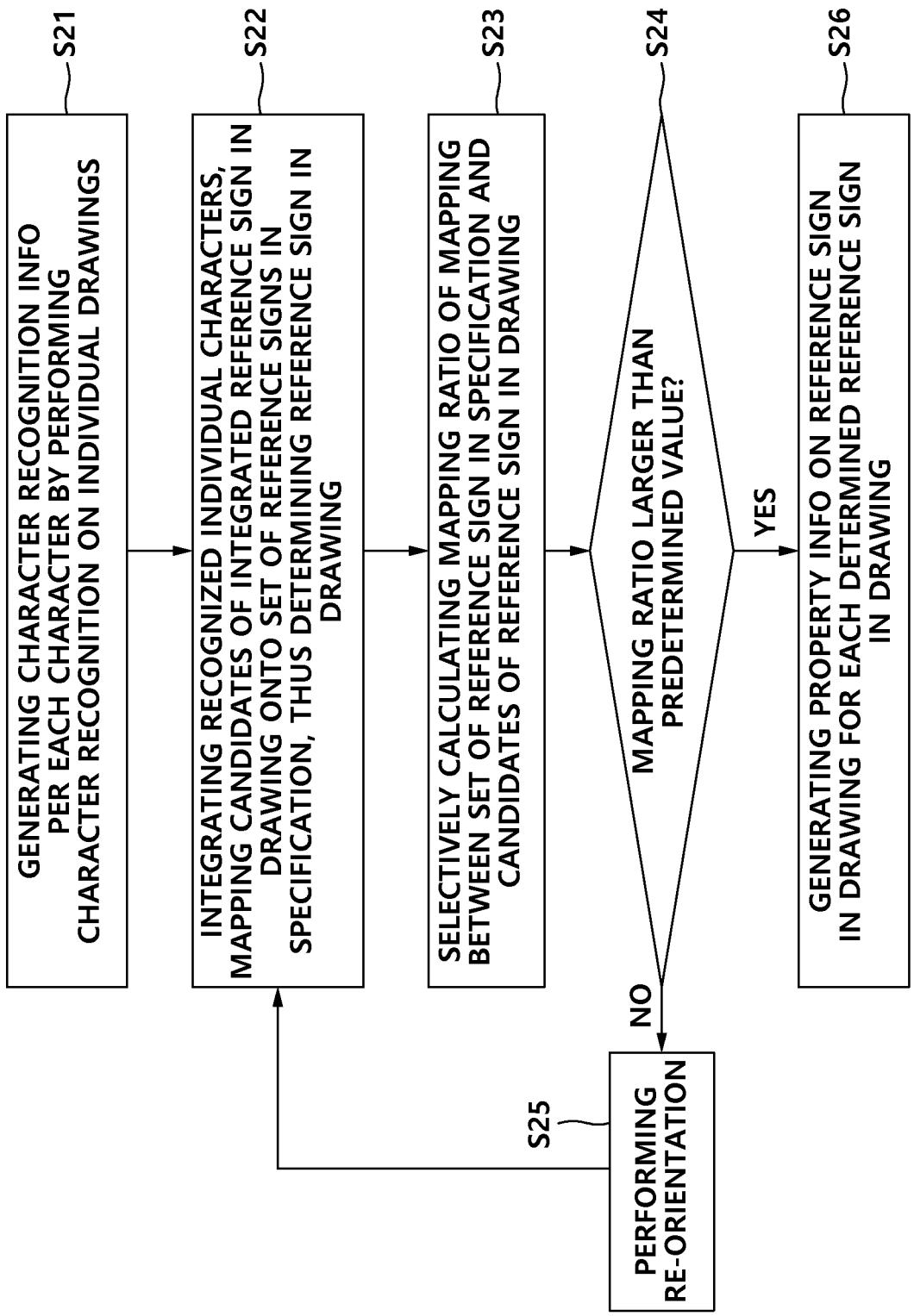
FIG. 8 is a drawing schematically illustrating a process for recognizing the reference sign in a drawing by the OCR device in accordance with one example embodiment of the present disclosure.

As can be seen in FIG. 8, the OCR processor 1000 may generate character recognition information per each character by performing character recognition on individual drawings at a step of S21, may integrate the recognized individual characters and may map candidates of the integrated reference sign in the drawing onto a set of reference signs in the specification, to thereby determine the reference sign in the drawing at a step of S22, and may generate the property information on the reference sign in the drawing for each determined reference sign in the drawing at a step of S26.

The OCR processor 1000 may selectively calculate a mapping ratio of mapping between the set of the reference signs in the specification and the candidates of the reference sign in the drawing, may determine whether the mapping ratio is larger than a predetermined value, and if the mapping ratio is not larger than the predetermined value, may re-orient the drawing, and perform the aforementioned steps of S21 to S23 using the re-oriented drawing. The re-orientation is required because most of the drawings are in landscape orientation, but some of them are in portrait orientation. And in case of the drawings in landscape orientation, most of the reference signs in the drawing are written in landscape orientation, and in case of the drawings in portrait orientation, most of the reference signs in the drawing are written in portrait orientation. The re-orientation may determine an angle of rotation among 90 degrees clockwise, 180 degrees clockwise, and 270 degrees clockwise according to each drawing property of each country.

Optical Character Recognition recognizes text including numbers from the image data. A detailed methodology of OCR itself is well known to those skilled in the art by books, dissertations, open/proprietary software and thus omitted. However, from the perspective of the present disclosure, if the text string included in the drawings is recognized using conventional OCR, three problems arise.

First, the recognized text string may include some things that are not the reference sign in the drawing. The text strings in a box of process diagrams will be typical examples. These are text strings but not the reference signs in the drawing. Therefore, separating things that are not the reference sign from the reference sign in the drawing among the recognized text string becomes a major problem.

Second, various lines and shapes of the drawings may be seen as numbers or characters if the lines and shapes are pulled out of context as a small or big block. Typically, OCR scans an image and determines whether a block being scanned represents a character or a number. Therefore, a vertical line may be recognized as an upper case I or a lower case L, a line vertically going down then curving to the left may be recognized as a J, and a wiggling line may be recognized as an S. The cases of mis-recognition as characters due to shapes of part of the lines that are not actual reference signs happen a lot in the line which connects parts of a drawing with the technical term of the reference sign as well as in an image of the drawing.

Thus, use of such conventional OCR technology on the drawings produces lots of mis-recognition. The present disclosure solves such a problem in a systematic way.

When OCR is performed, machine learning may be used to improve a recognition rate of numbers, characters, and symbols frequently seen in the drawings. For this purpose, first, a large amount of data may be collected for each of the numbers, the characters, and the symbols. For example, partial images that may correspond to a number 2, which should be recognized as the number 2, may be collected by extracting a part corresponding to the number 2 from the drawing image and saving the part as a separate image file.

And the collected data may be divided into the training data and the test data, and the validation data may be prepared additionally as the case may be, and the learning is performed by using a deep learning algorithm such as CNN (convolution neural network) or other machine learning algorithms, and as a result, an image recognition algorithm or a model specialized in the recognition of the reference sign in the drawing may be generated. Then, the generated image recognition algorithm may be included in an OCR routine. In the OCR process, whether a specific image block is a character or a number and which character or which number the specific image block is may be determined by using the image recognition algorithm or the model specialized in the recognition of the reference sign. Using the image recognition algorithm or the model specialized in the recognition of the reference sign, more accurate and effective recognition of the reference sign is possible, compared to the conventional OCR algorithm.

Third, the present disclosure may use the KNN (K nearest neighborhood) algorithm. To use the KNN, a large amount of the image data including each image corresponding to each character is prepared. The image recognition algorithm such as KNN may not be good at recognizing the handwriting or the characters using irregular fonts. Learning algorithms such as the deep learning, the boosting, and the SVM are required for such cases. Image recognition by machine learning is more effective in case of the reference signs in the handwriting or various fonts.

Figure 9:
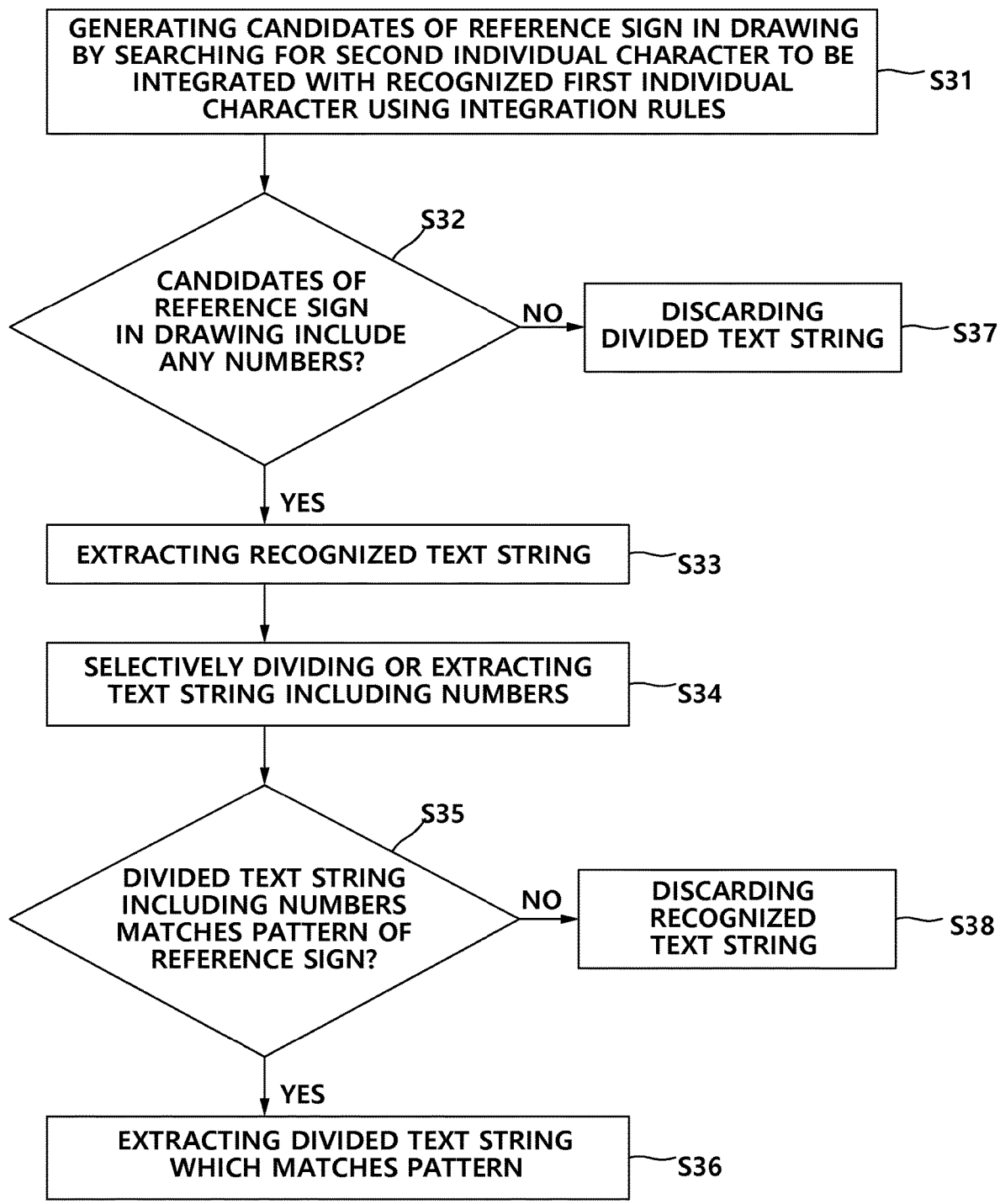
FIG. 9 is a drawing schematically illustrating a process for handling a recognized text string including numbers by the OCR device in accordance with one example embodiment of the present disclosure.

FIG. 9 is a drawing schematically illustrating a process of recognizing the text string including the numbers by the recognizing process 1300 in accordance with one example embodiment of the present disclosure.

As can be seen in FIG. 9, the recognizing process 1300 may include processes of generating the candidates of the reference sign in the drawing at a step of S31 by searching for at least one second individual character to be integrated with a recognized first individual character using one or more integration rules, determining whether the recognized text string includes any number at a step of S32, extracting the recognized text string if any number is included at a step of S33, and discarding the recognized text string if no number is included at a step of S38. After the step of S33, the OCR device 100 may selectively perform division of the text string including the numbers at a step of S34. The OCR device 100 may determine whether the text string including the numbers divided after the step of S33 or S34 matches at least one of pattern rules of the reference sign at a step of S35, may extract the divided text string matching the at least one of the pattern rules at a step of S36 if the divided text string matches the at least one of the pattern rules, and may discard the divided text string at a step of S37 if the divided text string does not match any of the pattern rules.

Most of the character recognition algorithms process one character at a time. Therefore, integration of the recognized individual characters is required to generate one text string. The reference sign in the drawing is not very long in general (less than 8~10 characters), is without any spaces in most cases, and sometimes includes special characters.

In case a specific block is a character block and if another block at a predetermined location in relation to the specific block is also a character block, the recognizing process 1300 may perform connection of the specific block with said another block. Herein, a number or a character like an alphabet is the character block. A location within a predetermined distance, based on a size of the recognized character, from the character block along a direction of recognized character may be one example of the predetermined location. The information on the size may be generated for each of the recognized characters. The information on the size may be determined based on a size, i.e., coordinates, of the character block, i.e., a square.

Because a set of the coordinates corresponds to the character block, coordinates of a center may correspond to the character block. A distance between two neighboring characters is called a character spacing, and in general, the character spacing is much smaller than a size of one character, for example, a space. If the recognized character belongs to characters written horizontally such as alphabets or Korean characters, the OCR device 100 may connect a character within a predetermined distance, e.g., within a distance of 33~200% of the character spacing, in the right direction if the character is oriented in a general direction, e.g., a horizontal direction. For example, the character block, within 33~200% of a longer value among a horizontal size and a vertical size of the character block based on an average of the character block, may be integrated. As another example, another character block, within 10~150% of a longer value among a horizontal size and a vertical size of a specific character block, may be integrated. These rules may be included in the integration rules.

Meanwhile, if the recognized character is vertically oriented, the characters in the vertical direction may be integrated. A text string block may be generated by the connection process above. After the character blocks are connected, the OCR device 100 may recognize the text string.

Meanwhile, symbols, e.g., "-" or "_" without quotes, frequently seen in the reference sign as well as the characters may be regarded as the characters during the connection process. The drawings are composed of many lines, even of dotted lines, and may have many parts that can be recognized as "-" or "_". Therefore, if a specific part of the drawing is recognized as "-" or "_", preliminary integration with character blocks in front and rear may be performed, the integrated text string may be matched against the set of the reference signs in the specification, and may be processed as the reference sign in the drawing only if the integrated text string is included in the set of the reference signs in the specification.

Blocks to be integrated may be searched per each of the character blocks, and the integration may be performed as much as possible within a limit of the integration rules. For example, in case of the reference sign such as "153", the integrated result "153" is preferred to that of "15". A default grouping direction may be from left to right. Herein, the default grouping direction may differ according to countries or orientation of the drawings, e.g., drawings in landscape direction or portrait direction, etc. Apparently, the grouping direction may be left to right or right to left. If a specific character block is included in a group, a grouping process starting from the specific character block may be skipped. That is, if "5" is bound to "1", then a grouping process starting from "5" is not preferred. Meanwhile, the integration rules may be applied starting from "5" in both left and right directions.

Meanwhile, "153" and "267" in the drawing may have many spaces between them like "153 267". Herein, "5" may be bound to "1", "3" may be bound to "5", and since "3" and "2" have many spaces in-between, "5" and "3" may be grouped together and the grouping process may be terminated. Then, if "2" is recognized, then the grouping process may be started from the "2".

A drawing may include many text strings that are not the reference signs. A word or a phrase indicating the text string or a specific subject included in a block diagram may be a typical example. The reference signs are composed of numbers only or at least most of them are numbers in general, however, such text strings hardly include any numbers. Such text strings must be excluded from mapping.

A process of the recognizing process 1300 generating the candidates of the reference sign in the drawing using the text strings that underwent the text string recognition process is described. The recognizing process 1300 may include processes of generating candidates of the reference sign in the drawing at the step of S31 by searching for at least one second individual character to be integrated with the recognized first individual character using the integration rules, determining whether the candidates of the reference sign in the drawing include any numbers at the step of S32, extracting the recognized text string if any number is included at the step of S33, and discarding the recognized text string if no number is included at the step of S38. Herein, if the recognized text string is long, for example, if the recognized text string includes spaces, only the text string including numbers may be extracted or divided from the recognized text string at the step of S34. If the recognized text string does not have any spaces, or if a unit of recognition or extraction at steps of text string recognition or text string extraction is a single word expression, then the process of dividing the text string at the step of S34 may be unnecessary. The single word expression may be a text string without a space, may be a certain string composed of numbers and characters only, or may be a text string which includes the certain string and predetermined symbols in the reference sign in the drawing such as "-" or "_". Preferably, the recognition of the text string at the step of S31 may be performed per a unit of the single word expression.

The recognizing process 1300 may determine whether the text string including the numbers or the single word expression matches at least one of the pattern rules of the reference sign in the drawing at the step of S35, may extract the divided text string matching the at least one of the pattern rules at the step of S36 if the text string including the numbers or the single word expression matches the at least one of the pattern rules, and may discard the text string including numbers at the step of S37 if the text string including the numbers or the single word expression does not match any of the pattern rules.

The pattern rules of the reference sign in the drawing may include at least one of the following.

First, the text string without numbers is not the reference sign in the drawing.

Second, if the text string includes both one or more specific numbers and one or more specific characters, following sub-rules are applied.

1) if the text string begins with a beginning character, a count of the specific characters in a character-only subset including the beginning character is equal to or smaller than a count of the specific numbers.

2) if the text string ends with an ending character, the count of the specific characters in a character-only subset including the ending character is equal to or smaller than the count of the specific numbers.

Third, the symbol in the reference sign in the drawing cannot be the beginning character nor the ending character.

Fourth, a total length of the text string is shorter than a predetermined threshold, e.g., 6~8 characters.

Fifth, punctuation marks or symbols that are not the symbols in the reference signs in the drawing are excluded from the reference sign in the drawing.

The pattern rules of the reference sign in the drawing may be stored in the rule data part 5240.

Meanwhile, when individual characters recognized from the specific drawing are connected, multiple types of the candidates of the reference sign in the drawing may be generated according to connection procedures or connection policies. For example, a text string "25" may be near a text string recognized as "A12" in the specific drawing. The cases where ambiguity is present in distances are common, such as the case where a distance between "A12" and "25" may be longer than the character spacing between "A", "1", and "2" in "A12", but shorter than two characters. Herein, the reference sign in the drawing may be two such as "A12" and "25", but may be "A1225" as the case may be. If such is the case, how far the connection of each of the text strings will be performed can be a problem. In the present disclosure, as long as the reference sign in the specification is not preferentially used at the text string recognition step, the OCR device 100 may generate text strings "A12", "25", and also "A1225", as the candidates of the reference sign in the drawing. In this case, the property information on the reference sign in the drawing such as locations or font sizes for each of the text strings "A12", "25" and "A1225" may be generated.

The recognizing process 1300 may determine the text strings, which match at least one of the pattern rules of the reference sign in the drawing, as the candidates of the reference sign in the drawing. n candidates of the reference sign in the drawing may be generated from a single image, which form the candidate set of the reference signs in the drawing.

Meanwhile, even a large part of the text strings matching at least one of the pattern rules of the reference sign in the drawing may not be the reference sign in the drawing. Part of the reasons are as follows.

First, one of the reasons may be a text string of a sentence type or a phrase type. For example, many words, which include numbers, among words in various sentences or phrases within boxes of the process diagrams match at least one of the pattern rules of the reference sign in the drawing. For example, a text string "A380" which describes an airplane of Airbus matches a part of the pattern rules of the reference sign in the drawing.

Figure 30:
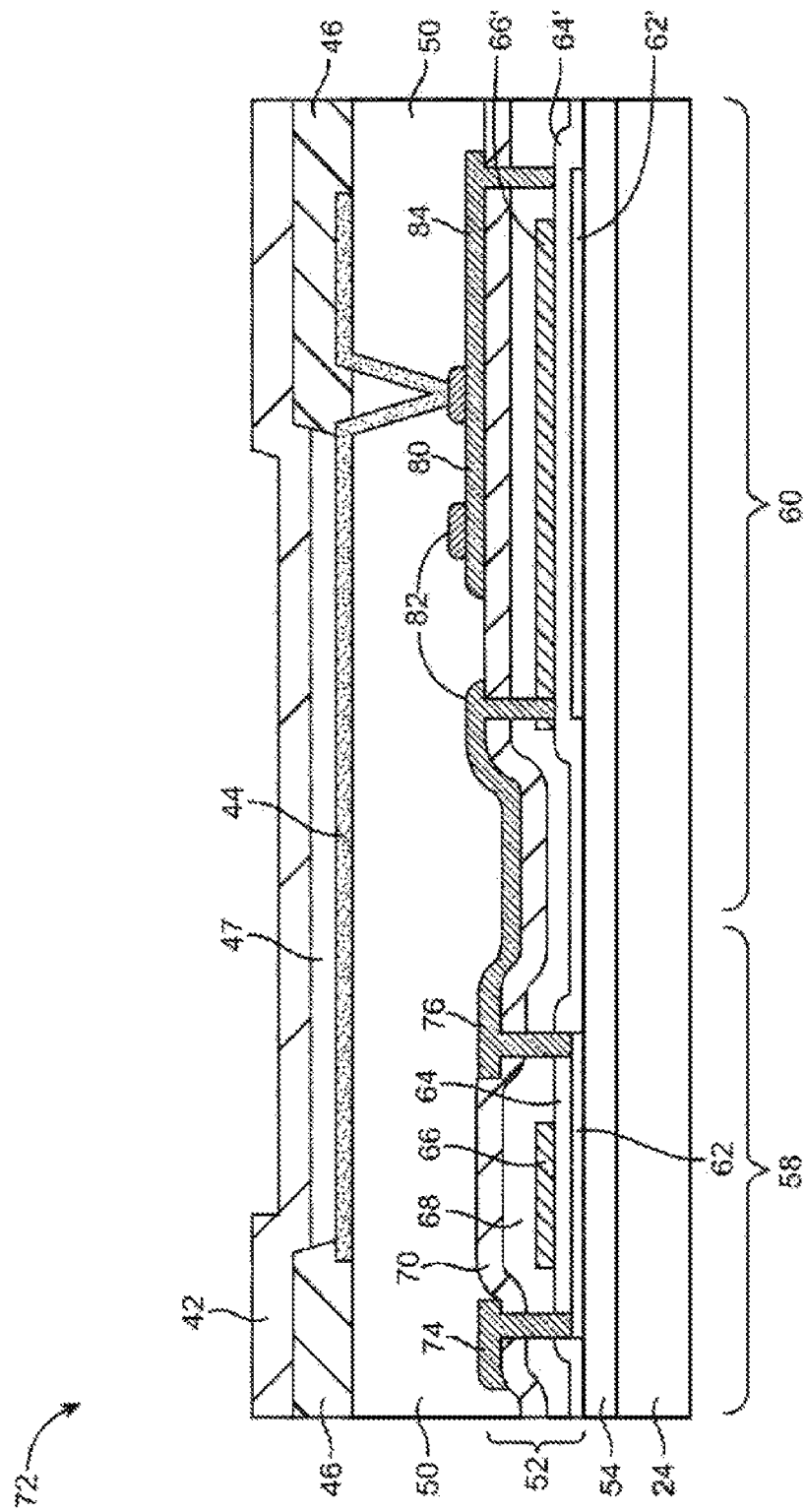
FIG. 30 is a conventional drawing schematically illustrating another example of a patent drawing of a specific patent application file with USPTO before the present disclosure is applied thereto.

Second, if an image mis-recognized as a number or a character is connected with another character or another number, the image may match a part of the pattern rules of the reference sign in the drawing. As can be seen in FIG. 30, if a single drawing has many reference signs, the single drawing tends to have a complex structure. In this case, the single drawing may have multiple reference signs here and there in its image, that is, a density of the reference signs in the image is high, and lines connecting the reference signs in the drawing and components become complex. Then, parts of the image mis-recognized as characters are connected with actual characters and compose wrong text strings.

Third, the parts of the image mis-recognized as characters are connected and outputted as text strings which may match a part of the pattern rules of the reference sign in the drawing. For example, two vertical lines may be recognized as two "1"s and "1" may be recognized as "3" due to its wiggling line and thus a text string "113" may be generated.

The present disclosure proposes two methods for solving the problem above.

Figure 11:
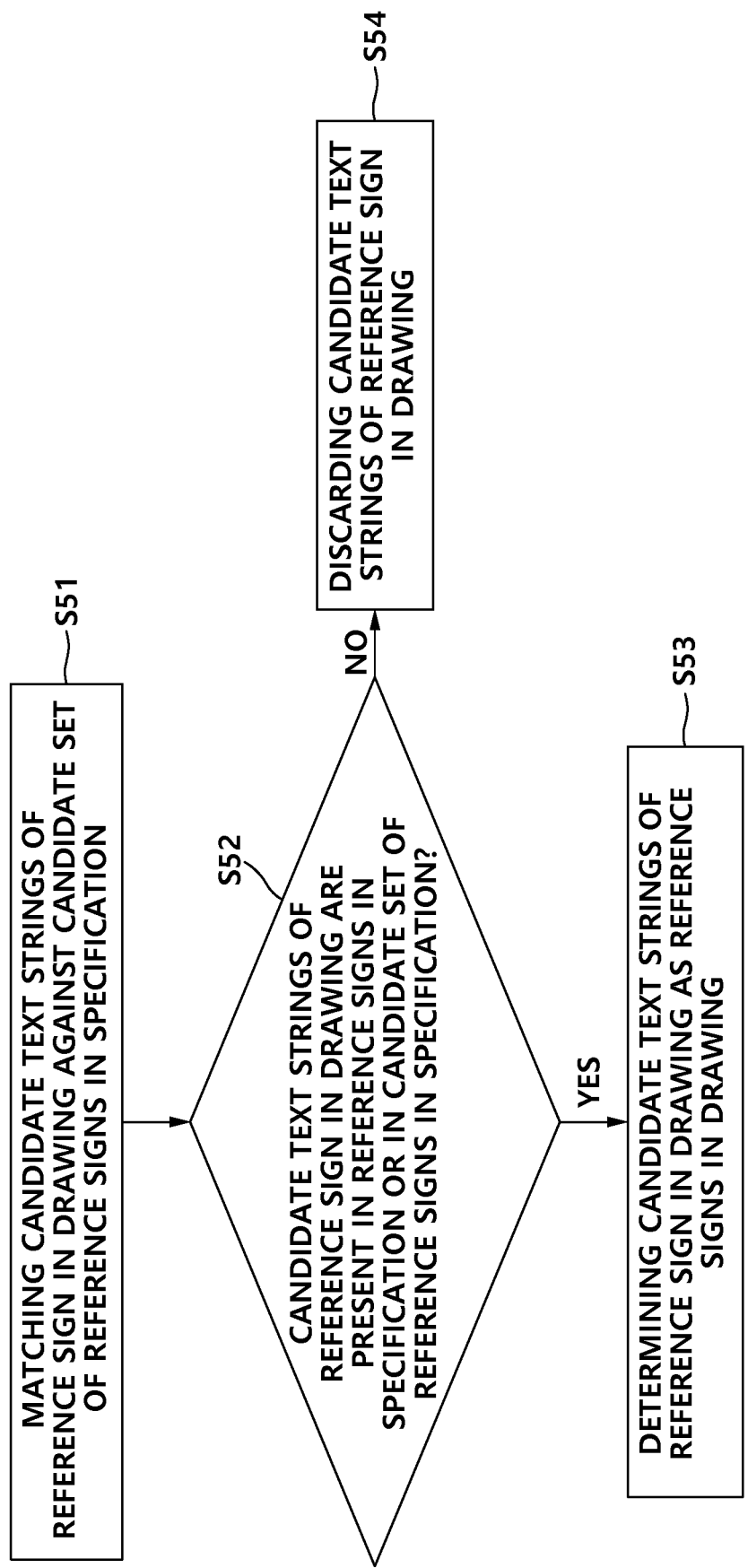
FIG. 11 is a drawing schematically illustrating a process for enhancing accuracy of recognition by matching the reference signs in the drawing with a list of reference signs in a specification by the OCR device in accordance with one example embodiment of the present disclosure.

One is a post-step mapping method in which the reference sign in the specification is mapped onto the acquired candidates of the reference sign in the drawing, and only one or more mapped parts of the candidates of the reference sign in the drawing are determined as the reference sign in the drawing. This method is shown in FIG. 11.

The other is a pre-step filtering method in which the reference sign in the specification is used before the step of generating the candidate set of the reference sign in the drawing. By using the reference sign in the specification, 1) a type of a beginning text string is given, and 2) a text string that can come after a specific text string is given, thus a probability of the mis-recognition decreases from the text string recognition step. Especially, when the character blocks are being connected, a determination process of whether the specific character block is to be connected with another character block is improved. As a result, a problem of the text string being determined accidentally as the reference sign in the drawing via the connection process may be prevented. That is, the text string, which cannot be the reference sign in the drawing due to absence of the reference sign in the specification, is prevented from being determined as the reference sign in the drawing due to the text string becoming the same as the reference sign in the specification and their technical terms being combined via the connection. For this purpose, the set of the reference signs in the specification must be referred to at the step of generating the candidates of the reference sign in the drawing, and thus the set of the reference signs in the specification must be generated in advance.

Therefore, preferably, processes of the reference sign and technical term recognizing device 200 may be performed before processes of the OCR device 100.

Meanwhile, if an expression indicating the drawing such as "figure +number" or "Fig. +number", etc. is present in some paragraphs of the specification corresponding to the candidate set of the reference signs in the specification, the reference sign in the specification in the paragraph may be determined as the reference sign in the specification specialized for a specific drawing, and numbering of the drawings and the reference sign in the specification may be mapped and stored. As a result, the candidate set of the reference signs in the specification may be established per a drawing. If the candidate set of the reference signs in the specification is available for each drawing, a pre-step filtering of the candidate set of the reference signs in the drawing may be processed more finely, by using the available data.

When the reference sign in the specification is mapped onto the candidate set of the actual reference signs in the drawing, ambiguity is surely present. Especially, various ambiguities exist like vague drawings, low resolution, unclear fonts, or too many reference signs. Herein, the candidate set of the reference signs in the specification created for each of the drawings may function as an additional weight factor at the step of processing the candidate of the reference sign in the drawing extracted from a specific drawing.

For example, if accuracy of one specific character among candidate text strings of the specific reference sign in the drawing recognized from the specific drawing is low, for example, if the specific character is not exactly determined as a character "I" or a number "1", then the accuracy of the specific character may be improved by referring to the reference sign in the specification created from a part of the description of the specification related to the specific drawing. In the case of the example, if a character "I" is absent from the drawing 1, then the specific character may be recognized as a number "1" and thus the recognition rate of the text strings is improved.

FIG. 10 is a drawing schematically illustrating a process for integrating the recognized text string by the recognizing process 1330 in accordance with one example embodiment of the present disclosure.

The recognizing process 1330 may search for at least one second individual character to be integrated with the recognized first individual character using the integration rules, at a step of S41. Herein, recognized values of the first individual character or the second individual character are not much important for searching for the second individual character to be integrated. For example, it does not matter if the first individual character is recognized as a number "1" or a lower case "i" when the second individual character to be integrated with the first individual character is searched for. Because there may be the reference sign in the drawing starting with a number "1", or with a lower case "i".

The recognizing process 1330 may determine whether the second individual character to be integrated with the first individual character is present, using the integration rules, at a step of S42. The second individual character may include more than one character. A final integrated text string may be in a form of "first individual character+second individual character+third individual character+ . . . +n-th individual character". If the n-th individual character is included, "first individual character+second individual character+third individual character+ . . . +(n−1)-th individual character" may be excluded from the integration result. That is, in a process of the integration, the longest text string may be a candidate of the reference sign in the drawing. For example, in case that "S1234" is in a specific location of the drawing, and if "S" is recognized, and "1", "2", "3" and "4" near "S" are integrated into "S1234", then "S12" or "S123" is excluded. If "S123" is present in other locations of the same drawing, the candidates of the reference sign in the drawing generated by the recognizing process 1330 may include "S1234" and "S123".

If the second individual character is found by the search, the recognizing process 1330 may generate at least one candidate of the reference sign in the drawing at a step of S43 by integrating a first recognized value of the first individual character with a second recognized value of at least one second individual character. The character recognition cannot always be right, thus more than one of a recognized value and assessment information on the recognition, for example, recognition probabilities, accuracy, recognition levels, etc., may correspond to a candidate character to be recognized. For example, an image part shaped similar to "1" may be recognized as a number or a lower case "i", and the recognition algorithm may generate the assessment information for each of the recognized values. Therefore, when multiple recognition candidates each of which has one or more recognized values are being integrated, one or more reference signs in the drawing may be generated. A ranking or summarized assessment information on the recognition may correspond to each of the reference signs in the drawing.

The recognizing process 1330 may match the candidate with a higher priority of the reference sign in the drawing against the set of the reference signs in the specification based on the ranking or the summarized assessment information on the recognition at a step of S44. After transmitting a query asking whether the generated candidate of the reference sign in the drawing is in the set of the reference signs in the specification at a step of S45, if the generated candidate is in the set, then the generated candidate is determined as the reference sign in the drawing at a step of S46. Herein, a single candidate of the reference sign in the drawing may correspond to one or more reference signs in the specification. Then the OCR device 100 may generate mapping data (1:1 or 1:n) between the reference sign in the drawing and its corresponding technical term using the reference sign in the specification, at a step of S47. If the generated candidate of the reference sign in the drawing is determined as not in the set of the reference signs in the specification in response to the query, then the mapping data may not be generated, or a greedy search may be selectively performed at a step of S48. The greedy search may determine every combination of recognized values of the recognition candidates or of the recognized values satisfying a certain condition, as the candidate of the reference sign in the drawing, and may query the set of the reference signs in the specification at a step of S46.

In general, the reference sign in the drawing of a single character is hardly used, but does exist. Therefore, absence of the second individual character requires attention. Because the character recognition is prone to errors, and various image elements, e.g., a line, a dotted line, a curved line, etc., of the drawing pulled out of the context as small boxes may be recognized as characters. As a result, lots of noises are present. For example, part of a vertical line contained in a box may be recognized as a number "1", an upper case "I", or a lower case "L". Especially, if the drawings include a number "1", "I", or a lower case "L", then noises occur at many parts of the drawing.

If no second individual character is present, the recognizing process 1330 may query whether the first individual character is much larger or smaller than an average size at a step of S49-1. The OCR device 100 may calculate the average size of the reference signs in the drawing to be recognized. If the reference sign in the specification, that is to be mapped onto the candidate of the reference sign in the drawing in the 1:1 relationship, is determined as present at the step of S22, the OCR device 100 may acquire size information on individual characters and calculate the average size using the candidate of the reference sign in the drawing. Because the font sizes of the reference signs in the drawing in a single drawing or in a single patent do not vary much in general.

The recognizing process 1330 may determine the first individual character as noise at a step of S49-2 if the first individual character is much larger or smaller than the average size, and may match the generated candidate of the reference sign in the drawing against the set of the reference signs in the specification at a step of S49-3 if the first individual character is not much larger or smaller than the average size. After transmitting a query asking whether the generated candidate of the reference sign in the drawing is in the set of the reference signs in the specification at a step of S49-4, if the generated candidate is in the set, then the generated candidate is determined as the reference sign in the drawing at a step of S49-5, but if the generated candidate is not in the set, then the generated candidate is determined as noise at a step of S49-6.

FIG. 11 is a drawing schematically illustrating a process of generating the property information of the reference sign in the drawing by the generating process 1400 in accordance with one example embodiment of the present disclosure. The generating process 1400 may include a process S51 of matching candidate text strings of the reference sign in the drawing against the candidate set of the reference signs in the specification, a process S52 of determining whether the candidate text strings of the reference sign in the drawing are present in the reference signs in the specification or in the candidate set of the reference signs in the specification, a process S53 of determining the candidate text strings of the reference sign in the drawing as the reference signs in the drawing if the candidate text strings of the reference sign in the drawing are present, and a process S54 of discarding the candidate text strings of the reference sign in the drawing if the candidate text strings of the reference sign in the drawing are not present.

Processing of the property information on the reference sign in the drawing is described below. The generating process 1400 may generate and store the property information on the candidates of the reference sign in the drawing when the text strings corresponding to the candidates of the reference sign in the drawing are being recognized. The property information on the reference sign in the drawing may include (i) locations of the reference sign in the drawing, that is, coordinates of four vertices corresponding to a square block of the reference sign in the drawing, (ii) the font size of the reference sign in the drawing, (iii) orientation, that is, right, top, bottom, etc., (iv) composition, that is, composition of numbers only, of numbers and non-numeric text, etc., (v) a length of the text string, that is, a count of the characters, (vi) a specific drawing where the reference sign appears, and (vii) a total count of the reference sign in the drawing.

Next, generation of data on the reference sign in the specification and its corresponding technical term by the reference sign and technical term recognizing device 200 is described. The generation of the data on the reference sign in the specification and its corresponding technical term may be preferably performed before recognition of the reference sign from the drawing.

Figure 12:
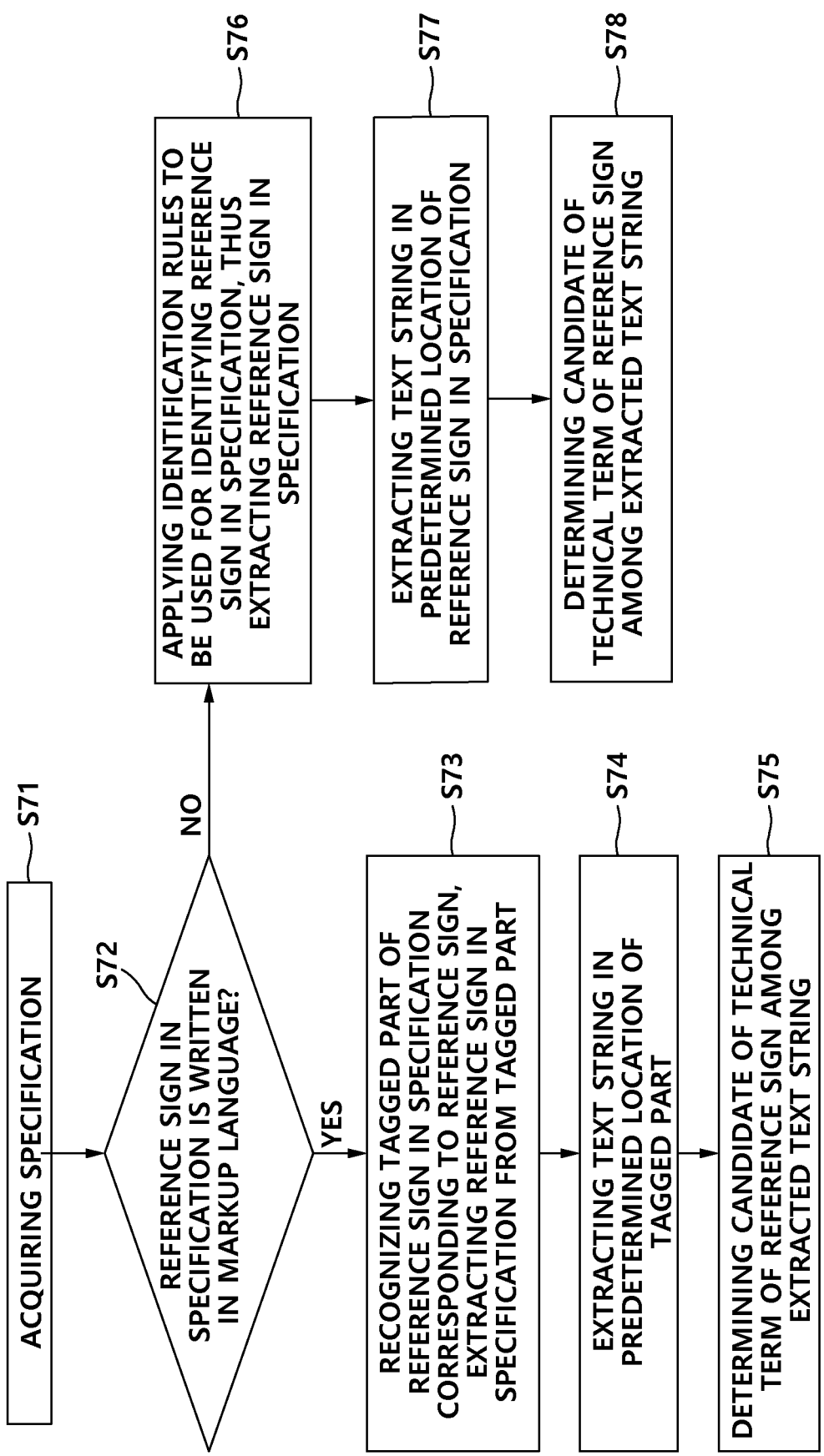
FIG. 12 is a drawing schematically illustrating a process for recognizing the reference sign and its technical term in the specification by the reference sign and technical term recognizing device in accordance with one example embodiment of the present disclosure.

FIG. 12 is a drawing schematically illustrating a process of generating the reference sign in the specification and its corresponding technical term by the reference sign and technical term recognizing device 200 in accordance with one example embodiment of the present disclosure.

The data on the reference sign in the specification and its corresponding technical term may be generated by processing specification data. The data on the reference sign in the specification may be written in the markup language such as XML or in plain text without tags. The reference sign and technical term recognizing device 200 may acquire the specification at a step of S71, and may determine whether the reference sign in the specification is written in the markup language at a step of S72. If the reference sign in the specification is written in the markup language, a tagged part of the reference sign in the specification corresponding to the reference sign may be recognized, the reference sign in the specification may be extracted from the tagged part at a step of S73, a text string in a predetermined location of the tagged part may be extracted at a step of S74, and a candidate of the technical term of the reference sign may be determined from the extracted text string at a step of S75.

For example, content of the specification extracted from a markup language file of U.S. patent application Ser. No. 14/249,716 is shown as below.

Hybrid oxide-silicon thin-film transistor structures such as illustrative thin-film transistor structures <b>302</b> of <figref idrefs="DRAWINGS">FIG. 10</figref> may be used in forming CMOS-type circuitry in display driver circuitry such as gate driver circuitry <b>18</b> and demultiplexer circuitry <b>20</b>. As shown in <figref idrefs="DRAWINGS">FIG. 10</figref>, structures <b>302</b> may have a polysilicon layer <b>308</b> that is formed on substrate <b>24</b>. P-channel active area <b>310</b> may be formed under gate <b>312</b>. Gate insulator layer <b>306</b> (e.g., silicon oxide) may separate gate 312 from silicon channel region 310 in silicon layer 308. Dielectric layer 302 (e.g., sublayers of silicon oxide and silicon nitride) may cover gate 312. Dielectric layer 306 may separate gate 312 from overlapping oxide layer 312. Oxide layer 312 may be a semiconducting oxide such as IGZO material.

A text string "<figref idrefs="DRAWINGS">FIG. 10</figref>" shows that this paragraph is related to "FIG. 10". Meanwhile, in the example above, the reference sign in the specification is in between <b> tags, and "<b>text string</b>" is the tagged part of the reference sign in the specification. The reference sign and technical term recognizing device 200 may process the tagged part of the reference sign in the specification, to thereby extract the reference sign in the specification. Then, the reference sign and technical term recognizing device 200 may extract the text string in the predetermined location of the tagged part at a step of S74. For example, while reading the text string in a reverse direction from a starting point, i.e., the <b> tag in front, of the reference sign in the specification, the reference sign and technical term recognizing device 200 may extract the text string until one or more candidate conditions, as below examples, of the technical term of the reference sign are satisfied.

If the text string is in English, 1) the text string right before the first indefinite article is reached 2) the text string right before the first "the said", "said" or "the" is reached 3) the text string right before a predetermined expression related to the candidate of the technical term of the reference sign is reached, such as "at least NUMBER", "one or more", etc.

4) the text string until the first plural noun, if no text string satisfying the condition 1) or 2) is present until a predetermined n-th word 5) the text string right until the starting point of the sentence, while none of 1), 2), and 3) is satisfied The candidate conditions of the reference sign may be stored in the rule data part 5240.

If the text string is in Korean, etc., not in English, then an expression, e.g., "상기", corresponding to "the" or "the said" may be used in place of definite articles or "the said".

The reference sign and technical term recognizing device 200 may acquire the specification at the step of S71, and may determine whether the specification is written in the markup language at the step of S72. If the specification is not written in the markup language, the reference sign and technical term recognizing device 200 may apply one or more identification rules to be used for identifying the reference sign in the specification, to thereby extract the reference sign in the specification at a step of S76, may extract a text string in a predetermined location of the reference sign in the specification at a step of S77, and may determine a candidate of the technical term of the reference sign from the extracted text string at a step of S78.

If explicit regularity is present, such as a manner of expressing the reference sign in the specification, for example, 1) "left parenthesis+reference sign in specification+right parenthesis", then such a rule is additionally used as the identification rules. For reference, in a Korean specification, the reference sign in the specification is customarily inside parentheses. Since the parentheses may include other text strings that are not the reference sign in the specification, following conditions may be applied when the reference sign in the specification is determined from the text strings inside the parentheses. Meanwhile, if no customary identification rules such as parentheses are available, equivalent conditions may be applied to the case of a non-explicit form such as "space+reference sign in specification+space", etc.

First, the text string including more than a single word, that is, including a space, is not the reference sign in the specification.

Second, the text string without any numbers is not the reference sign in the specification.

Third, if the text string includes both one or more specific numbers and one or more specific characters, following sub-rules are applied.

1) if the text string begins with a beginning character, a count of the specific characters in a character-only subset including the beginning character is equal to or smaller than a count of the specific numbers.

2) if the text string ends with an ending character, the count of the specific characters in a character-only subset including the ending character is equal to or smaller than the count of the specific numbers.

Fourth, the symbol in the reference sign in the specification cannot be the beginning character nor the ending character.

Fifth, a total length of the text string is shorter than a predetermined threshold, e.g., 6~7 characters.

Sixth, punctuation marks or symbols that are not the symbols in the reference signs in the specification are excluded from the reference sign in the specification.

The identification rules to be used for identifying the reference sign in the specification may be stored in the rule data part 5240.

A process of determining the technical term of the reference sign, if the reference sign in the specification is determined from a specification not written in the markup language, is similar to the process using the specification in the markup language.

In principle, the reference sign in the specification and the candidate of the technical term of the reference sign must satisfy a 1:1 relationship based on a consistency in expressions within a single specification, however, such a relationship may not always be satisfied. The reasons include the following.

First, mistakes or errors by a person writing the specification. That is, different expressions are used for a same reference sign in the specification, or a same expression is used for different reference signs in the specification.

Second, mistakes or errors in a specification writing program, a specification computerizing program, or a specification processing program.

Third, unpreparedness of the candidate conditions of the technical term of the reference sign or incompleteness of programs applying the candidate conditions. Try as one might to prepare the candidate conditions in various and strict ways, 1) an expression falling on an outside of the boundary of the candidate conditions is bound to exist, and 2) an exception may occur in prioritization or collision among the candidate conditions.

Herein, determination that which technical term of the reference sign is mapped onto which reference sign in the specification becomes important. Its process is described by referring to FIGS. 13 to 15.

Figure 13:
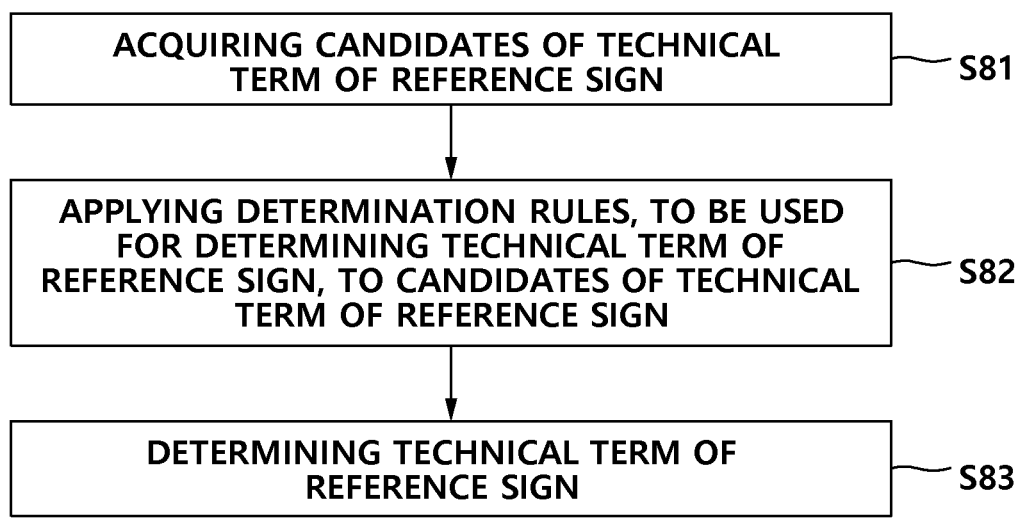
FIG. 13 is a drawing schematically illustrating a process for mapping between the reference signs and their technical terms in the specification by the reference sign and technical term recognizing device in accordance with one example embodiment of the present disclosure.

FIG. 13 is a drawing schematically illustrating a process of determining the technical term of the reference sign by the reference sign and technical term recognizing device 200 in accordance with one example embodiment of the present disclosure.

As can be seen in FIG. 13, the reference sign and technical term recognizing device 200 may acquire candidates of the technical term of the reference sign at a step of S81, may apply one or more determination rules, to be used for determining the technical term of the reference sign, to the candidates of the technical term of the reference sign at a step of S82, and may determine the technical term of the reference sign at a step of S83.

Figure 14:
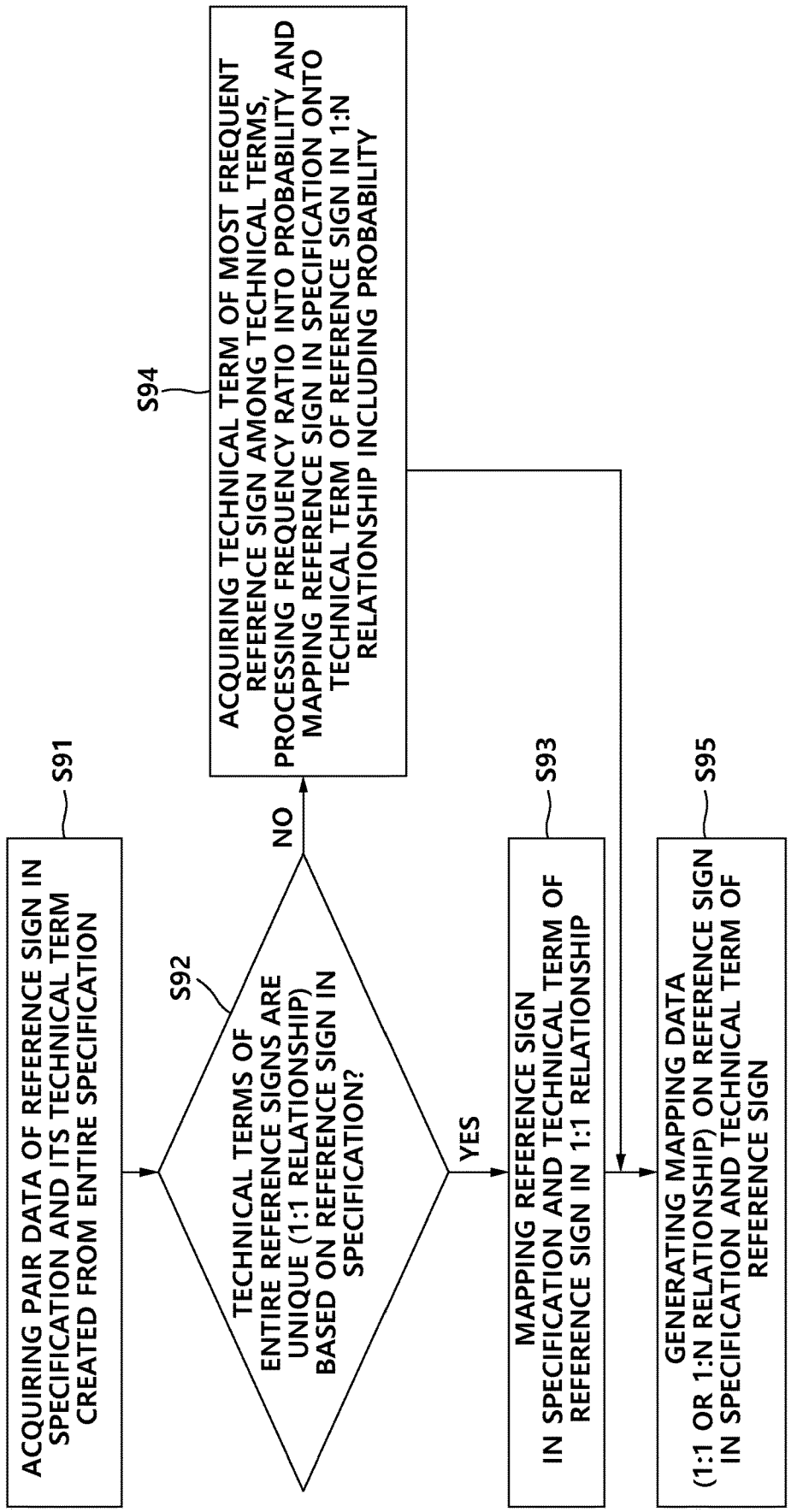
FIG. 14 is a drawing schematically illustrating a process for the mapping between the reference signs and their corresponding technical terms in the specification before generating mapping data between the reference signs in the drawing and their corresponding technical terms by the reference sign and technical term recognizing device in accordance with one example embodiment of the present disclosure.

FIG. 14 is a drawing schematically illustrating a process of the mapping between the reference sign in the specification and its corresponding technical term before generating mapping data between the reference sign in the drawing and its corresponding technical term by the reference sign and technical term recognizing device 200 in accordance with one example embodiment of the present disclosure.

As can be seen in FIG. 14, the reference sign and technical term recognizing device 200 may acquire pair data of the reference sign in the specification and its corresponding technical term at a step of S91 created from the entire specification, may determine at a step of S92 whether the technical terms of entire reference signs are unique (1:1 relationship) based on the reference sign in the specification, and map the reference sign in the specification and the technical term of the reference sign in a 1:1 relationship at a step of S93 if the technical terms are unique. Meanwhile, if the 1:1 relationship is absent, the reference sign and technical term recognizing device 200 may apply the determination rules. The reference sign and technical term recognizing device 200 may acquire the technical term of the most frequent reference sign among the technical terms of the reference signs, may process a frequency ratio into a probability and map the reference sign in the specification onto the technical term of the reference sign in a 1:n relationship with information on the probability at a step of S94, and may generate mapping data (1:1 or 1:n relationship) on the reference sign in the specification and the technical term of the reference sign at a step of S95.

Figure 15:
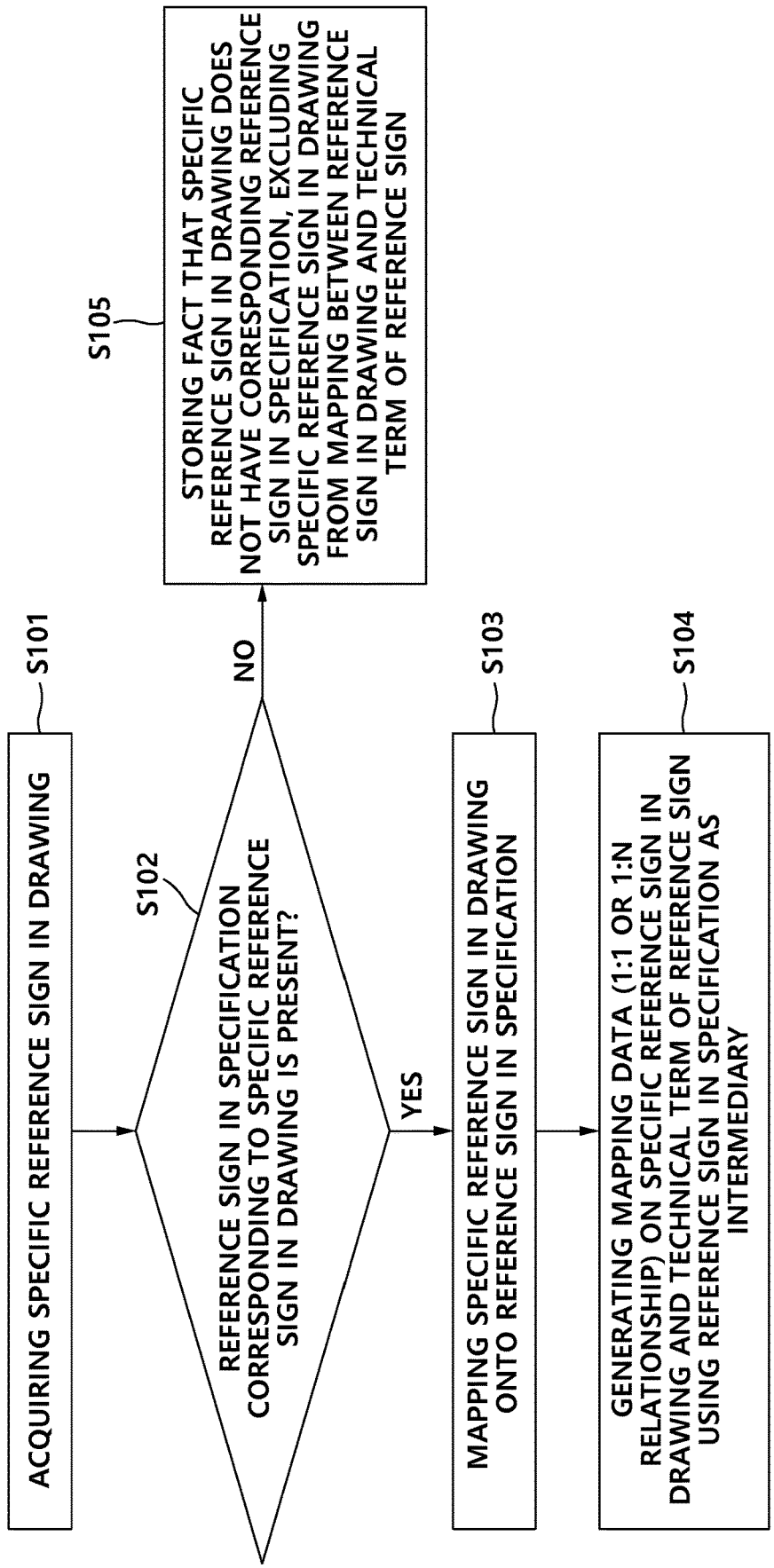
FIG. 15 is a drawing schematically illustrating a process for generating mapping data between the reference signs in the drawing and their corresponding technical terms using the reference signs in the specification as an intermediary by the reference sign and technical term recognizing device in accordance with one example embodiment of the present disclosure.

FIG. 15 is a drawing schematically illustrating a process of generating mapping data (1:1 or 1:n relationship) between the reference sign in the drawing and its corresponding technical term using the reference sign in the specification as an intermediary by the reference sign and technical term recognizing device 200 in accordance with one example embodiment of the present disclosure.

As can be seen in FIG. 15, the reference sign and technical term recognizing device 200 may acquire a specific reference sign in the drawing at a step of S101, may determine whether the reference sign in the specification corresponding to the specific reference sign in the drawing is present at a step of S102, may map the specific reference sign in the drawing onto the reference sign in the specification at a step of S103 if the reference sign in the specification is present, may generate mapping data (1:1 or 1:n relationship) on the specific reference sign in the drawing and the technical term of the reference sign using the reference sign in the specification as an intermediary at a step of S104, may store a fact that the specific reference sign in the drawing does not have the corresponding reference sign in the specification if the reference sign in the specification is not present, and may exclude the specific reference sign in the drawing from a mapping process between the reference sign in the drawing and the technical term of the reference sign at a step of S105.

Data generation by the reference sign and technical term recognizing device 200 in accordance with the present disclosure is described by taking examples.

For example, the content of the specification extracted from the markup language file of U.S. patent application Ser. No. 14/249,716 is shown as below.

Hybrid oxide-silicon thin-film transistor structures such as illustrative thin-film transistor structures <b>302</b> of <figref idrefs="DRAWINGS">FIG. 10</figref> may be used in forming CMOS-type circuitry in display driver circuitry such as gate driver circuitry <b>18</b> and demultiplexer circuitry <b>20</b>. As shown in <figref idrefs="DRAWINGS">FIG. 10</figref>, structures <b>302</b> may have a polysilicon layer <b>308</b> that is formed on substrate <b>24</b>. P-channel active area <b>310</b> may be formed under gate <b>312</b>. Gate insulator layer <b>306</b> (e.g., silicon oxide) may separate gate <b>312</b> from silicon channel region <b>310</b> in silicon layer <b>308</b>. Dielectric layer <b>302</b> (e.g., sublayers of silicon oxide and silicon nitride) may cover gate <b>312</b>. Dielectric layer <b>306</b> may separate gate <b>312</b> from overlapping oxide layer <b>312</b>. Oxide layer <b>312</b> may be a semiconducting oxide such as IGZO material.

When the candidate conditions are applied, the candidate set of the technical terms of the reference signs like FIG. 7 below may be generated from the contents of the specification mentioned above.

Data as in Table 7 below may be stored in the specification-based data part 5220.

TABLE 7

| PATENT IDENTIFIER | DRAWING IDENTIFIER | REFERENCE SIGN IN SPECIFICATION | TECHNICAL TERM CANDIDATE OF REFERENCE SIGN | COUNT OF APPEARANCES |
|---|---|---|---|---|
| 14249716 | 14249716-pct00010.tif | 302 | thin-film transistor structures | 1 |
| 14249716 | 14249716-pct00010.tif | 18 | Gate driver circuitry | 1 |
| 14249716 | 14249716-pct00010.tif | 20 | demultiplexer circuitry | 1 |
| 14249716 | 14249716-pct00010.tif | 302 | structures | 1 |
| 14249716 | 14249716-pct00010.tif | 308 | polysilicon layer | 1 |
| 14249716 | 14249716-pct00010.tif | 24 | substrate | 1 |
| 14249716 | 14249716-pct00010.tif | 310 | P-channel active area | 1 |
| 14249716 | 14249716-pct00010.tif | 312 | gate | 1 |
| 14249716 | 14249716-pct00010.tif | 306 | gate insulator layer | 1 |
| 14249716 | 14249716-pct00010.tif | 312 | gate | 1 |
| 14249716 | 14249716-pct00010.tif | 310 | silicon channel region | 1 |
| 14249716 | 14249716-pct00010.tif | 308 | silicon layer | 1 |
| 14249716 | 14249716-pct00010.tif | 302 | dielectric layer | 1 |
| 14249716 | 14249716-pct00010.tif | 312 | gate | 1 |

TABLE 7-continued

| PATENT IDENTIFIER | DRAWING IDENTIFIER | REFERENCE SIGN IN SPECIFICATION | TECHNICAL TERM CANDIDATE OF REFERENCE SIGN | COUNT OF APPEARANCES |
|---|---|---|---|---|
| 14249716 | 14249716-pct00010.tif | 306 | dielectric layer | 1 |
| 14249716 | 14249716-pct00010.tif | 312 | gate | 1 |
| 14249716 | 14249716-pct00010.tif | 312 | oxide layer | 1 |
| 14249716 | 14249716-pct00010.tif | 312 | oxide layer | 1 |

As can be seen in Table 7 above, different technical terms of the reference signs may correspond to a same reference sign like the reference signs 302, 308, 310, and 312. Such 1:n relationship (n is a natural number) is common in reality, aside from a fact that the relationship may represent the ambiguousness. Due to these reasons, the technical term corresponding to the reference sign in the specification cannot be systematically determined in the specification.

The reference sign and technical term recognizing device 200 may generate data as in Table 7 above from the entire specification, and generate data as in Table 8 below based on the reference sign in the specification.

In the present disclosure, if two or more candidates of the technical term of the reference sign correspond to a same reference sign in the specification, the reference sign and technical term recognizing device 200 may apply the determination rules, as follows for example, when the technical term of the reference sign is to be determined.

1) the candidate of the technical term of the most frequent reference sign based on the reference sign in the specification 2) the candidate of the technical term of the reference sign to which mapping information is applied preferentially, if the mapping information between the reference sign in the specification and the technical term of the reference sign is present within the specification 3) the longest candidate of the technical term of the reference sign if 1) or 2) is absent The determination conditions of the reference sign may be stored in the rule data part 5240.

TABLE 8

| PATENT IDENTIFIER | DRAWING IDENTIFIER | REFERENCE SIGN IN SPECIFICATION | TECHNICAL TERM OF REFERENCE SIGN | FREQUENCY | PROBABILITY |
|---|---|---|---|---|---|
| 14249716 | 14249716-pct00010.tif | 18 | gate driver circuitry | 11 | 52.4% |
| 14249716 | 14249716-pct00010.tif | 18 | display driver circuitry | 4 | 19.0% |
| 14249716 | 14249716-pct00010.tif | 18 | circuitry | 3 | 14.3% |
| 14249716 | 14249716-pct00010.tif | 18 | gate line driver circuitry | 1 | 4.8% |
| 14249716 | 14249716-pct00010.tif | 18 | peripheral circuitry | 1 | 4.8% |
| 14249716 | 14249716-pct00010.tif | 18 | driver circuitry | 1 | 4.8% |
| 14249716 | 14249716-pct00010.tif | 24 | substrate | 16 | 100.0% |
| 14249716 | 14249716-pct00010.tif | 20 | demultiplexer circuitry | 10 | 90.9% |
| 14249716 | 14249716-pct00010.tif | 20 | demultiplexing circuitry | 1 | 9.1% |
| 14249716 | 14249716-pct00010.tif | 312 | gate | 6 | 60.0% |
| 14249716 | 14249716-pct00010.tif | 312 | oxid layer | 4 | 40.0% |
| 14249716 | 14249716-pct00010.tif | 310 | P-channel active area | 1 | 33.3% |
| 14249716 | 14249716-pct00010.tif | 310 | silicon layer | 1 | 33.3% |
| 14249716 | 14249716-pct00010.tif | 310 | silicon channel region | 1 | 33.3% |
| 14249716 | 14249716-pct00010.tif | 308 | silicon layer | 2 | 66.6% |
| 14249716 | 14249716-pct00010.tif | 308 | polysilicon layer | 1 | 33.3% |
| 14249716 | 14249716-pct00010.tif | 302 | dielectric layer | 1 | 33.3% |
| 14249716 | 14249716-pct00010.tif | 302 | thin-film transistor structures | 1 | 33.3% |
| 14249716 | 14249716-pct00010.tif | 302 | structures | 1 | 33.3% |
| 14249716 | 14249716-pct00010.tif | 306 | gate insulator layer | 1 | 50.0% |
| 14249716 | 14249716-pct00010.tif | 306 | dielectric layer | 1 | 50.0% |

The reference sign and technical term recognizing device 200 may generate (i) mapping data between the reference sign in the specification and the technical term of the reference sign, and (ii) the property information on the technical term of the reference sign, as in Table 9 below. Data as in Table 9 below show an example of the information set on the mapping between the reference sign and its corresponding technical term generated from the generating process 2400 in accordance with the present disclosure.

TABLE 9

| PATENT IDENTIFIER | DRAWING IDENTIFIER | REFERENCE SIGN IN SPECIFICATION | TECHNICAL TERM OF REFERENCE SIGN | FREQUENCY | PROBABILITY | WORD COUNT | COUNT OF CHARACTERS |
|---|---|---|---|---|---|---|---|
| 14249716 | 14249716-pct00010.tif | 18 | gate driver circuitry | 11 | 52.4% | 3 | 22 |

TABLE 9-continued

| PATENT IDENTIFIER | DRAWING IDENTIFIER | REFERENCE SIGN IN SPECIFICATION | TECHNICAL TERM OF REFERENCE SIGN | FREQUENCY | PROBABILITY | WORD COUNT | COUNT OF CHARACTERS |
|---|---|---|---|---|---|---|---|
| 14249716 | 14249716-pct00010.tif | 24 | substrate | 16 | 100.0% | 1 | 10 |
| 14249716 | 14249716-pct00010.tif | 20 | demultiplexer circuitry | 10 | 90.9% | 2 | 24 |
| 14249716 | 14249716-pct00010.tif | 312 | gate | 6 | 60.0% | 1 | 5 |
| 14249716 | 14249716-pct00010.tif | 310 | silicon channel region | 1 | 33.3% | 3 | 23 |
| 14249716 | 14249716-pct00010.tif | 308 | silicon layer | 2 | 66.6% | 2 | 14 |
| 14249716 | 14249716-pct00010.tif | 302 | thin-film transistor structures | 1 | 33.3% | 3 | 32 |
| 14249716 | 14249716-pct00010.tif | 306 | gate insulator layer | 1 | 50.0% | 3 | 21 |

The data as in Table 9 above may be stored in the specification-based data part 5220, and the statistics data may also be stored in the statistic data part 5250. The count of characters may be used to generate the placement data to be used for placing the technical term of the reference sign. The longer the technical term of the reference sign is, the larger the free space where the technical term is to be displayed has to be, and if the technical term is long, the possibility of collision/overlap with other technical terms increases, thus if many of the technical terms are long, the placement of the technical terms of the reference signs becomes important.

FIG. 15 is a drawing schematically illustrating a process of generating mapping data (1:1 or 1:n relationship) between the reference sign in the drawing and its corresponding technical term using the reference sign in the specification as an intermediary by the reference sign and technical term recognizing device 200 in accordance with one example embodiment of the present disclosure.

As can be seen in FIG. 15, the reference sign and technical term recognizing device 200 may acquire a specific reference sign in the drawing at the step of S101, may determine whether the reference sign in the specification corresponding to the specific reference sign in the drawing is present at the step of S102, may map the specific reference sign in the drawing onto the reference sign in the specification at the step of S103 if the reference sign in the specification is present, may generate mapping data (1:1 or 1:n relationship) on the specific reference sign in the drawing and the technical term of the reference sign using the reference sign in the specification as an intermediary at the step of S104. Meanwhile, if the reference sign in the specification corresponding to the reference sign in the drawing is not present, the reference sign and technical term recognizing device 200 may store the fact that the specific reference sign in the drawing does not have the corresponding reference sign in the specification, and may exclude the specific reference sign in the drawing from the mapping process between the reference sign in the drawing and the technical term of the reference sign at the step of S105.

If the mapping information between the reference sign in the drawing and the technical term of the reference sign is generated by the processes above, the technical term of the reference sign may be ready to be displayed around the reference sign in the drawing.

First, to display the technical term around the reference sign in the drawing, the placement data for the technical term of the reference sign may be generated, which is data on how the technical term of the reference sign is to be placed on an image including the reference sign in the drawing. A main idea of generating the placement data may be searching areas around the reference sign in the drawing inside physical boundaries (top, left, right, and bottom) of the drawing for the free space where the technical term or its translation of the reference sign of the reference sign is to be placed.

Figure 16:
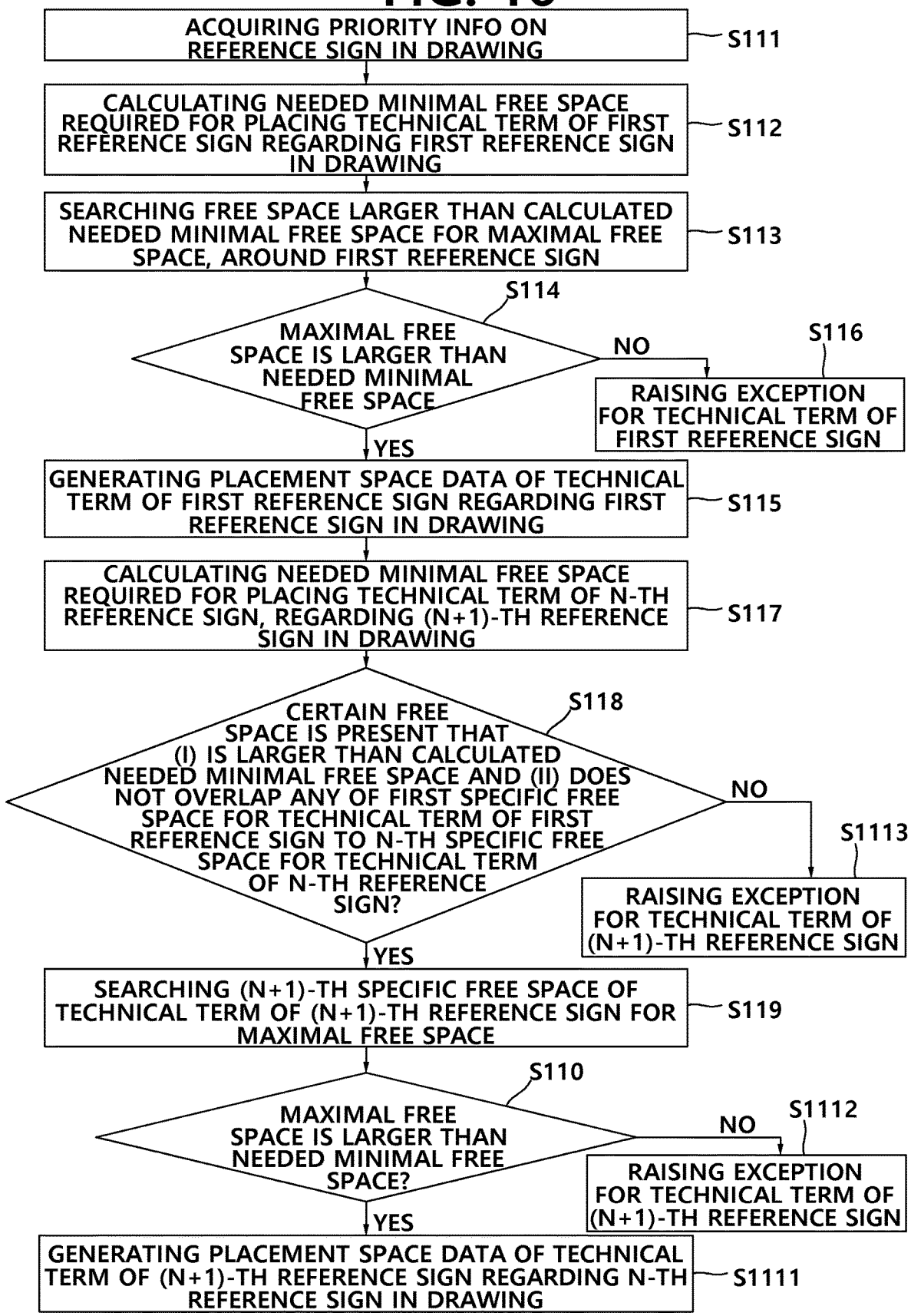
FIG. 16 is a drawing schematically illustrating a process of generating placement data for the technical terms of the reference signs by the integrating server in accordance with one example embodiment of the present disclosure.

FIG. 16 is a drawing schematically illustrating a process of generating placement data for the technical term of the reference sign by the placing process 3100 in accordance with one example embodiment of the present disclosure.

The placing process 3100 may acquire priority information on the reference sign in the drawing at a step of S111. If no priority information is available, the reference sign in the drawing is processed randomly. The order of processing exists even when the reference sign in the drawing is processed randomly, and the order of processing becomes the priority information. The priority information represents a ranking of the reference signs in the specification which is based on locations, a frequency, etc. on the specification. Herein, the reference sign in the drawing and the reference sign in the specification have a same value. The placing process 3100 may calculate a needed minimal free space required for placing the technical term of a first reference sign in the drawing which has top priority, at a step of S112. The needed minimal free space processed by the estimating process 3111 may depend mainly on a length and the number, e.g., one line or two lines, of lines of the technical term of the reference sign having a specific font size.

The estimating process 3111 may search the free space larger than the needed minimal free space for a maximal free space, around the first reference sign at a step of S113. A query asking whether the maximal free space is larger than the needed minimal free space may be transmitted at a step of S114. Herein, if the maximal free space is larger, placement space data of the technical term of the first reference sign in the drawing may be generated at a step of S115, but if the maximal free space is not larger, then an exception for the technical term of the first reference sign is raised at a step of S116.

The estimating process 3111 may calculate a needed minimal free space required for placing the technical term of an (n+1)-th reference sign in the drawing at a step of S117, and may transmit a query asking whether a certain free space is present that (i) is larger than the needed minimal free space and (ii) does not overlap any of a first specific free space for the technical term of a first reference sign to an n-th specific free space for the technical term of an n-th reference sign, at a step of S118. If the certain free space is present, the maximal free space may be searched for, around an (n+1)-th specific free space for the technical term of an (n+1)-th reference sign at a step of S119. Then, a query asking if the maximal free space is larger than the needed minimal free space is transmitted at a step of S110, and if the maximal free space is larger then placement space data of the technical term of the (n+1)-th reference sign in the drawing may be generated at a step of S1111. If the maximal free space is not larger, then an exception is raised for the technical term of the (n+1)-th reference sign at a step of S1112. If an answer to the query at the step of S119 is negative, an exception is raised for the technical term of the (n+1)-th reference sign at a step of S1113.

Meanwhile, the placing process 3100 may search for the needed minimal free space of the reference sign for each of the reference signs in the drawing, may determine if the needed minimal free space overlaps two or more of the reference signs in the drawing, and may separate the set of the reference signs in the drawing with the overlaps and the set of the reference signs in the drawing without the overlaps. The placing process 3100 may (i) generate placement strategy data on placement of the reference sign in the set of the reference signs in the drawing with the overlaps and generate the placement data on the reference sign by referring to the placement strategy data, or (ii) generate the placement strategy data on the placement of the reference sign in the set of the reference signs in the drawing without the overlaps and generate the placement data on the reference sign by referring to the placement strategy data.

If the technical term of the reference sign is present then a length, i.e., the count of total characters, of the technical term of the reference sign is known, therefore the estimating process 3111 may calculate information on a size and a shape of a specific free space required for displaying the technical term of the reference sign according to the font and the font size by which the technical term of the reference sign is to be written. The information on the size and the shape of the specific free space may vary depending on how many lines are to be used for displaying the technical term of the reference sign.

A basic searching process for the needed minimal free space for the technical term of the reference sign may be, for each technical term of the reference sign, searching areas near, i.e., right, bottom, top, etc., the mapped reference sign in the drawing for the needed minimal free space, e.g., a display space measured by a line, a predetermined font and its size, to display the technical term of the reference sign. If the needed minimal free space is not large enough, the needed minimal free space is searched for with new conditions such as a decreased font, line-splitting, etc. A default direction of space-searching may be from a starting point to an end point of the technical term of the reference sign. Supposing that the technical term of the reference sign starts at a virtual square block of a minimal size, the starting point of the technical term of the reference sign may be a left boundary of the square block. If the reference sign in the drawing is near a right boundary of the drawing, the default direction of the space-searching may be from the end point to the starting point of the technical term of the reference sign.

Meanwhile, the placing process 3100 may have searched for the maximal free space in advance. A size of the maximal free space may be useful for searching for the display space of the translated technical term of the reference sign.

Preferably, none of lines forming the drawing are included in any of the needed minimal free space and the maximal free space, or lines with a low line density if any. In case of black and white drawings, the line density may be measured as "a size of space including the line drawing/a size of the total space".

Herein, the placing process 3100 may also adopt an optional searching procedure that determines if the overlap occurs when the technical term of the reference sign is split into two or more lines considering its word count and is placed in its free space. The optional searching procedure as such may be useful if the technical term of the reference sign is longer than two words. The needed minimal free space for the technical term of the reference sign may depend on the font size and the length of the technical term of the reference sign. The font size of the technical term of the reference sign may be same as the font size of the reference sign in the drawing, but the smaller font size of the technical term of the reference sign is preferred. Because the length of the technical term of the reference sign is generally much longer than that of the reference sign in the drawing. Meanwhile, the color of the technical term of the reference sign may be same as the color of the reference sign in the drawing, but the different color of the technical term of the reference sign is preferred for perception or readability.

Meanwhile, if the collision/overlap of the technical terms is unavoidable even with adjustment of the font size or line-splitting, the placing process 3100 may perform at least one of the following three procedures.

1) Varying colors, fonts, or font sizes of the technical terms of the reference signs with the collision/overlap 2) Abbreviating at least one of the technical terms of the reference signs with the collision/overlap, for example, displaying only two words among three words 3) Displaying at least one of the technical terms of the reference signs with the collision/overlap in spare space of the drawing, and selectively connecting said at least one of the technical terms in the spare space with the reference sign in the drawing corresponding to said at least one of the technical terms, to thereby allow the technical terms corresponding to the reference sign in the drawing to be easily noticeable.

Meanwhile, most of the drawings are in black and white, and the user computer 910 has a color display in general. Making use of this fact, the placing process 3100 may not have to search for white space only which is to be used for placing the technical term of the reference sign. That is, if the drawing image is in black and white, the technical term of the reference sign may preferably be in color. Thus, a case may be partially permitted where the technical term of the reference sign in color crosses a line in black and white, without abusing it. In the space-searching process, the placing process 3100 may search the white space first, however, may also search the lines forming the drawing or a space crossing the line drawing as exceptional cases. In this case, the lower a density or a ratio of part in black occupied by the lines in the space being searched is, the better it is. In FIG. 24, the technical terms of the reference signs corresponding to the reference sign in the drawing 302, 320, 306, 310, and 318 cross the line of the drawing.

Especially, the essential reason for space-searching is that the writer of the specification determines a location of the reference sign in the drawing without considering the placement of the technical term of the reference sign when putting the reference sign on the drawing image. In practice, the space-searching as such is more effective for the reference sign in the drawing near the physical boundaries of the drawing. However, when the placing process 3100 searches for the free space, the overlaps of the technical terms of the different reference signs are better to be avoided as much as possible even the technical terms are in different colors.

Figure 17:
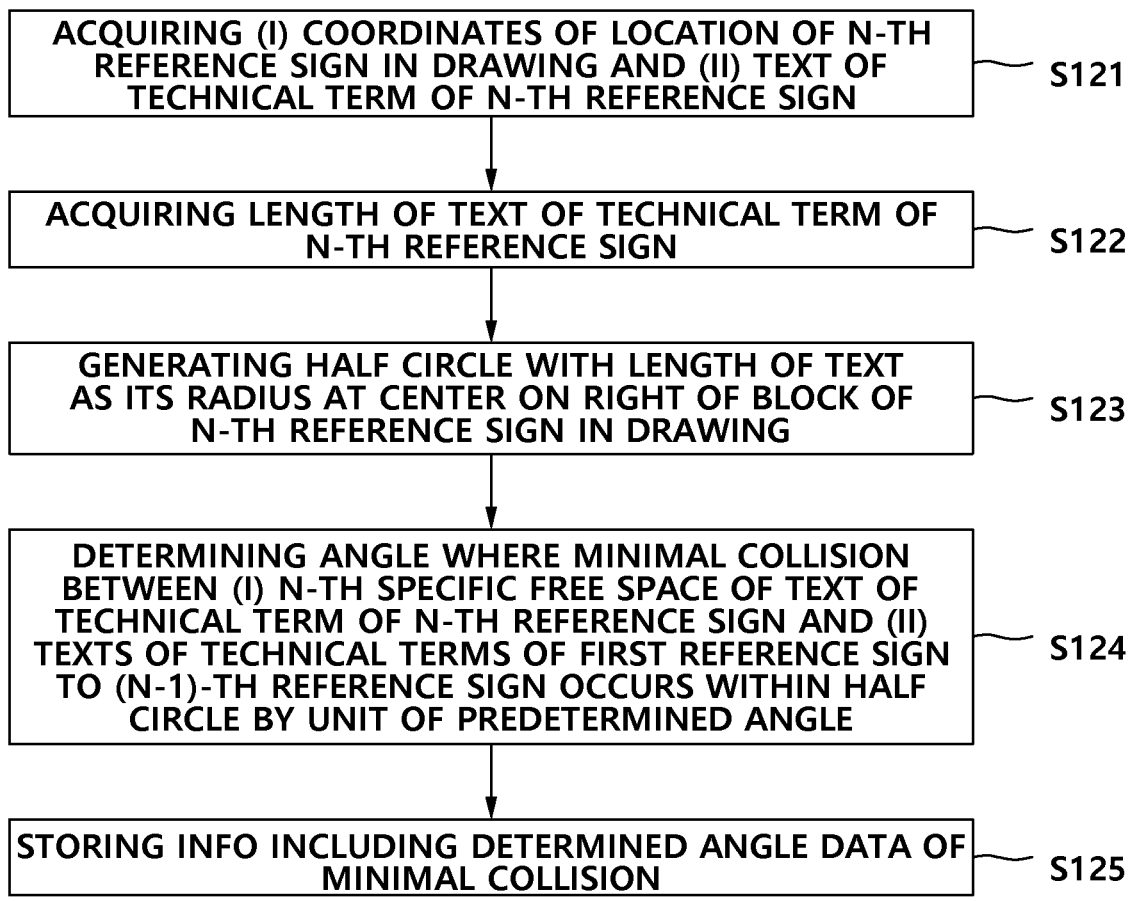
FIG. 17 is a drawing schematically illustrating a process of generating the placement data for the technical terms of the reference signs by the integrating server in accordance with another example embodiment of the present disclosure.

FIG. 17 is a drawing schematically illustrating a process of the placement for the technical term of the reference sign by the placing process 3100 in accordance with another example embodiment of the present disclosure.

As can be seen in FIG. 17, the integrating server 300 may acquire (i) coordinates of a location of the n-th reference sign in the drawing and (ii) text of the technical term of the n-th reference sign at a step of S121, may acquire the length of the text of the technical term of the n-th reference sign at a step of S122, may generate a half circle with the length of the text of the technical term of the n-th reference sign as its radius, at a center on right of a block of the n-th reference sign in the drawing at a step of S123, and may determine an optimal angle where a minimal collision between (i) the n-th specific free space of the text of the technical term of the n-th reference sign and (ii) texts of the technical terms of the first reference sign to the (n−1)-th reference sign occurs within the half circle by deciding a degree of collision per a unit of a predetermined angle at a step of S124, and may store information including the determined optimal angle of the minimal collision in the information set on the placement at a step of S125.

Figure 18:
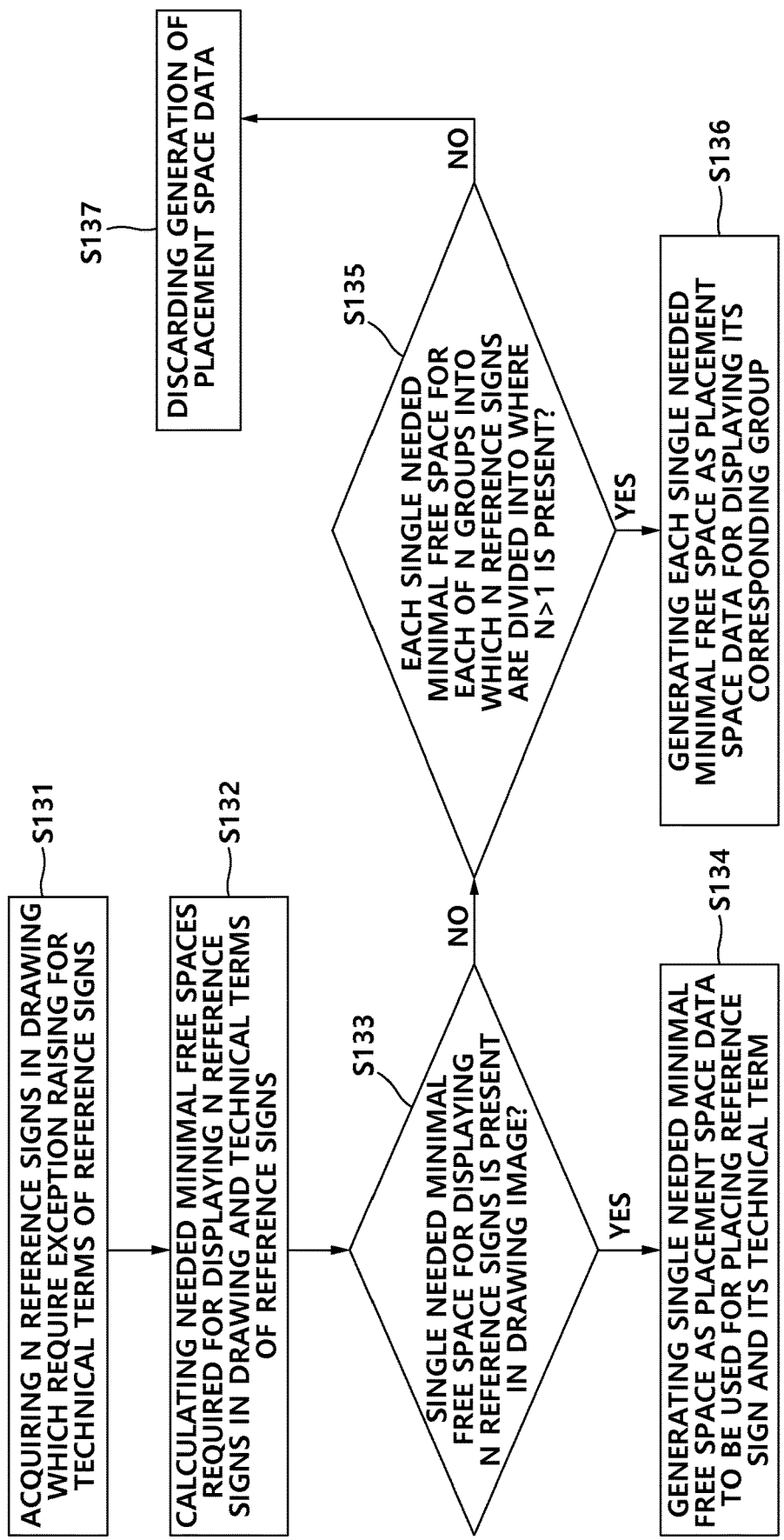
FIG. 18 is a drawing schematically illustrating a process of generating the placement data for the technical terms of the reference signs in an exceptional case by the integrating server in accordance with another example embodiment of the present disclosure.

FIG. 18 describes a process of raising the exception by the placing process 3100. A case where raising the exception is required occurs frequently when none of the needed minimal free space to be used for displaying the technical term of at least one specific reference sign is available around the reference sign in the drawing, such as in a high density area of the reference signs in the drawing image. Exception raising in the present disclosure may include collecting and placing the technical terms of the reference signs, corresponding to part of the reference signs in the drawing, in one or more specific areas in the drawing image.

Figure 31:
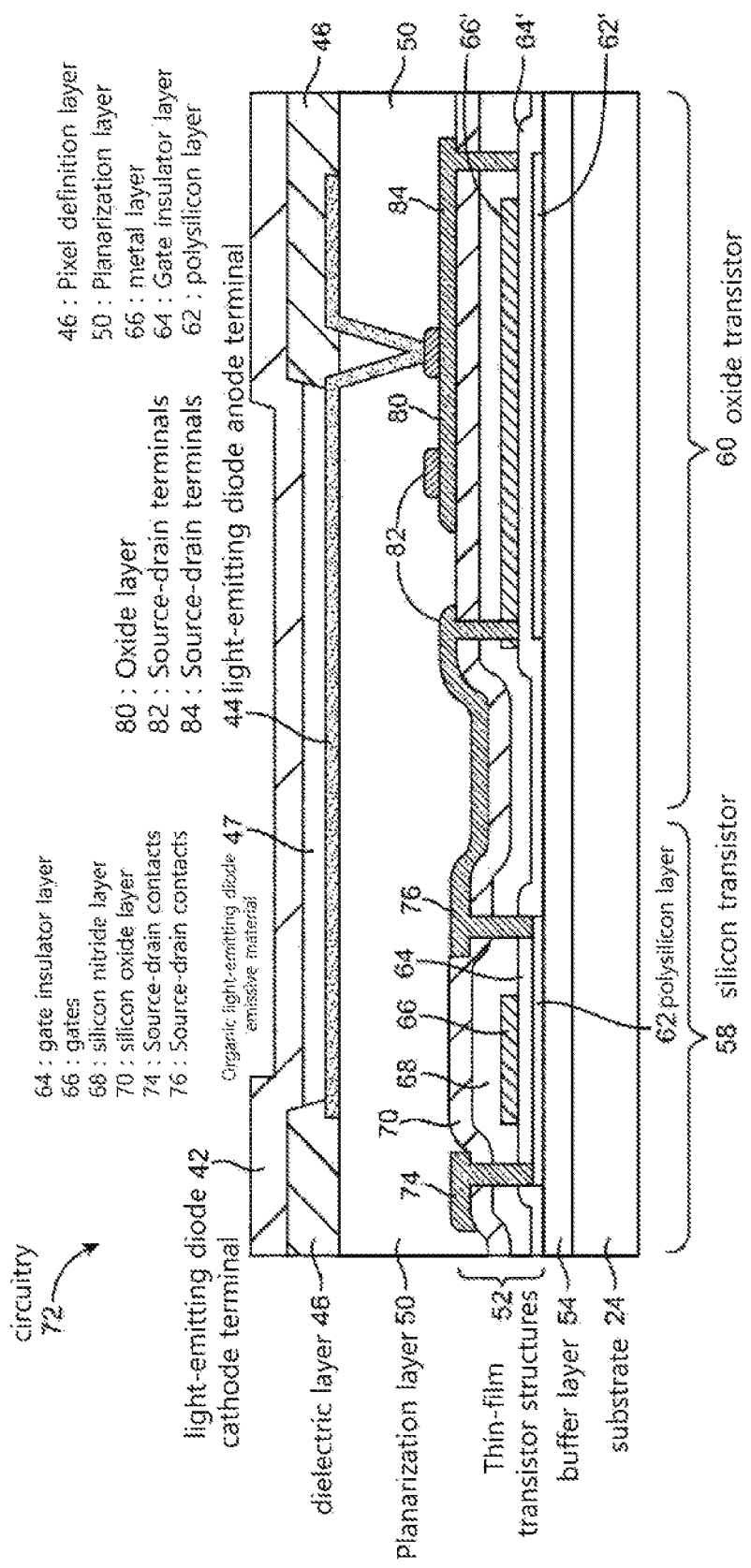
FIG. 31 is a drawing schematically illustrating still another example of a revised patent drawing of the specific patent application as seen by the user after the present disclosure is applied to the specific drawing.
Figure 32:
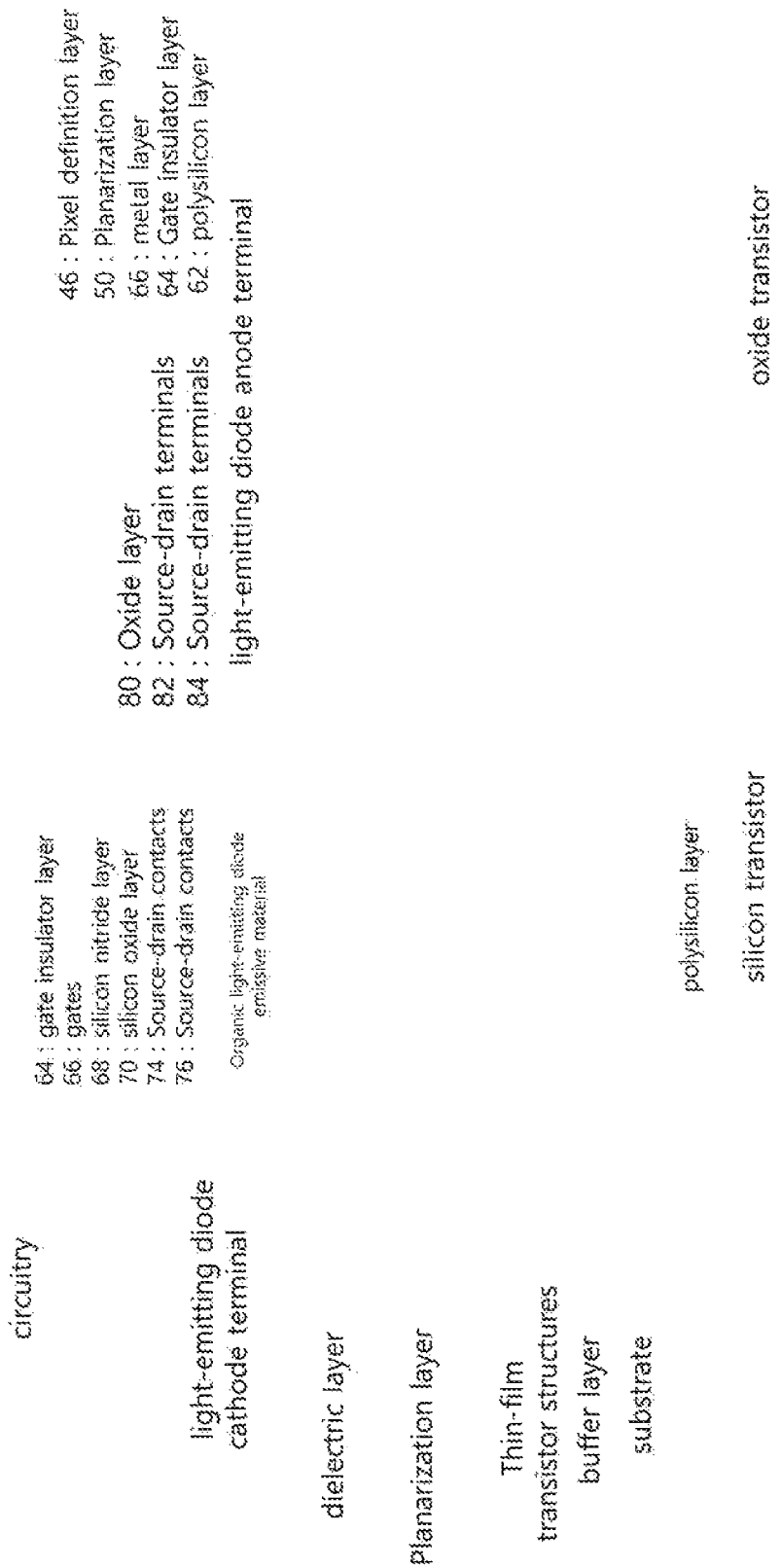
FIG. 32 is a drawing schematically illustrating another example of the layer of the technical terms of the reference signs after the present disclosure is applied.

The placing process 3100 may acquire the priority information on the reference sign in the drawing at the step of S111, and may acquire N reference signs in the drawing which require the exception raising for the technical terms of the reference signs at a step of S131. Herein, the needed minimal free spaces required for displaying the N reference signs in the drawing which require the exception raising and for displaying the technical terms of the reference signs may be calculated at a step of S132. The needed minimal free spaces required for displaying the N reference signs are calculated as such, since displaying the technical terms of the reference signs corresponding to the N reference signs within a single area, if possible, is preferred. If displaying the N reference signs is impossible, the N reference signs may be divided into n groups and may be displayed for each group where n<N. FIG. 31 shows three clusters of the reference signs each of which shows the collected technical terms of the reference signs in a form of "reference sign in drawing: technical term".

As can be seen in FIG. 18, the placing process 3100 may include a process S133 of determining if a single needed minimal free space for displaying the N reference signs is available in the drawing image, and a process S134 of, if the single needed minimal free space is available, generating the single needed minimal free space as the placement space data to be used for placing the reference sign and its corresponding technical term. If the single needed minimal free space is not available, the placing process 3100 may divide the N reference signs into n groups where n>1, may determine if each single needed minimal free space for each of the n groups is available at a step of S135, if each single needed minimal free space is available, may generate each single needed minimal free space as the placement space data for displaying its corresponding group at a step of S136, and if each single needed minimal free space is not available, may discard generation of the placement space data at a step of S137.

Figure 19:
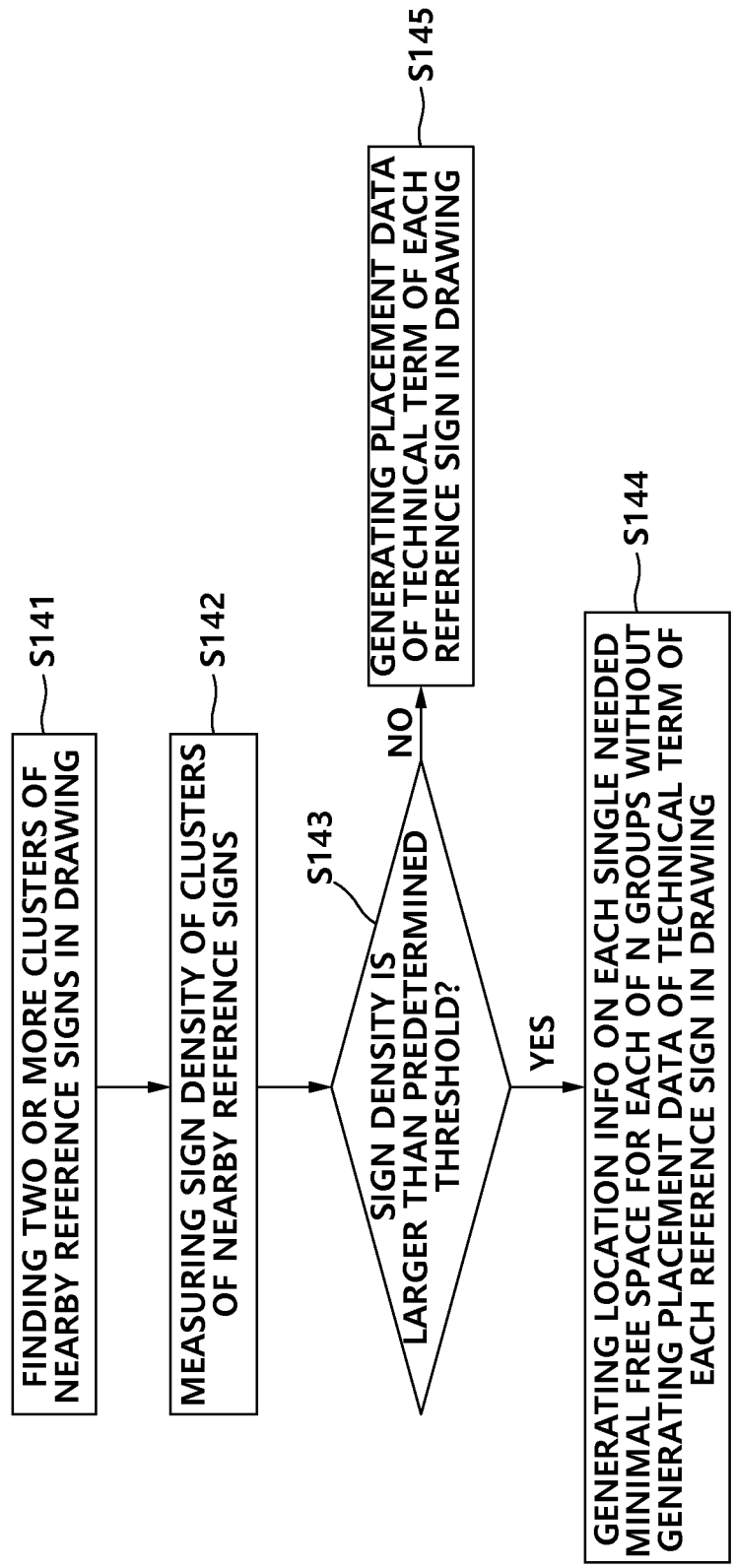
FIG. 19 is a drawing schematically illustrating a process of calculating a sign density of the reference signs in the drawing and finding a cluster of nearby reference signs in the drawing according to the sign density by the integrating server in accordance with one example embodiment of the present disclosure.

FIG. 19 is a drawing schematically illustrating a process of calculating a sign density of the reference signs in the drawing and finding a cluster of nearby reference signs in the drawing according to the sign density of the reference signs by the placing process 3100 in accordance with one example embodiment of the present disclosure.

As can be seen in FIG. 19, the placing process 3100 may include a process S141 of finding two or more clusters of nearby reference signs in the drawing, a process S142 of measuring the sign density of the clusters of nearby reference signs, and a process S143 of determining if the sign density is larger than a predetermined threshold. The placing process 3100 may not generate the placement data of the technical term of each reference sign in the drawing if the sign density is larger than the predetermined threshold, and may search for the location information on each single needed minimal free space for each of the n groups, at a process S144. If the sign density is smaller than the predetermined threshold, the placing process 3100 may generate the placement data of the technical term of each reference sign in the drawing at a process S145.

Herein, the technical terms displayed in the spare space are the technical terms of the reference signs with the collision/overlap, and preferably, the technical terms of the relatively unimportant reference signs may be displayed in the spare space. Examples of the technical terms of the relatively unimportant reference signs may be those of the reference signs frequently appearing in other drawings, or those of the reference signs corresponding to the reference sign in the upper hierarchy in the drawing.

The space-searching must consider the physical boundaries (top, right, left, and bottom) of the drawing. Especially, in case of the reference sign in the drawing near a right boundary of the drawing, the technical term of the reference sign cannot be placed on a right side. Therefore, for example, in case of the reference sign in the drawing near the right boundary of the drawing, for example, within two vertical areas among ten vertical areas into which the whole drawing is divided, the placing process 3100 may place the technical term of the reference sign on a left side unless the length thereof is very short. Therefore, the space-searching by the placing process 3100 may be focused on the left side of the reference sign in the drawing and the placement of the technical term of the reference sign is processed within the right physical boundary of the drawing.

The placing process 3100 may find an absolute free space in the drawing, and may place a large amount of the technical terms of the reference signs corresponding to one or more predetermined conditions in the absolute free space. If many reference signs in the drawing are placed on a specific space, or if many reference signs in the drawing are placed near the right physical boundary of the drawing, free space available to the technical terms of the reference signs may be lacking. Herein, the placing process 3100 may search the drawing for at least one absolute free space which is devoid of the reference sign, the line forming the drawing, color, etc., and may calculate a physical location and a physical size of the absolute free space. In general, the absolute free space can be easily found near "Fig." or at the top or the bottom of the drawing.

As can be seen in FIG. 31, the integrating server 300 may collect and display the technical terms, that cannot be placed around their corresponding reference signs in the drawing, in the absolute free space. Herein, since the technical term is far apart from its corresponding reference sign in the drawing, preferably, the technical terms displayed in the absolute free space may have their corresponding reference signs together in front or rear thereof, or the reference sign in the drawing and its corresponding technical term may be connected by a colored line.

The combination process 3200 is described. The combination process 3200 may add information as below to the information set on the placement acquired by an acquiring process 3210, to thereby generate the information set on the combination of the reference sign and its corresponding technical term. The information to be added may include the priority information and hierarchy information on the technical terms of the reference signs.

The priority information may be processed by the prioritizing process 2200. The prioritizing process 2200 may acquire location information and frequency information on the technical term of the reference sign, and may determine each priority of each technical term of the reference sign according to a predetermined prioritizing logic. For example, the priority of the technical term of the reference sign appearing in both independent claims and dependent claims may be higher than that of the technical term of the reference sign appearing only in the detailed description.

Meanwhile, the reference signs show a hierarchy for higher concepts, lower concepts, and detailed concepts in many drawings. For example, in the drawings of the present disclosure, the integrating processor 3000, i.e., a higher concept, is given the reference sign 3000, and the placing process 3100, the combination process 3200, and the integrating process 3300, i.e., lower concepts, are respectively given the reference signs 3100, 3200 and 3300. Meanwhile, the searching process 3110 and the placement process 3120 which are detailed concepts of the placing process 3100 are respectively given 3110 and 3120. As such, the hierarchizing process 2300 may recognize a hierarchical structure of a naming system of the reference signs in the specification, based on commonality of prefix-like substrings of the reference signs in the specification. Next, the hierarchizing process 2300 may generate two or more hierarchical groups of all of the reference signs in the specification by using the recognized hierarchical structure. For example, a branch of the reference sign 3000 in the specification includes 3100, 3200, and 3300, and a branch of 3100 includes 3110 and 3120. Once the hierarchy of the reference signs in the specification is recognized as such, each color branch may be given for each of the technical term of the reference sign, or different font sizes may be given for different tiers. For example, green color may be allocated to the technical terms of the reference signs corresponding to the branch of the reference sign 3000. And, 60 point font size and thick green color may be allocated to the technical terms corresponding to the reference sign 3000, 47 point font size and mid green color may be allocated to the technical terms corresponding to the reference signs 3100, 3200, and 3300, 30 point font size and light green color may be allocated to the technical terms corresponding to the reference signs 3110 and 3120.

Table 10 below is an example of expression data of the technical terms of the reference signs, and the expression data as such may be elements of the information set on the combination of the reference sign and its corresponding technical term. The information set on the combination of the reference sign and its corresponding technical term processed by a combination-set generating process 3230 of the present disclosure may include the information set on the placement and the expression data as below.

TABLE 10

| REFERENCE SIGN IN DRAWING | WORD COUNT OF TECHNICAL TERM OF REFERENCE SIGN | LENGTH OF TECHNICAL TERM OF REFERENCE SIGN | RELATIVE FONT SIZE OF TECHNICAL TERM OF REFERENCE SIGN | COLOR OF TECHNICAL TERM OF REFERENCE SIGN | LOCATION OF TECHNICAL TERM OF REFERENCE SIGN | NEW LINE | ABBREVIATED TECHNICAL TERM OF REFERENCE SIGN |
|---|---|---|---|---|---|---|---|
| 1000 | 1 | 10 | large | black | right | x | x |
| 1000 | 2 | 15 | medium | blue | right | x | x |
| 1110 | 2 | 20 | small | sky blue (transparency 75%) | low | x | o |
| 1111 | 3 | 30 | fine | sky blue (transparency 50%) | lower bottom | x | o |
| 1120 | 3 | 15 | small | sky blue (transparency 75%) | right | o | x |
| 1200 | 2 | 15 | medium | brown | top right | x | x |

The data as in Table 10 above may be stored in the drawing-based data part 5210 or the placement data part 5230, the statistics data may also be stored in the statistic data part 5250.

In the "LOCATION OF TECHNICAL TERM OF REFERENCE SIGN" column of the above example, "right" may mean that the technical term of the reference sign is displayed in a direction protracted in a same right direction as an aligned direction of the text string of the reference sign in the drawing. Meanwhile, even if the aligned direction of the text string of the reference sign in the drawing is rightward, the technical term of the reference sign may be displayed at the bottom or the top of the reference sign in the drawing. A general aligned direction of the text string of the reference sign in the drawing is rightward, but may be upward, downward, or in an angled direction as the case may be. Even in such cases, it is preferable in general that the technical term of the reference sign be displayed in a direction protracted in a same direction as the aligned direction of the text string.

The location of the technical term of the reference sign above may need to be exactly designated. The most common procedure is introduction of four coordinates to be used for determining the location of the technical term of the reference sign. Herein, the four coordinates are coordinates of four vertices corresponding to the block of the technical term of the square-shaped reference sign where the technical term is displayed. Preferably, the location information of the reference sign in the drawing may be formed by four coordinates.

Determination of how each technical term of the reference sign is displayed, based on the priority and the hierarchy as above, is processed by an expression process 3220 of the present disclosure.

Herein, when drawings related to patent information as a search result are provided to a user who inputted at least one keyword for a search, if the technical terms of the reference signs match the keyword or if the technical terms of the reference signs include all or part of the keyword, the technical terms of the reference signs may need to be highlighted for the readability. Such a process may be performed by a responsive process 3221 of the present disclosure. The responsive process 3221, while maintaining at least one keyword inputted by the user per each user session, may search a list of the technical terms of the reference signs for the keyword, and if the technical term including the keyword is present, may add special expression format, e.g., a font size, color, shade, to the technical term including the keyword. Such a process may be performed such that the responsive process 3221 adds/integrates data to be used for displaying the special format with the data on the technical term of the reference sign transmitted to the user computer 910 which is an example of said other devices 900.

Next, relation, display, or integration of the technical term of the reference sign and the drawing image is described.

The technical term of the reference sign may be provided as hard-binding to the drawing image such that the technical term exists as a standalone entity in a single file including both the reference sign in the drawing and its corresponding technical term or a single file without layers. However, as another example, when the drawing is displayed to the user computer, i.e., an example of said other devices 900, then preferably, layer information on the technical term of the reference sign may be provided as soft binding to the drawing image.

A soft binding oriented data provision is described in detail. The integrating server 300 may generate data to be provided to other devices 900, e.g., the user computer 910, as below.

```
<div style="position: relative;">
    <img src="http://..._pct00010.png"/>
    <div style="position: absolute; top: 856px; left: 25px; font-size: 47px;"> thin file transistor structures</div>
    <div style="position: absolute; top: 437px; left: 773px; font-size: 47px;">output terminal</div>
</div>
```

In the above, <img src="http:// . . . _pct00010.png"/> is an example of a phrase for allowing the browser to read a drawing image file.

If the data as above is provided to the user computer 910, the browser of the user computer 910 may display the technical term "thin file transistor structures" of the reference sign on a location with a designated coordinates and 47 point font size in the drawing image. As a result, as can be seen in FIG. 24, the technical term "thin file transistor structures" is displayed on the designated location in the drawing image. The logically integrating process 3320 of the present disclosure performs processes above such that the technical term of the reference sign is displayed on a layer independent of a specific drawing image.

When the specific drawing image is called by the user computer 910, the integrating server 300 may provide the data processed as in the example to the user computer 910, in order to allow the data on the technical term of the reference sign corresponding to the drawing to be displayed on the user computer 910.

The soft binding oriented data provision has a few advantages compared to a hard-binding oriented data provision.

First, drawing image data hardly changes, however, the reference sign in the drawing and its corresponding technical term extracted from the drawing image data may vary much, relatively. Accuracy of the recognition of the reference sign in the drawing; mapping between the reference sign in the drawing and the reference sign in the specification; extracting the technical term of the reference sign from the specification; and mapping between the reference sign in the specification and the technical term of the reference sign may vary according to an information processing mechanism, policies, priorities, etc. Therefore, when the technical term of the reference sign is hard-binding to the drawing image, if the "reference sign in the drawing vs. technical term of the reference sign" situation shows any changes, previously processed and generated drawings may have to be discarded.

Second, the technical term of the reference sign may be subject to translation. The technical term of the reference sign must be recognized as text, not an image, in order for the technical term in English to be displayed in a language desired, through translation such as machine translation as well as translation programs and services.

Third, the way that the technical term of the reference sign is displayed may vary constantly. If contents of the placement data of the reference sign are changed or updated, the technical term of the reference sign changed or updated as such may have to be provided.

Figure 20:
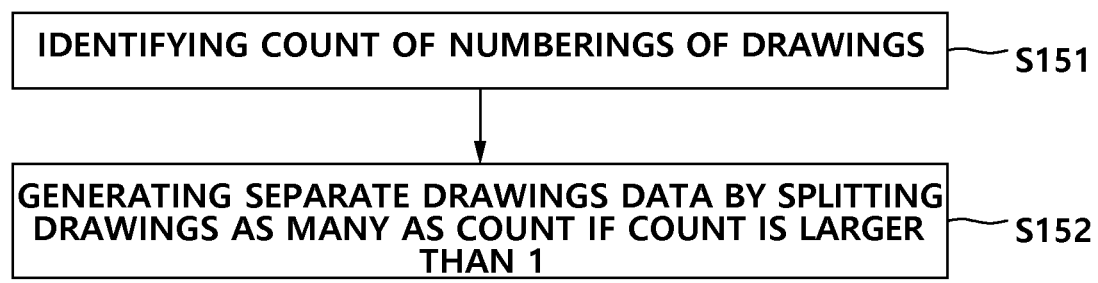
FIG. 20 is a drawing schematically illustrating pre-processing of a composite drawing by the OCR device in accordance with one example embodiment of the present disclosure.

FIG. 20 is a drawing schematically illustrating pre-processing of a composite drawing by the OCR device 100 in accordance with one example embodiment of the present disclosure.

As can be seen in FIG. 20, the OCR processor 1000 may perform a process S151 of identifying a count of numberings of the drawings, and a process S152 of generating separate drawings data by splitting the drawings by the count if the count is larger than 1.

The count of the numbering may represent that how many of expressions with separate drawing numberings like "Fig. +NUMBER" or "Figure+NUMBER" are in a single drawing image file. The integrating server 300 may physically split the drawings by a unit of expressions having physical drawing numberings, and may apply the spirit of the present disclosure to the split drawings.

Figure 25:
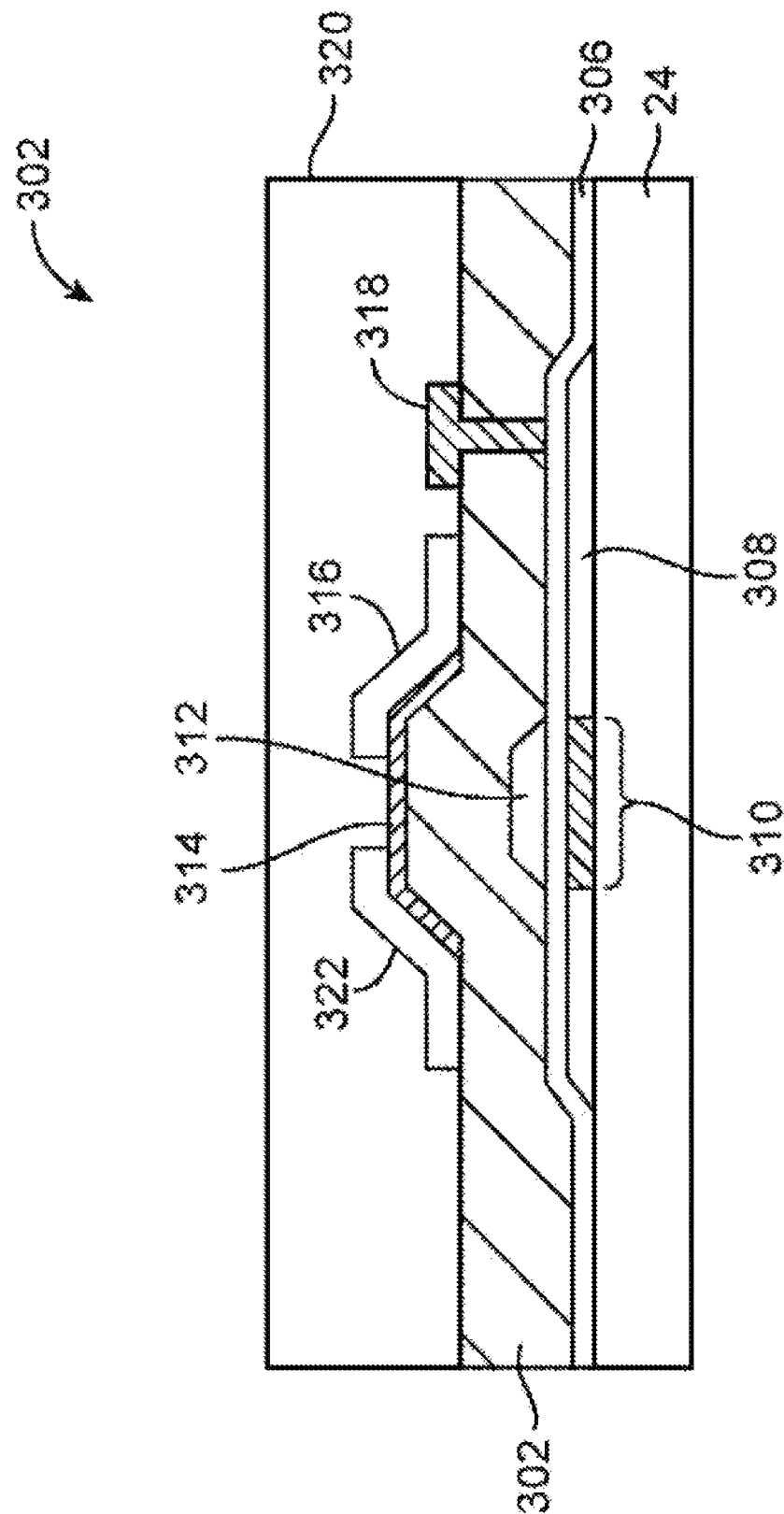
FIG. 25 is a conventional drawing schematically illustrating an example of a patent drawing of a specific patent application filed with USPTO before the present disclosure is applied thereto.

FIG. 25 is a drawing schematically illustrating an example of a specific drawing, i.e., FIG. 10, of U.S. patent application Ser. No. 14/249,716 before the present disclosure is applied to the specific drawing in accordance with the present disclosure. Although this is a relatively simple drawing, none of the reference signs in the drawing has any technical term of the reference sign.

Figure 26:
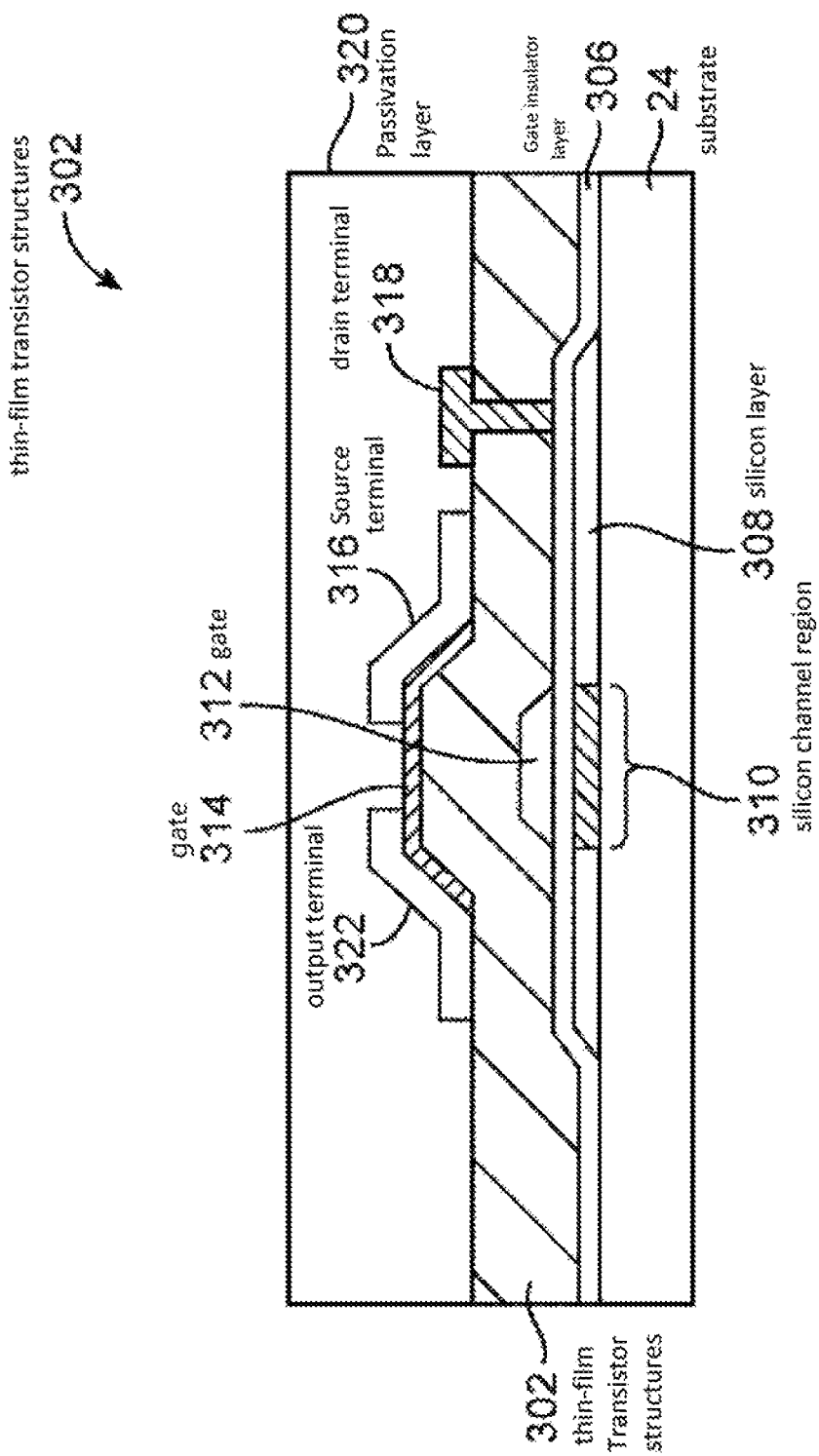
FIG. 26 is a drawing schematically illustrating an example of a revised patent drawing of the specific patent application filed with USPTO as seen by the user after the present disclosure is applied to the specific drawing in accordance with the present disclosure.

FIG. 26 is a drawing schematically illustrating an example of the specific drawing, i.e., FIG. 10, of U.S. patent application Ser. No. 14/249,716 as seen by the user after the present disclosure is applied to the specific drawing in accordance with the present disclosure.

The present disclosure is applied to the drawing in FIG. 25 such that the technical terms of the reference signs are added, and its result is shown in FIG. 26.

If the original technical term of the reference sign is present, the translated technical term of the reference sign may be generated by machine translation or other translation processes. Table 11 below is an example of pairs of data which shows the original technical terms of the reference signs and the translated technical terms of the reference signs in another language, with regard to FIG. 25.

TABLE 11

| PATENT IDENTIFIER | DRAWING IDENTIFIER | DRAWING | REFERENCE SIGN | TECHNICAL TERM OF REFERENCE SIGN (ORIGINAL) | TECHNICAL TERM OF REFERENCE SIGN (TRANSLATION) |
|---|---|---|---|---|---|
| 14249716 | 14249716-pct00010.tif | FIG. 10 | 24 | Substrate | 기판 |
| 14249716 | 14249716-pct00010.tif | FIG. 10 | 302 | thin-film transistor structures | 박막 트랜지스터 구조체들 |
| 14249716 | 14249716-pct00010.tif | FIG. 10 | 306 | gate insulator layer | 게이트 절연체 층 |
| 14249716 | 14249716-pct00010.tif | FIG. 10 | 308 | silicon layer | 실리콘 층 |
| 14249716 | 14249716-pct00010.tif | FIG. 10 | 310 | silicon channel region | 실리콘 채널 영역 |
| 14249716 | 14249716-pct00010.tif | FIG. 10 | 312 | Gate | 게이트 |
| 14249716 | 14249716-pct00010.tif | FIG. 10 | 314 | Gate | 게이트 |
| 14249716 | 14249716-pct00010.tif | FIG. 10 | 316 | source terminal | 소스 단자 |
| 14249716 | 14249716-pct00010.tif | FIG. 10 | 318 | drain terminal | 드레인 단자 |
| 14249716 | 14249716-pct00010.tif | FIG. 10 | 320 | passivation layer | 패시베이션 층 |
| 14249716 | 14249716-pct00010.tif | FIG. 10 | 322 | output terminal | 출력 단자 |

Figure 27:
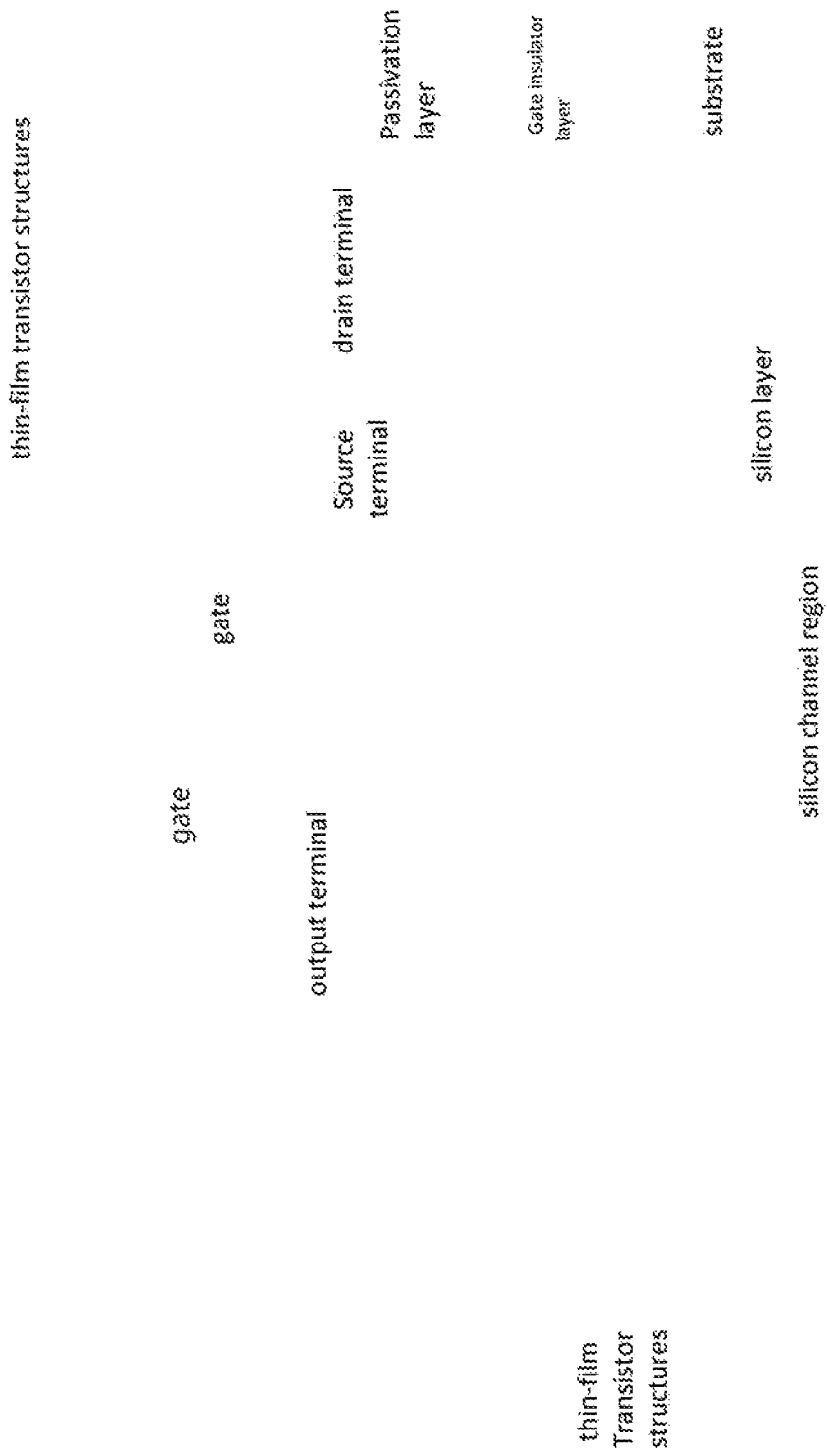
FIG. 27 is a drawing schematically illustrating an example of a layer of technical terms of the reference signs after the present disclosure is applied to the specific drawing.

FIG. 27 is a drawing schematically illustrating an example of the layer of the technical terms of the reference signs after the present disclosure is applied to the specific drawing, i.e., FIG. 10, of U.S. patent application Ser. No. 14/249,716. If the data as below is generated without <img src="http:// . . . _pct00010.png"/> which designates an image file, and provided to the user computer 910, then the layer of the technical term of the reference sign without any drawing images as FIG. 27 may be provided to the user.

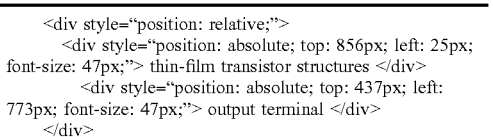

```
<div style="position: relative;">
    <div style="position: absolute; top: 856px; left: 25px; font-size: 47px;"> thin-film transistor structures </div>
        <div style="position: absolute; top: 437px; left: 773px; font-size: 47px;"> output terminal </div>
    </div>
    . . . . . .
```

Figure 28:
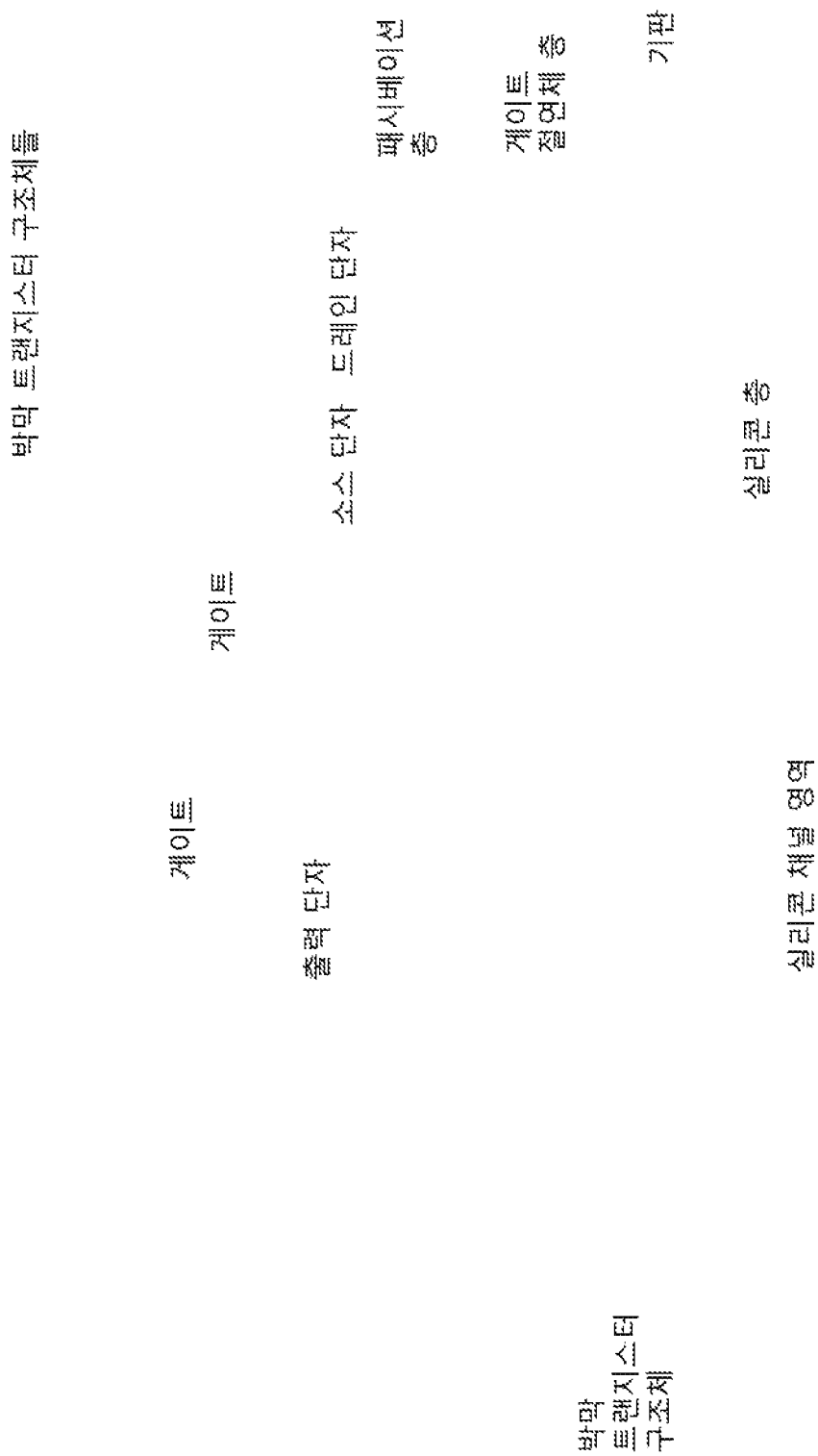
FIG. 28 is a drawing schematically illustrating an example of the translated technical terms of the reference signs, not the original technical terms of the reference signs, displayed on the layer of the technical terms of the reference signs after the present disclosure is applied to the specific drawing.

FIG. 28 is a drawing schematically illustrating an example of the translated technical terms of the reference signs, not the original technical terms of the reference signs, in the specific drawing of U.S. patent application Ser. No. 14/249,716. The technical terms of the reference signs related to the drawing in FIG. 25 are in another language. Herein, the technical terms of the reference signs may differ even in the same language. For example, it may differ for each of translation devices. Also, if a patent filed in a specific language in a specific country is filed in another language in another country, the technical term corresponding to the reference sign in the same drawing extracted from a specification in said another language may differ from the translated technical term.

If translation data as in Table 11 is available, the integrating server 300 may generate phrases as below and transmit the phrases to the user computer 910. Such a result is shown in FIG. 28.

```
<div style="position: relative;">
    <div style="position: absolute; top: 856px; left: 25px; font-size: 47px;"> thin file transistor structures</div>
        <div style="position: absolute; top: 437px; left: 773px; font-size: 47px;"> output terminal</div>
    </div>
    . . . . . .
```

A result shown in FIG. 29 may be generated if the phrase below is added to the phrases above and to top of phrases corresponding to the technical term of the reference sign.
  <img src="http:// . . . _pct00010.png"/>

Figure 29:
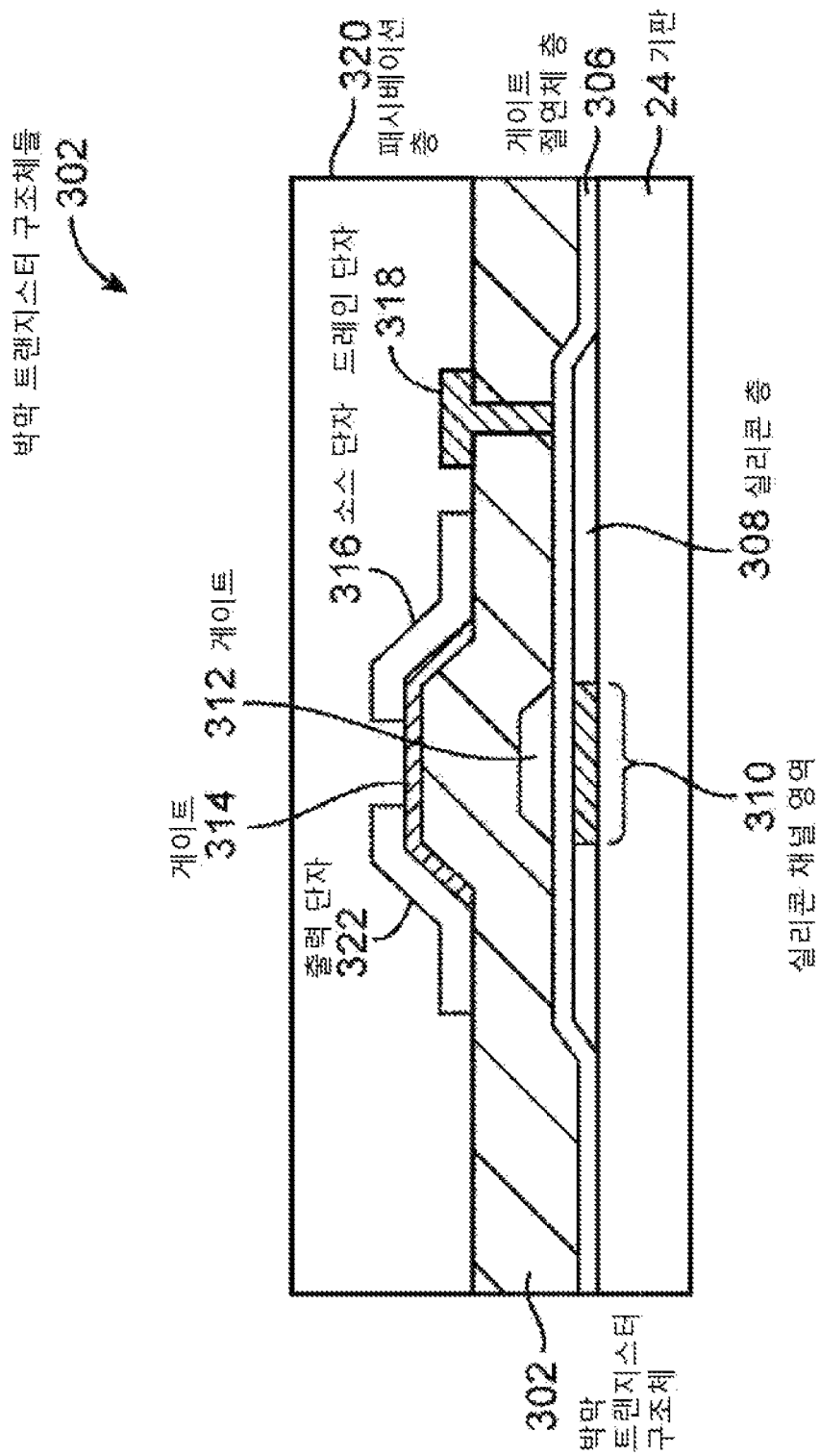
FIG. 29 is a drawing schematically illustrating an example of the specific drawing as seen by the user where the translated technical terms of the reference signs are shown after the present disclosure is applied to the specific drawing.

FIG. 29 is a drawing schematically illustrating an example of the drawing as seen by the user where the translated technical terms of the reference signs are shown.

Meanwhile, another method may be used to generate a same result with FIG. 29. If the browser, which is displaying a same result with FIG. 26, transmits a URL on the screen and a target translation language to a translation API like Google Translate, then a result with translated non-tagged parts and intact tagged parts may be received.

FIGS. 30 to 34 are drawings schematically illustrating examples of a different specific drawing, i.e., FIG. 3, of U.S. patent application Ser. No. 14/249,716 before and after the present disclosure is applied to the different specific drawing, and respectively correspond to FIGS. 25 to 29.

FIG. 31 shows a same cluster of the reference signs formed by the reference signs 64, 66, 68, 70, 74, and 76. In case of said same cluster of the reference signs, preferably, the reference sign in the drawing may be displayed together near the technical term of the reference sign. Every "reference sign in drawing: technical term of reference sign" composing a same cluster of the reference signs may have a same x component of the coordinates.

Table 12 below of the present disclosure shows an example of pairs of data which shows the original technical terms of the reference signs and the translated technical terms of the reference signs in another language, of the different specific drawing, i.e., FIG. 3, of U.S. patent application Ser. No. 14/249,716.

TABLE 12

| PATENT IDENTIFIER | DRAWING IDENTIFIER | DRAWING | REFERENCE SIGN | TECHNICAL TERM OF REFERENCE SIGN (ORIGINAL) | TECHNICAL TERM OF REFERENCE SIGN (TRANSLATION) |
|---|---|---|---|---|---|
| 14249716 | 14249716-pct00010.tif | FIG. 3 | 24 | substrate | 기판 |
| 14249716 | 14249716-pct00010.tif | FIG. 3 | 42 | Light-emitting diode cathode terminal | 발광 다이오드 캐소드 단자 |
| 14249716 | 14249716-pct00010.tif | FIG. 3 | 44 | Light-emitting diode anode terminal | 발광 다이오드 애노드 단자 |
| 14249716 | 14249716-pct00010.tif | FIG. 3 | 46 | dielectric layer | 유전체 층 |
| 14249716 | 14249716-pct00010.tif | FIG. 3 | 47 | Organic light-emitting diode emissive material | 유기 발광 다이오드 방출 재료 |
| 14249716 | 14249716-pct00010.tif | FIG. 3 | 50 | Planarization layer | 편광 층 |
| 14249716 | 14249716-pct00010.tif | FIG. 3 | 52 | Thin-film transistor structures | 박막 트랜지스터 구조체들 |
| 14249716 | 14249716-pct00010.tif | FIG. 3 | 54 | Buffer layer | 버퍼 층 |
| 14249716 | 14249716-pct00010.tif | FIG. 3 | 58 | Silicon transistor | 실리콘 트랜지스터 |
| 14249716 | 14249716-pct00010.tif | FIG. 3 | 60 | oxide transistor | 트랜지스터 |
| 14249716 | 14249716-pct00010.tif | FIG. 3 | 62 | Polysilicon layer | 폴리실리콘 층 |
| 14249716 | 14249716-pct00010.tif | FIG. 3 | 64 | Gate insulator layer | 게이트 절연체 층 |
| 14249716 | 14249716-pct00010.tif | FIG. 3 | 66 | metal layer | 금속 층 |
| 14249716 | 14249716-pct00010.tif | FIG. 3 | 68 | Silicon nitride layer | 실리콘 질화물 층 |
| 14249716 | 14249716-pct00010.tif | FIG. 3 | 70 | Silicon oxide layer | 실리콘 산화물 층 |
| 14249716 | 14249716-pct00010.tif | FIG. 3 | 72 | Circuitry | 회로 |
| 14249716 | 14249716-pct00010.tif | FIG. 3 | 74 | Source-drain contracts | 소스-드레인 콘택들 |
| 14249716 | 14249716-pct00010.tif | FIG. 3 | 76 | Source-drain contracts | 소스-드레인 콘택들 |
| 14249716 | 14249716-pct00010.tif | FIG. 3 | 80 | oxide layer | 산화물 층 |
| 14249716 | 14249716-pct00010.tif | FIG. 3 | 82 | Source-drain terminals | 소스-드레인 단자들 |
| 14249716 | 14249716-pct00010.tif | FIG. 3 | 84 | Source-drain terminals | 소스-드레인 단자들 |

Figure 34:
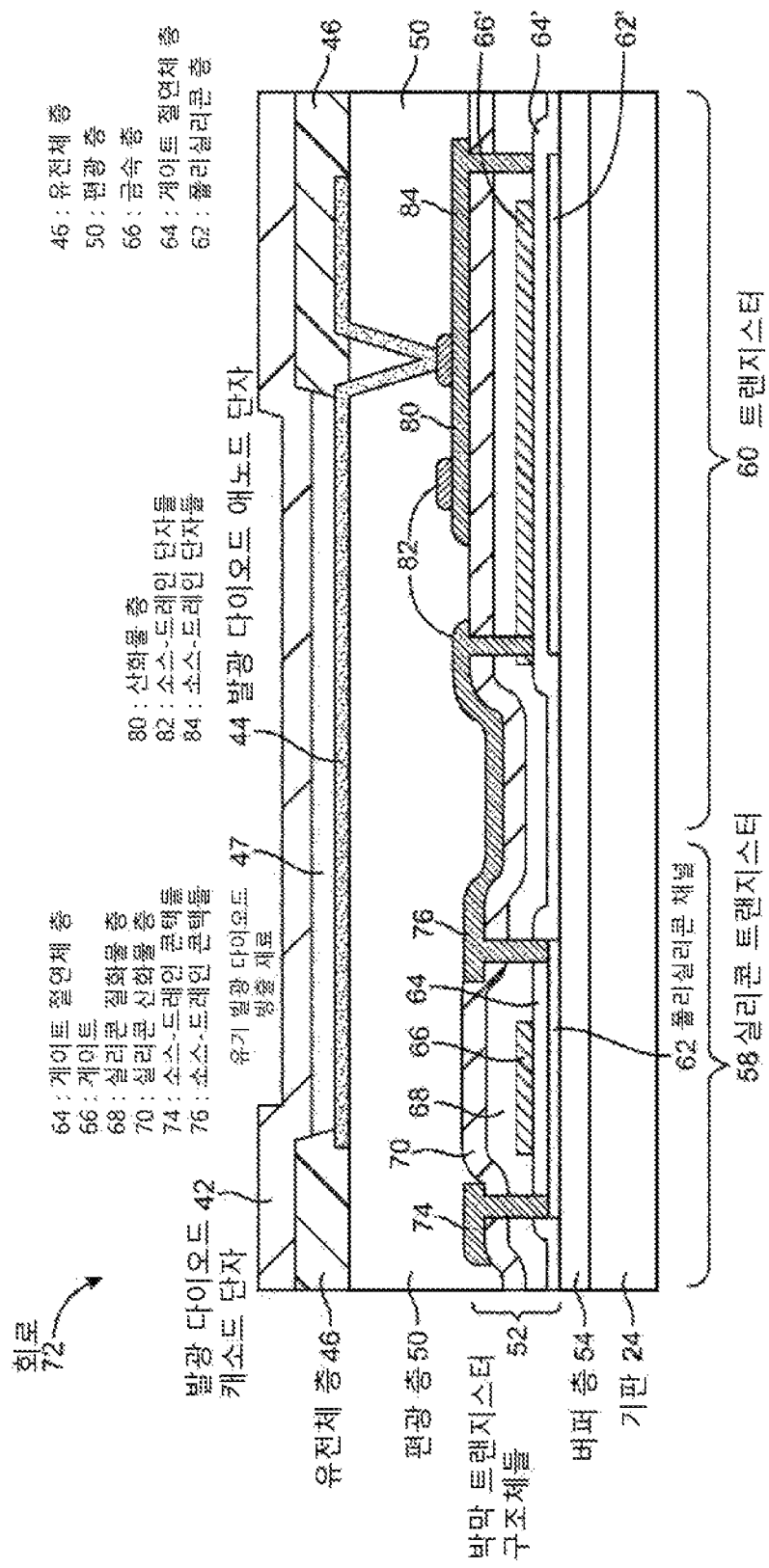
FIG. 34 is a drawing schematically illustrating another example of the drawing as seen by the user where the translated technical terms of the reference signs are shown.

FIG. 34 is a drawing schematically illustrating another example of the drawing as seen by the user where the translated technical terms of the reference signs of the specific drawing of U.S. patent application Ser. No. 14/249,716 are shown.

The present disclosure has an effect as follows: a reference sign in a drawing which is included in a patent drawing image is recognized using a learning model generated by learning parameters of the learning model, where hyper parameters of the learning model have been optimized by a cross validation using image data including each image corresponding to each character, a free space to be used for a placement of a technical term of the reference sign corresponding to the recognized reference sign in the drawing is searched for, and an information set on the placement including location information, to be used for displaying the technical term of the reference sign on the drawing image using the found free space, is generated and provided as corresponding to the patent drawing image, so that the original or translated technical term of the reference sign is placed near the reference sign in the patent drawing. As a result, it becomes clear and easily perceivable what the reference sign in the patent drawing indicates and thus readability of the drawings is improved, and understanding of the technology disclosed in the patent is expedited through the upgraded drawings. The present disclosure has another effect as follows: when the reference sign in the drawing is easily recognized, an accuracy of understating the reference sign is improved, and if corresponding relationship between the reference signs and the technical terms extracted from the specification is processed based on statistical probabilities, the highly accurate technical terms are placed near the appropriate reference signs in the drawings even if the specification has some typos.

INDUSTRIAL APPLICABILITY

The present disclosure may be used in patent information industry, patent information service industry, technology information business and technology information service.

What is claimed is:

1. A method for placing at least one technical term of at least one reference sign in at least one drawing around the at least one reference sign, comprising steps of:

(a) on condition that i) a first state in which an OCR device has acquired at least one drawing image file corresponding to at least one drawing identifier related to at least one patent identifier, has recognized at least one reference sign in at least one drawing from the drawing image file, and has generated an information set on the reference sign in the drawing, including location information on the reference sign in the drawing, and that ii) a second state in which a reference sign and technical term recognizing device has parsed a specification text string including the reference sign and its corresponding technical term, has recognized the reference sign in a specification and its corresponding technical term included in the specification text string, and has generated each information set, for each patent identifier, on mapping between the reference sign in the specification and its corresponding technical term, have been performed, an integrating server acquiring (1) the information set on the mapping between the reference sign in the specification and its corresponding technical term about the patent identifier and (2) the information set on the reference sign in the drawing about the drawing identifier;

(b) the integrating server searching for a specific free space, among entire free space, on the drawing image, where the technical term of the reference sign is to be displayed, by using (i) the location information on the reference sign in the drawing included in the information set on the reference sign in the drawing and (ii) term information on the reference sign mapped onto the reference sign in the specification included in the information set on the mapping between the reference sign in the specification and its corresponding technical term; and (c) the integrating server generating an information set on placement including location information to be used for displaying the technical term of the reference sign on the drawing image by using the specific free space;

wherein the reference sign in the drawing and the reference sign in the specification are text strings determined as identical to each other, and wherein the reference sign in the drawing is recognized in order to achieve the first state by performing steps of:

(i1) sampling over collected image data including each image corresponding to each character;

(i2) dividing the sampled image data into n folders wherein n is a natural number larger than 2;

(i3) learning a learning model using a part of the sampled image data in n−1 folders as training data, and performing a cross validation process of acquiring at least one test error n times with a part of the sampled image data in the n folders excluding said n−1 folders, as test data, to thereby optimize at least one hyper parameter; and (i4) learning at least one parameter of the learning model with the optimized hyper parameter.

2. The method of claim 1, wherein the learning model is at least one of a discriminant deep learning model and a generative deep learning model, and wherein the hyper parameter is at least one of (i) a number of layers, (ii) a number of hidden variables, (iii) a rate of drop out, (iv) a filter size, and (v) at least one activation function.

3. The method of claim 1, wherein the step of (b) includes steps of:

(b1) estimating a placement size for placing the technical term of the reference sign in the drawing;

(b2) searching nearby areas of the reference sign in the drawing for the specific free space, among the entire free space, whose size is equal to or greater than the placement size estimated at the step of (b1); and (b3) generating the information set on the placement for placing the technical term of the reference sign on the specific free space.

4. The method of claim 3, wherein the steps of (b1) and (b2) are processed for each reference sign in the drawing, and wherein the step of (b2) includes steps of:

on condition that a first specific free space for the technical term of a first reference sign to an i-th specific free space for the technical term of an i-th reference sign have been determined wherein i is a natural number larger than 1, (b21) searching for an (i+1)-th specific free space for the technical term of an (i+1)-th reference sign such that the (i+1)-th specific free space overlaps none of the first specific free space to the i-th specific free space; and (b22) i) if no overlap occurs, generating the information set on the placement for the technical term of the (i+1)-th reference sign using information on the (i+1)-th specific free space and ii) if an overlap occurs, raising an exception for the technical term of the (i+1)-th reference sign.

5. The method of claim 3, wherein orientations and locations to be searched for the specific free space for the technical term of the reference sign are prioritized, wherein, at the step of (b2), the specific free space for the technical term of the reference sign is searched for according to each priority of the locations per each reference sign in the drawing, and wherein, when searching for the free space for the technical term of the reference sign according to each priority, if the specific free space for the technical term of the reference sign crosses a physical boundary of the drawing, the specific free space for the technical term of the reference sign is searched for based on a next priority.

6. The method of claim 1, further comprising a step of:

(d) the integrating server generating an information set on combination of the reference sign and its corresponding technical term by using the information set on the placement, wherein the information set on the combination of the reference sign and its corresponding technical term includes condition data to be used for determining how the technical term of the reference sign is to be displayed on the drawing image.

7. The method of claim 6, wherein the information set on the combination of the reference sign and its corresponding technical term includes each piece of location information where the technical term of the reference sign is to be placed, and selectively includes at least one of information on a type of a font, information on a size of a font, information on color, information on grayscale, information on color saturation, and information on orientations, for the technical term of the reference sign.

8. The method of claim 1, wherein at least one of (i) the technical term of the reference sign recognized in order to achieve the second state, and (ii) the information set on the mapping between the reference sign in the specification and its corresponding technical term in order to achieve the second state is used when the reference sign in the drawing is recognized in order to achieve the first state.

9. The method of claim 8, wherein the information set on the mapping between the reference sign in the specification and its corresponding technical term includes probabilistic mapping data between the reference sign in the specification and its corresponding technical term, and wherein the information set on the mapping between the reference sign in the specification and its corresponding technical term selectively includes information on a degree of importance of the technical term of the reference sign and on a hierarchizing process of the technical term of the reference sign.

10. An integrating server for placing at least one technical term of at least one reference sign in at least one drawing around the at least one reference sign, comprising:

a communication part for, on condition that i) a first state in which an OCR device has acquired at least one drawing image file corresponding to at least one drawing identifier related to at least one patent identifier, has recognized at least one reference sign in at least one drawing from the drawing image file, and has generated an information set on the reference sign in the drawing, including location information on the reference sign in the drawing, and that ii) a second state in which a reference sign and technical term recognizing device has parsed a specification text string including the reference sign and its corresponding technical term, has recognized the reference sign in a specification and its corresponding technical term included in the specification text string, and has generated each information set, for each patent identifier, on mapping between the reference sign in the specification and its corresponding technical term, have been performed, acquiring (1) the information set on the mapping between the reference sign in the specification and its corresponding technical term about the patent identifier and (2) the information set on the reference sign in the drawing about the drawing identifier; and a processor for performing processes of (I) searching for a specific free space, among entire free space, on the drawing image, where the technical term of the reference sign is to be displayed, by using (i) the location information on the reference sign in the drawing included in the information set on the reference sign in the drawing and (ii) term information on the reference sign mapped onto the reference sign in the specification included in the information set on the mapping between the reference sign in the specification and its corresponding technical term, and (II) generating an information set on placement including location information to be used for displaying the technical term of the reference sign on the drawing image by using the specific free space;

wherein the reference sign in the drawing and the reference sign in the specification are text strings determined as identical to each other, and wherein the reference sign in the drawing is recognized in order to achieve the first state by performing steps of:

(i1) sampling over collected image data including each image corresponding to each character;

(i2) dividing the sampled image data into n folders wherein n is a natural number larger than 2;

(i3) learning a learning model using a part of the sampled image data in n−1 folders as training data, and performing a cross validation process of acquiring at least one test error n times with a part of the sampled image data in the n folders excluding said n−1 folders, as test data, to thereby optimize at least one hyper parameter; and (i4) learning at least one parameter of the learning model with the optimized hyper parameter.

* * * * *